United States Patent
Nishikawa et al.

(10) Patent No.: US 10,232,702 B2
(45) Date of Patent: Mar. 19, 2019

(54) THERMAL MANAGEMENT SYSTEM

(71) Applicant: DENSO CORPORATION, Kariya, Aichi-pref. (JP)

(72) Inventors: Michio Nishikawa, Nagoya (JP); Nobuharu Kakehashi, Toyoake (JP); Norihiko Enomoto, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1039 days.

(21) Appl. No.: 14/402,300

(22) PCT Filed: Apr. 24, 2013

(86) PCT No.: PCT/JP2013/002765
§ 371 (c)(1),
(2) Date: Nov. 19, 2014

(87) PCT Pub. No.: WO2013/175710
PCT Pub. Date: Nov. 28, 2013

(65) Prior Publication Data
US 2015/0129161 A1 May 14, 2015

(30) Foreign Application Priority Data

May 23, 2012 (JP) .................................. 2012-117406
Apr. 3, 2013 (JP) .................................. 2013-077628

(51) Int. Cl.
B60H 1/00 (2006.01)
B60K 11/02 (2006.01)
(Continued)

(52) U.S. Cl.
CPC .......... B60K 11/02 (2013.01); B60H 1/00271 (2013.01); B60H 1/00885 (2013.01);
(Continued)

(58) Field of Classification Search
CPC .... B60K 11/02; B60K 11/04; B60H 1/00271; B60H 1/00885; B60H 2001/00307;
(Continued)

(56) References Cited

U.S. PATENT DOCUMENTS 5,421,169 A * 6/1995 Benedict ............ B60H 1/00007
165/42
5,511,384 A * 4/1996 Likitcheva ................ F24H 4/04
165/154
(Continued)

FOREIGN PATENT DOCUMENTS

DE          10022967 A1   11/2001
DE          10210132 A1    9/2003
(Continued)

OTHER PUBLICATIONS

International Search Report and Written Opinion (in Japanese with English Translation) for PCT/JP2013/002765, dated Jul. 16, 2013; ISA/JP.

*Primary Examiner* — Frantz Jules
*Assistant Examiner* — Nelson Nieves
(74) *Attorney, Agent, or Firm* — Harness, Dickey & Pierce, P.L.C.

(57) ABSTRACT

A heat medium discharge side of a first pump and a heat medium discharge side of a second pump are connected to a first switching valve in parallel. Heat medium inlet sides of the respective target devices for heat exchange included in a first target device group for heat exchange are connected to a first switching valve in parallel. The heat medium inlet side of the first pump and the heat medium inlet side of the second pump are connected to a second switching valve in parallel. The heat medium outlet sides of the respective target devices for heat exchange included in the first target device group for heat exchange are connected to the second switching valve in parallel. Furthermore, switching is per- (Continued)

formed between a state of circulation of the heat medium between the first pump and the target device, and a state of circulation of the heat medium between the second pump and the target device.

33 Claims, 34 Drawing Sheets

(51) Int. Cl.
    *F01P 7/14*     (2006.01)
    *F01P 7/16*     (2006.01)
    *B60K 11/04*    (2006.01)
    *F01P 5/10*     (2006.01)

(52) U.S. Cl.
    CPC ............... *B60K 11/04* (2013.01); *F01P 7/14* (2013.01); *F01P 7/165* (2013.01); *B60H 2001/00307* (2013.01); *F01P 2005/105* (2013.01); *F01P 2060/02* (2013.01); *F01P 2060/08* (2013.01); *F01P 2060/12* (2013.01); *F01P 2060/14* (2013.01)

(58) Field of Classification Search
    CPC .......... F01P 7/165; F01P 7/14; F01P 2060/02; F01P 2005/105; F01P 2060/12; F01P 2060/14; F01P 2060/08
    See application file for complete search history.

(56) References Cited

U.S. PATENT DOCUMENTS

| | | | |
|---|---|---|---|
| 9,643,469 B2 * | 5/2017 | Kakehashi | B60K 11/02 |
| 9,649,909 B2 * | 5/2017 | Enomoto | B60K 6/22 |
| 9,650,940 B2 * | 5/2017 | Kakehashi | F01P 3/20 |
| 2002/0014330 A1 * | 2/2002 | Guyonvarch | B60H 1/00007 |
| | | | 165/202 |
| 2006/0117748 A1 * | 6/2006 | Bundschuh | F01P 7/165 |
| | | | 60/599 |
| 2006/0157000 A1 * | 7/2006 | Lutze | F01P 3/20 |
| | | | 123/41.02 |
| 2006/0213463 A1 * | 9/2006 | Wikstrom | F01P 7/165 |
| | | | 123/41.31 |
| 2010/0078148 A1 * | 4/2010 | Jouanny | F01P 7/165 |
| | | | 165/51 |
| 2010/0095909 A1 * | 4/2010 | Lin | F01P 11/16 |
| | | | 123/41.02 |
| 2011/0100307 A1 * | 5/2011 | Moffat | F01P 3/12 |
| | | | 123/41.1 |
| 2011/0197611 A1 * | 8/2011 | Hall | B60H 1/00378 |
| | | | 62/238.7 |
| 2012/0085114 A1 * | 4/2012 | Graaf | B60H 1/00278 |
| | | | 62/238.7 |
| 2012/0090806 A1 * | 4/2012 | Beschieru | B60H 1/00278 |
| | | | 165/41 |
| 2012/0129066 A1 * | 5/2012 | Ben-Aicha | F01P 7/165 |
| | | | 429/435 |
| 2012/0137992 A1 * | 6/2012 | Kinomuka | F01P 7/165 |
| | | | 123/41.08 |
| 2012/0137993 A1 * | 6/2012 | Kim | F01P 7/165 |
| | | | 123/41.11 |
| 2012/0193570 A1 * | 8/2012 | Houjou | C07C 251/24 |
| | | | 252/75 |
| 2012/0216983 A1 * | 8/2012 | Bennion | B60H 1/00907 |
| | | | 165/41 |
| 2012/0225341 A1 * | 9/2012 | Major | B60H 1/00278 |
| | | | 429/120 |
| 2012/0234266 A1 * | 9/2012 | Faulkner | F01P 7/165 |
| | | | 123/41.1 |
| 2013/0056194 A1 * | 3/2013 | Cregut | B60K 11/02 |
| | | | 165/300 |
| 2013/0087304 A1 * | 4/2013 | Ahmed | B60H 1/00271 |
| | | | 165/41 |
| 2013/0248166 A1 * | 9/2013 | Wang | G05D 23/19 |
| | | | 165/287 |

FOREIGN PATENT DOCUMENTS

| | | |
|---|---|---|
| DE | 102008015591 A1 | 10/2009 |
| EP | 1832730 A2 | 9/2007 |
| JP | 2002295253 A | 10/2002 |
| JP | 2004143949 A | 5/2004 |
| JP | 2011121551 A | 6/2011 |

\* cited by examiner

FIG. 2    MAXIMUM COOLING STATE
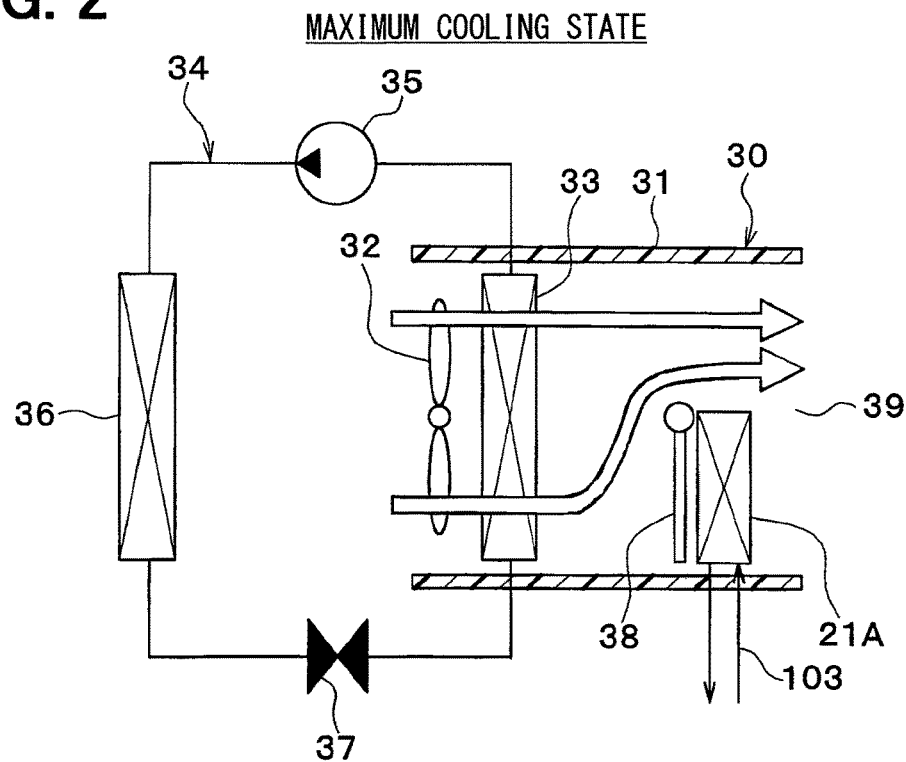
FIG. 3    MAXIMUM HEATING STATE
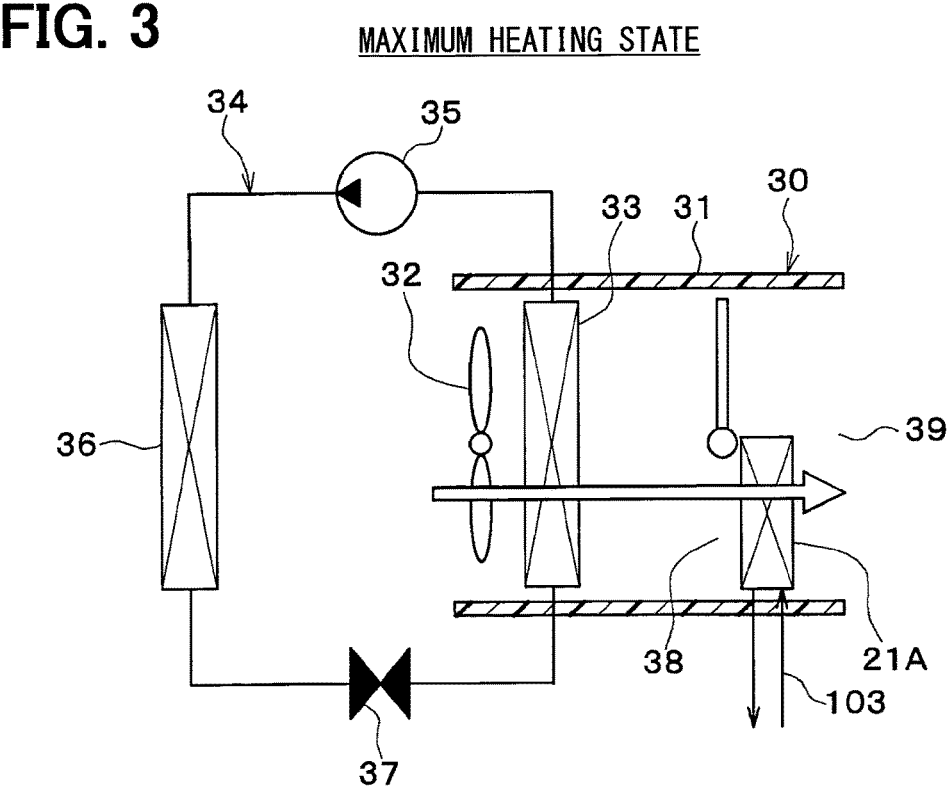

FIRST MODE

FOURTH MODE

FIFTH MODE

EIGHTH MODE

| AC OPERATING STATE | | MAXIMUM COOLING STATE | | INTERMEDIATE AIR CONDITIONING STATE | | MAXIMUM HEATING STATE | |
|---|---|---|---|---|---|---|---|
| ENGINE OPERATION RANGE | | MBT | TK | MBT | TK | MBT | TK |
| ENGINE STATE | COLD | 1 | 2 | 6 | 7 | 11 | 12 |
| | WARMING-UP COMPLETION | 3 | 4 | 8 | 9 | 13 | 14 |
| | IDLE OR IDLE STOP | 5 | — | 10 | — | 15 | — |

FIG. 27
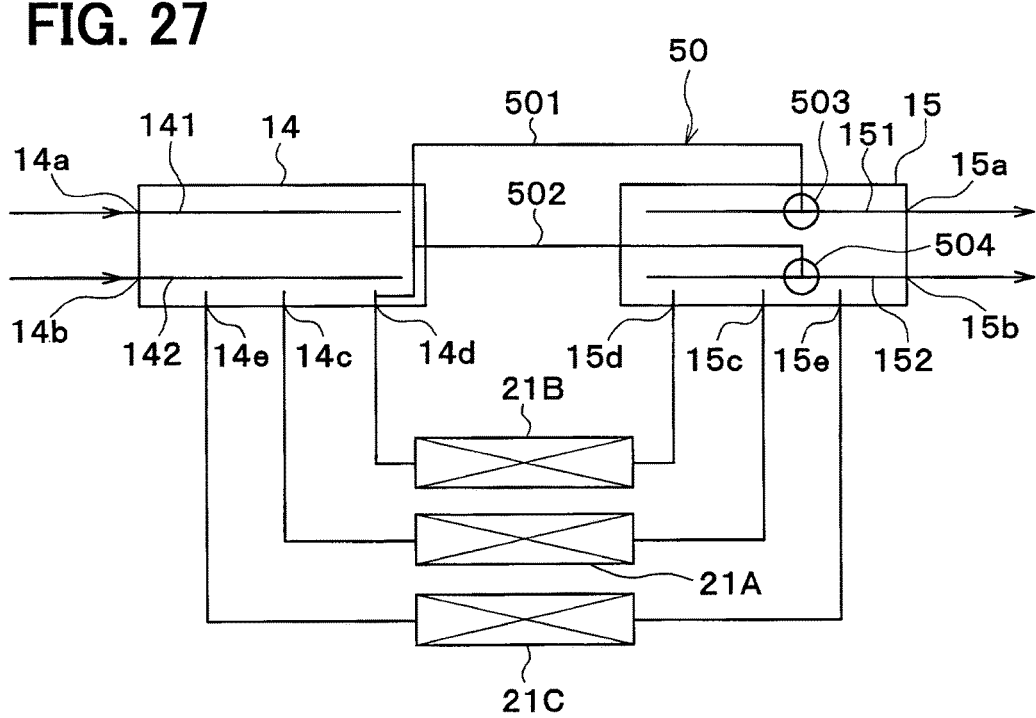
FIG. 28  FIRST PARALLEL FLOW MODE
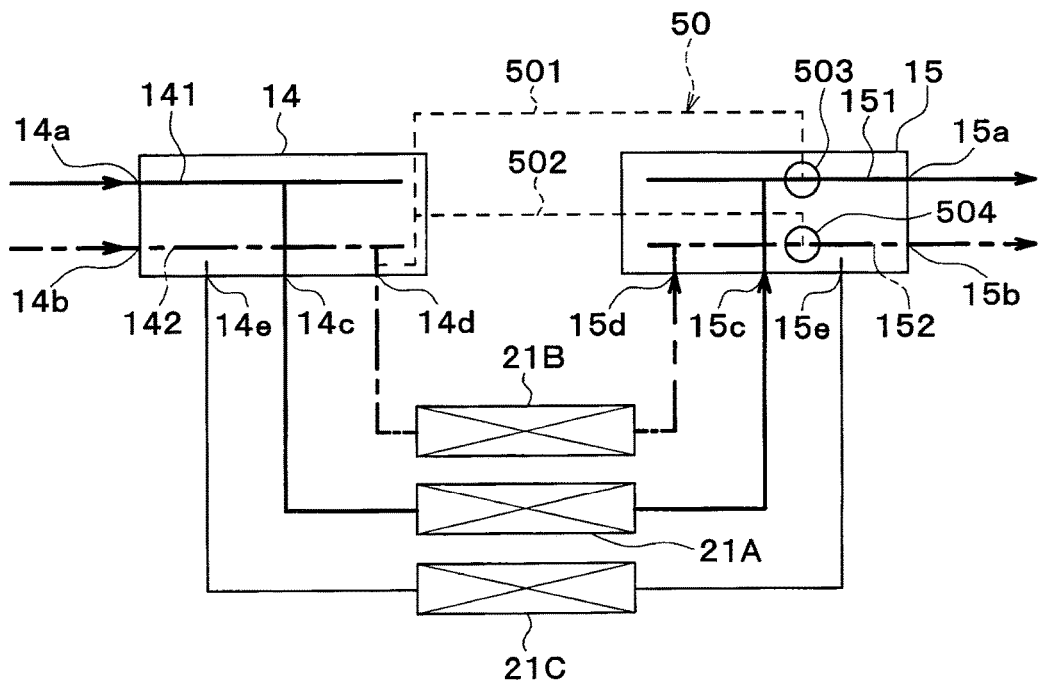

THERMAL MANAGEMENT SYSTEM

CROSS REFERENCE TO RELATED APPLICATIONS

This application is a U.S. National Phase Application under 35 U.S.C. 371 of International Application No. PCT/JP2013/002765 filed on Apr. 24, 2013 and published in Japanese as WO 2013/175710 A1 on Nov. 28, 2013. This application is based on and claims the benefit of priority from Japanese Patent Applications No. 2012-117406 filed on May 23, 2012, and No. 2013-077628 filed on Apr. 3, 2013. The entire disclosures of all of the above applications are incorporated herein by reference.

FIELD OF THE INVENTION

The preset disclosure relates to a thermal management system used for a vehicle.

BACKGROUND ART

Conventionally, there is known a heat controller that cools a motor generator, an inverter, a battery and a vehicle compartment of an electric vehicle.

As disclosed in Patent Document 1, a heat controller in the related art includes a cooling circuit that causes a coolant for cooling the motor generator and the inverter to circulate therethrough. The heat controller also includes a first circulation circuit that causes a coolant for cooling a battery and a vehicle compartment to circulate therethrough, and a second circulation circuit that causes a coolant passing through an outdoor heat exchanger and exchanging heat with outside air to circulate therethrough.

Further, the heat controller includes a first valve for connecting and disconnecting between the cooling circuit and the first circulation circuit, a second valve for connecting the cooling circuit to either the first circulation circuit or second circulation circuit, and a third valve for connecting and disconnecting between the cooling circuit and the second circulation circuit. The first, second, and third valves are controlled to switch the object of connection of the cooling circuit between the first and second circulation circuits.

Heat can be transferred by a heat transfer device between the coolant circulating through the first circulation circuit and the coolant circulating through the second circulation circuit. The heat transfer device transfers the heat from the coolant at a low temperature to the coolant at a high temperature, between the coolants in the first and second circulation circuits.

The heat of the coolant in the first circulation circuit is transferred to the coolant in the second circulation circuit by the heat transfer device, and the heat of the coolant in the second circulation circuit is dissipated into the outside air by the outdoor heat exchanger, which can cool the battery and vehicle compartment.

The cooling circuit is connected to the first circulation circuit or second circulation circuit by use of the first, second, and third valves, so that the heat of the coolant in the cooling circuit can be dissipated to the outside air by the outdoor heat exchanger in the second circulation circuit, thereby cooling the motor generator and inverter.

PRIOR ART LIST

Patent Document

Patent Document 1: Japanese Unexamined Patent Application Publication No. 2011-121551

SUMMARY OF THE INVENTION

The inventors of the present application have found through their studies that although only one outdoor heat exchanger is advantageously required in a cooling system for cooling a plurality of target devices to be cooled, including the motor generator, inverter, battery, and vehicle compartment, the entire circuit configuration might become complicated. As the number of target devices to be cooled is increased, the circuit configuration tends to be more complicated.

For example, the target devices to be cooled, which require cooling, include an EGR cooler, an intake air cooler, and the like, in addition to the motor generator, the inverter, and the battery. Those target devices to be cooled have different required cooling temperatures.

In order to appropriately cool the respective target devices to be cooled, the coolant to circulate through the respective target devices to be cooled is proposed to be switchable among the devices, which leads to an increase in the number of the circulation circuits according to the number of target devices to be cooled. Together with the increase, the number of valves for connecting and disconnecting between the cooling circuit and the respective circulation circuits is also increased, which results in a very complicated structure of flow paths for connecting the respective circulation circuits and the cooling circuits.

The present disclosure has been made in view of the foregoing points, and it is an object of the present disclosure to simplify the structure of a vehicle thermal management system that can switch heat media circulating through a plurality of target devices for heat exchange.

According to an exemplary embodiment of the present disclosure, a thermal management system for a vehicle includes a first pump, a second pump, a heat exchanger, a first target device group, a first switching valve and a second switching valve. The first pump draws and discharges a heat medium adapted to cool an internal combustion engine, and the second pump draws and discharges the heat medium. The heat exchanger exchanges heat between outside air and the heat medium discharged from the second pump. The first target device group for heat exchange includes a plurality of target devices for heat exchange that exchange heat with the heat medium. The first switching valve is connected to a heat medium discharge side of the first pump and a heat medium discharge side of the second pump in parallel, and is connected to respective heat medium inlet sides of the target devices for heat exchange included in the first target device group for heat exchange in parallel. The first switching valve switches between (i) a state in which the heat medium discharged from the first pump flows into the target devices for heat exchange included in the first target device group for heat exchange, and (ii) a state in which the heat medium discharged from the second pump flows into the target devices for heat exchange included in the first target device group for heat exchange. The second switching valve is connected to a heat medium suction side of the first pump and a heat medium suction side of the second pump in parallel, and is connected to respective heat medium outlet sides of the target devices for heat exchange included in the first target device group for heat exchange in parallel. The second switching valve switches between (i) a state in which the heat medium from the target devices for heat exchange included in the first target device group for heat exchange flows into the first pump, and (ii) a state in which the heat medium from the target devices for heat exchange included in the first target device group for heat exchange flows into to the second pump. Furthermore, the first switching valve and the second switching valve are cooperatively operated to switch between (i) a state in which the heat medium circulates between the first pump and the target devices for heat exchange included in the first target device group for heat exchange, and (ii) a state in which the heat medium circulates between the second pump and the target devices for heat exchange included in the first target device group for heat exchange.

Thus, the target devices for heat exchange are connected in parallel between the first and second switching valves for switching the flows of heat media. With such a simple structure, the heat media circulating through the target devices for heat exchange can be switched among the devices.

BRIEF DESCRIPTION OF THE DRAWINGS

FIG. 2 is a cross-sectional view showing a maximum cooling state of an interior air conditioning unit shown in FIG. 1.

FIG. 3 is a cross-sectional view showing a maximum heating state of the interior air conditioning unit shown in FIG. 1.

FIG. 27 is a configuration diagram of a main part of a vehicle thermal management system according to a fourth embodiment of the invention.

FIG. 28 is a schematic diagram of a first parallel flow mode in the fourth embodiment of the invention.

DESCRIPTION OF EMBODIMENTS

First Embodiment

In the following, a first embodiment of the invention will be described based on FIGS. 1 to 15. A vehicle thermal management system 10 shown in FIG. 1 is used to manage various target devices for heat exchange mounted on a vehicle (devices requiring cooling or heating) or an interior of the vehicle at an appropriate temperature.

In this embodiment, the vehicle thermal management system 10 is applied to a vehicle (turbocharger mounted vehicle) equipped with a turbocharger (or supercharger) for supercharging an intake air of an engine (specifically, internal combustion engine).

Figure 1:
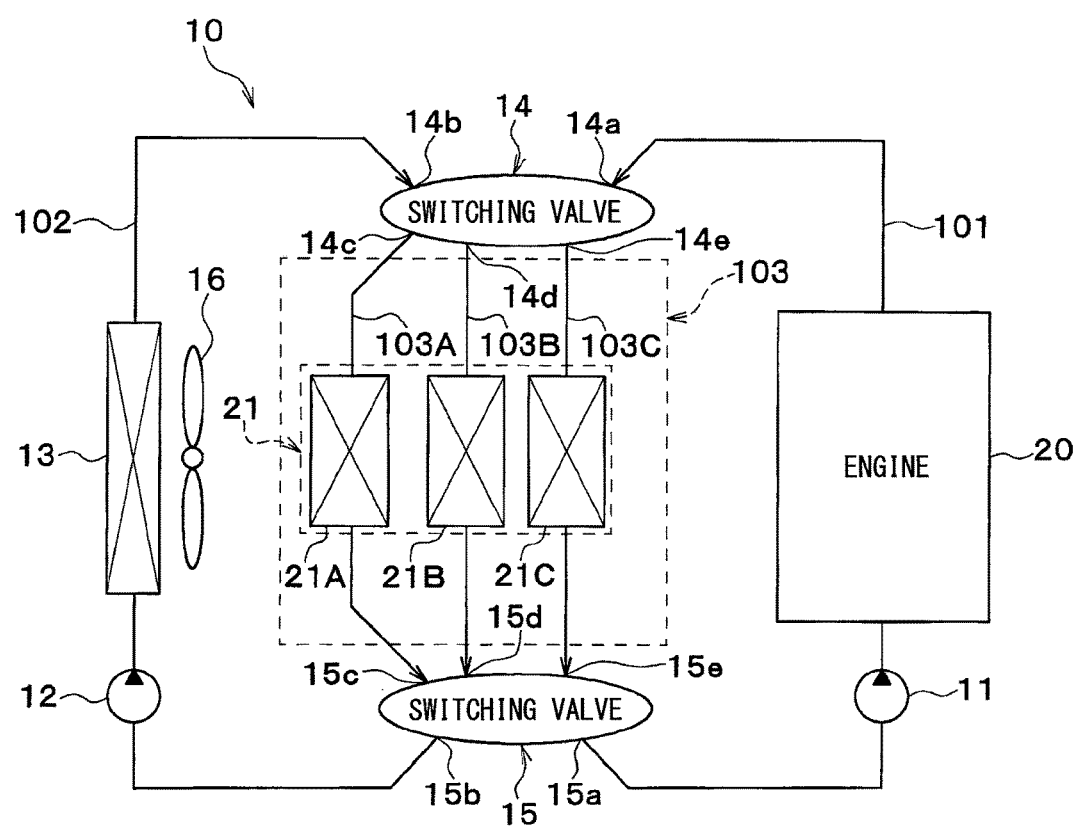
FIG. 1 is an entire configuration diagram of a vehicle thermal management system according to a first embodiment of the invention.

As shown in FIG. 1, the vehicle thermal management system 10 includes a first pump 11, a second pump 12, a radiator 13, a first switching valve 14, and a second switching valve 15.

Each of the first pump 11 and the second pump 12 is a coolant pump (heat medium pump) for drawing and discharging the coolant (or heat medium). The first pump 11 is an engine-driven pump that is rotatably driven by the engine via a pulley, a belt, and the like. The second pump 12 is an electric pump that is driven by an electric power supplied from a battery. The coolant is preferably liquid containing at least ethylene glycol or dimethylpolysiloxane.

The first pump 11 is disposed on the upstream side of a coolant flow with respect to an engine 20 in an engine-side flow path 101 where the engine 20 is disposed. The second pump 12 is disposed on the upstream side of a coolant flow with respect to the radiator 13 in a radiator-side flow path 102 where the radiator 13 is disposed.

The radiator 13 is a heat exchanger for heat dissipation (radiator) that dissipates heat of the coolant into the outside air by exchanging heat between the coolant and the outside air. The coolant inlet side of the radiator 13 is connected to the coolant discharge side of the first pump 11.

An exterior blower 16 is an electric blower for blowing the outside air to the radiator 13. The radiator 13 and the exterior blower 16 are disposed at the forefront of the vehicle. Thus, during traveling of the vehicle, the radiator 13 can face the traveling air.

Each of the first and second switching valves 14 and 15 is a coolant-flow switching device that switches the flow of the coolant. The first and second switching valves 14 and 15 have the same basic structure. However, the first switching valve 14 differs from the second switching valve 15 in that inlet and outlet for the coolant are reversed to each other.

The first switching valve 14 includes a first inlet 14*a* and a second inlet 14*b* as an inlet for the coolant, and three outlets 14*c*, 14*d*, and 14*e* as an outlet for the coolant. The second switching valve 15 includes a first outlet 15*a* and a second outlet 15*b* as an outlet for the coolant, and three inlets 15*c*, 15*d*, and 15*e* as an inlet for the coolant.

The first inlet 14*a* of the first switching valve 14 is connected to the outlet side for the coolant of the engine-side flow path 101. In other words, the first inlet 14*a* of the first switching valve 14 is connected to the discharge side for the coolant of the first pump 11 via the engine 20. Thus, the coolant discharged from the first pump 11 passes through a coolant flow path formed in the engine 20, and then flows into the first inlet 14*a* of the first switching valve 14.

The second inlet 14*b* of the first switching valve 14 is connected to the outlet side for the coolant of the radiator-side flow path 102. In other words, the second inlet 14*b* of the first switching valve 14 is connected to the discharge side for the coolant of the second pump 12 via the radiator 13. Thus, the coolant discharged from the second pump 12 passes through the radiator 13, and then flows into the second inlet 14*b* of the first switching valve 14.

The first outlet 15*a* of the second switching valve 15 is connected to the inlet side for the coolant of the engine-side flow path 101. In other words, the first outlet 15*a* of the second switching valve 15 is connected to the suction side for the coolant of the first pump 11.

The second outlet 15*b* of the second switching valve 15 is connected to the inlet side for the coolant of the radiator-side flow path 102. In other words, the second outlet 15*b* of the second switching valve 15 is connected to the suction side for the coolant of the second pump 12.

A first flow path group 103 is connected to between a side of the outlet 14*c*, 14*d*, and 14*e* of the first switching valve 14 and a side of the inlets 15*c*, 15*d*, and 15*e* of the second switching valve 15.

For example, a flow path 103A of the first flow path group 103 is connected to between the outlet 14*c* of the first switching valve 14 and the inlet 15*c* of the second switching valve 15. A flow path 103B of the first flow path group 103 is connected to between the outlet 14*d* of the first switching valve 14 and the inlet 15*d* of the second switching valve 15. A flow path 103C of the first flow path group 103 is connected to between the outlet 14*e* of the first switching valve 14 and the inlet 15*e* of the second switching valve 15.

Thus, the flow paths 103A, 103B, and 103C of the first flow path group 103 are arranged in parallel with each other between the outlets 14*c*, 14*d*, and 14*e* of the first switching valve 14 and the inlets 15*c*, 15*d*, and 15*e* of the second switching valve 15.

In the first flow path group 103, a first target device group for heat exchange 21 is disposed. The first target device group for heat exchange 21 includes a heater core 21A, an intercooler 21B, and a turbocharger 21C. Specifically, the heater core 21A is disposed in the flow path 103A, the intercooler 21B is disposed in the flow path 103B, and the turbocharger 21C is disposed in the flow path 103C.

The heater core 21A is a heat exchanger for exchanging heat between air to be blown into the vehicle interior and the coolant, thereby heating the air. The coolant inlet side of the heater core 21A is connected to the outlet 14*c* of the first switching valve 14. The coolant outlet side of the heater core 21A is connected to the inlet 15*c* of the second switching valve 15.

The turbocharger 21C is a supercharger that supercharges the intake air of the engine 20 by rotating a turbine (not shown) using a residual energy of exhaust gas from the engine 20. The turbocharger 21C becomes at a very high temperature because of the exhaust gas received from the engine 20.

The coolant inlet side of the turbocharger 21C is connected to the outlet 14e of the first switching valve 14. The coolant outlet side of the turbocharger 21C is connected to the inlet 15e of the second switching valve 15.

The intercooler 21B is a suction cooler that exchanges heat between the coolant and supercharged intake air at high temperature compressed by the turbocharger 21C to thereby cool the supercharged intake air. The intake air is preferably cooled down to about 30° C.

The coolant inlet side of the intercooler 21B is connected to the outlet 14d of the first switching valve 14. The coolant outlet side of the intercooler 21B is connected to the inlet 15d of the second switching valve 15.

As shown in FIG. 2, the heater core 21A is accommodated in an interior air conditioning unit 30. The interior air conditioning unit 30 is disposed inside a dashboard (or instrument panel) located at the forefront part of the vehicle interior.

A casing 31 serving as an outer envelope of the interior air conditioning unit 30 forms an air passage for the air to be blown into the vehicle interior. An inside/outside air switch (not shown) for switching between the inside air (i.e. air inside a vehicle compartment) and the outside air (i.e. air outside the vehicle compartment) is disposed on the most upstream side of the air flow in the casing 31.

On the downstream side of air flow of the inside/outside air switch, a blower 32 is provided for blowing air sucked thereinto via the inside/outside air switch toward the vehicle interior. An evaporator 33 is disposed on the downstream side of the air flow of the blower 32. The evaporator 33 is a heat exchanger for cooling that exchanges heat between the air and a low-pressure refrigerant of a refrigeration cycle 34 to thereby cool the air.

The refrigeration cycle 34 includes a compressor 35, a condenser 36, and an expansion valve 37, in addition to the evaporator 33. The compressor 35 is a refrigerant compression device that compresses and discharges the refrigerant sucked from the refrigeration cycle 34. The compressor 35 is an engine-driven compressor that is rotatably driven by the engine via a pulley, a belt, and the like.

The condenser 36 is an exterior heat exchanger for condensing a high-pressure refrigerant by exchanging heat between the air outside the vehicle compartment (i.e. outside air) and the high-pressure refrigerant (or gas-phase refrigerant) discharged from the compressor 35. The expansion valve 37 is a decompression device for decompressing and expanding a high-pressure refrigerant condensed by the condenser 36.

The evaporator 33 is an interior heat exchanger for evaporating the low-pressure refrigerant (or liquid-phase refrigerant) decompressed by the expansion valve 37 to exhibit a heat absorption effect in the refrigerant. The low-pressure refrigerant (or gas-phase refrigerant) evaporated at the evaporator 33 is sucked into the compressor 35.

The heater core 21A is disposed on the downstream side of air flow of the evaporator 33 within the casing 31. Thus, the heater core 21A heats the cooled air having passed through the evaporator 33.

An air mix door 38 is disposed between the evaporator 33 and the heater core 21A within the casing 31. The air mix door 38 is a temperature adjuster that adjusts the temperature of the air to be blown into the vehicle interior by changing the ratio of the volume of cooled air passing through the heater core 21A to that of cooled air bypassing the heater core 21A.

FIG. 2 shows the rotational position of the air mix door 38 in the maximum cooling state. In the maximum cooling state, the entire cooled air having passed through the evaporator 33 bypasses the heater core 21A without passing through the heater core 21A, so that the entire cooled air having passed through the evaporator 33 is not heated by the heater core 21A. As a result, the air to be blown into the vehicle interior (hereinafter referred to as a blown air temperature) takes the lowest temperature.

FIG. 3 shows the rotational position of the air mix door 38 in the maximum heating state. In the maximum heating state, the entire cooled air having passed through the evaporator 33 passes through the heater core 21A without bypassing the heater core 21A, so that the entire cooled air having passed through the evaporator 33 is heated by the heater core 21A. As a result, the blown air temperature becomes the highest one.

Figure 4:
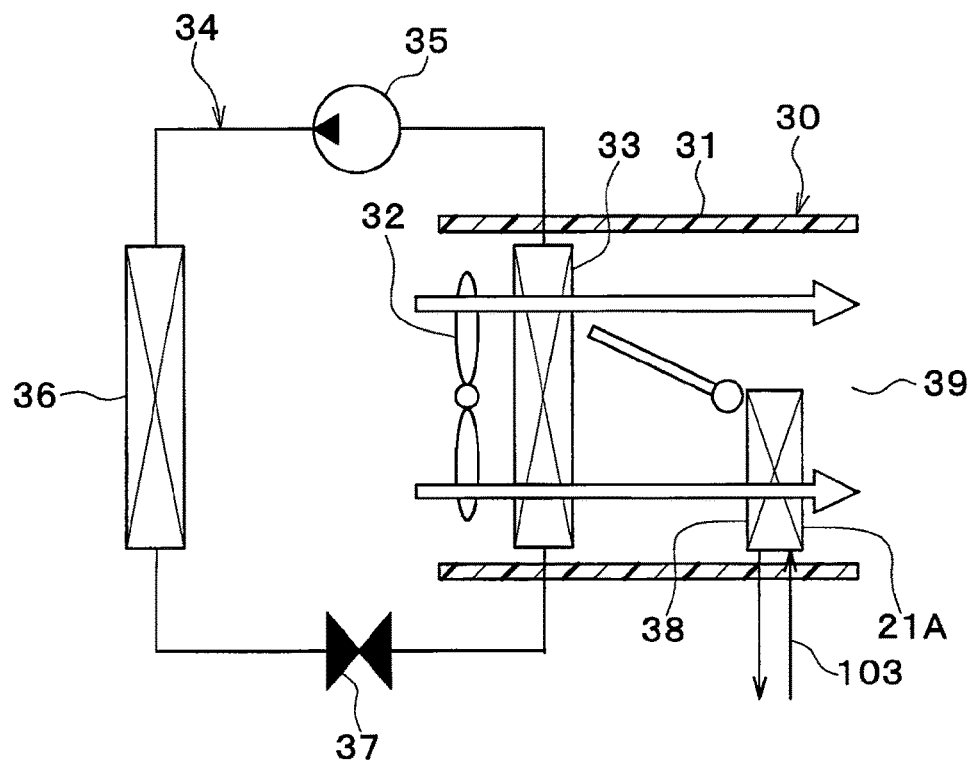
FIG. 4 is a cross-sectional view showing an intermediate air conditioning state of the interior air conditioning unit shown in FIG. 1.

FIG. 4 shows the rotational position of the air mix door 38 in an intermediate air conditioning state. In the intermediate air conditioning state, a part of the cooled air having passed through the evaporator 33 passes through the heater core 21A, and the remaining cooled air bypasses the heater core 21A, so that the warm air having passed through the heater core 21A and the cooled air bypassing the heater core 21A are mixed at a predetermined ratio of air volume. In this way, the blown air temperature is adjusted to a desired temperature (i.e. an intermediate temperature).

An air outlet 39 for blowing air whose temperature is adjusted toward the vehicle interior is disposed on the most downstream side of the air flow of the casing 31. Specifically, the air outlet 39 includes a face air outlet for blowing the conditioned air toward the upper body of a passenger in the vehicle compartment, a foot air outlet for blowing the conditioned air toward the lower body (or foot) of the passenger, and a defroster air outlet for blowing the conditioned air toward the inner side of a windshield of the vehicle (note that these outlets are not shown).

Figure 5:
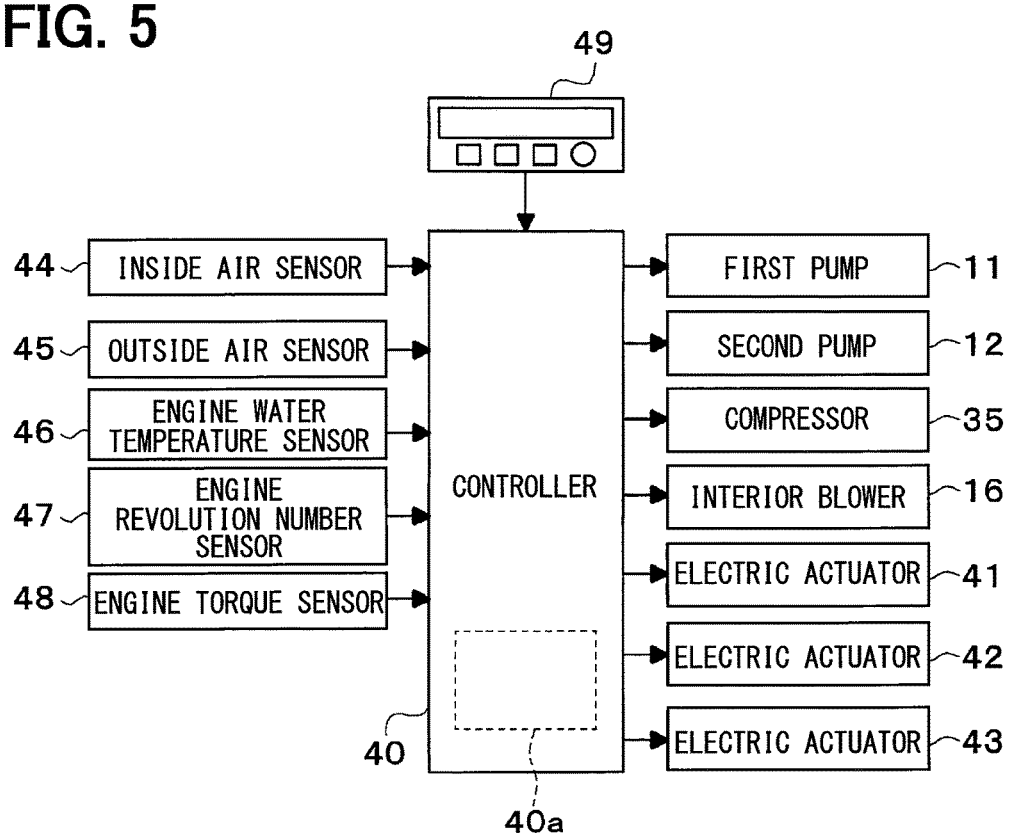
FIG. 5 is a block diagram showing an electric controller of the thermal management system for a vehicle shown in FIG. 1.

Next, an electric controller of the vehicle thermal management system 10 will be described with reference to FIG. 5. A controller 40 includes a known microcomputer, including CPU, ROM, RAM, and the like, and a peripheral circuit thereof. The controller 40 is a control device for controlling the operations of various target devices for control connected to the output side by performing various kinds of computations and processing based on air conditioning control programs stored in the ROM.

The various target devices for control connected to the output side of the controller 40 include the first pump 11, the second pump 12, the compressor 35, the blower 16, an electric actuator 41 for driving the air mix door, an electric actuator 42 for driving the first switching valve, an electric actuator 43 for the second switching valve, and the like.

The controller 40 is integrally structured with a control unit for controlling various target devices for control connected to the output side of the controller. The control unit for controlling the operation of each of the target devices for control includes a structure (hardware and software) adapted to control the operation of each of the target devices for control.

In this embodiment, a switching valve controller 40a includes the structure (hardware and software) for controlling the operations of the first and second electric actuators 42 and 43, which drive the first and second switching valves, respectively. Obviously, the switching valve controller 40a may be independently provided from the controller 40.

Various types of sensors are connected to the input side of the controller 40, and detection signals from various types of sensors are input to the controller 40. The various types of sensors include an inside air sensor 44, an outside air sensor 45, an engine water temperature sensor 46, an engine revolution number sensor 47, an engine torque sensor 48, and the like.

The inside air sensor 44 is a detector (inside air temperature detector) for detecting the temperature of inside air (or the temperature of the vehicle interior). The outside air sensor 45 is a detector (outside air temperature detector) for detecting the temperature of outside air.

The engine water temperature sensor 46 is a detector (engine temperature detector) for detecting the temperature of the coolant flowing from the engine 20. The engine revolution number sensor 47 is a detector (engine revolution number detector) for detecting the number of revolutions of the engine 20. The engine torque sensor 48 is a detector (engine torque detector) for detecting the torque of the engine 20.

The input side of the controller 40 is also connected to various types of air-conditioning operation switches that are provided in an operation panel 49 disposed near the instrument board at the front of the vehicle compartment. Operation signals are also input from the various air-conditioning operation switches to the controller 40. The various types of air conditioning operation switches provided in the operation panel 49 include an air conditioner switch, an automatic switch, an air volume setting switch of the blower 16, a vehicle-interior temperature setting switch, and the like.

The air conditioner switch is a switch for switching between operating and stopping of air conditioning (cooling or heating). The automatic switch is a switch for setting or resetting automatic control of the air conditioning. The vehicle-interior temperature setting switch serves as target temperature setting means for setting a target vehicle interior temperature by a passenger's operation.

Now, the operation of the above-mentioned structure will be described. The controller 40 cooperatively controls the operations of the first electric actuator 42 and the second electric actuator 43 for driving the first switching valve 14 and the second switching valve 15, respectively. Thus, the first and second switching valves 14 and 15 are cooperatively driven, and as a result, the coolant circuit of the vehicle thermal management system 10 is switched among first to eighth modes shown in FIGS. 6 to 13.

Figure 6:
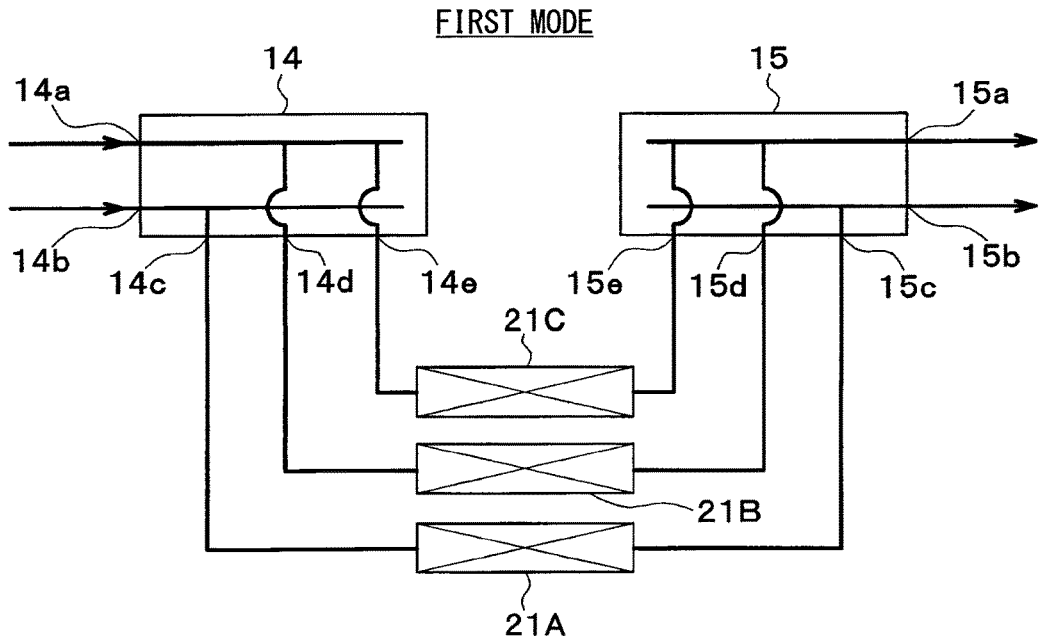
FIG. 6 is a schematic diagram of a first mode in a first embodiment of the invention.

In the first mode shown in FIG. 6, the first switching valve 14 allows the first inlet 14a to communicate with the outlets 14d and 14e, and also allows the second inlet 14b to communicate with the outlet 14c, whereas the second switching valve 15 allows the first outlet 15a to communicate with the inlets 15d and 15e, and also allows the second outlet 15b to communicate with the inlet 15c.

In this way, the high-temperature coolant (first coolant) discharged from the first pump 11 flows through the intercooler 21B and the turbocharger 21C in parallel, whereas the intermediate-temperature coolant (second coolant) discharged from the second pump 12 flows through the heater core 21A.

Thus, a first coolant circuit (high-temperature coolant circuit) through which the first coolant circulates is formed between the engine 20 and each of the intercooler 21B and turbocharger 21C, and a second coolant circuit (intermediate-temperature coolant circuit) through which the second coolant circulates is formed between the radiator 13 and the heater core 21A.

Figure 7:
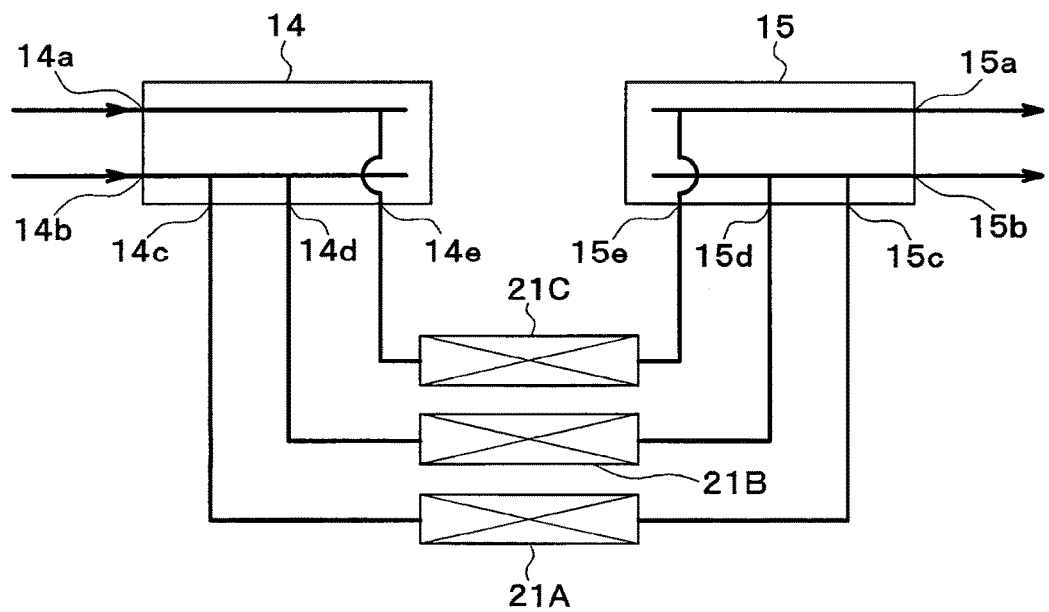
FIG. 7 is a schematic diagram of a second mode in the first embodiment.

In the second mode shown in FIG. 7, the first switching valve 14 allows the first inlet 14a to communicate with the outlet 14e, and also allows the second inlet 14b to communicate with the outlets 14c and 14d, whereas the second switching valve 15 allows the first outlet 15a to communicate with the inlet 15e, and allows the second outlet 15b to communicate with the inlets 15c and 15d.

Thus, the first coolant flows through the turbocharger 21C, and the second coolant flows through the heater core 21A and the intercooler 21B in parallel.

Thus, the first coolant circuit through which the first coolant circulates is formed between the engine 20 and the turbocharger 21C, and the second coolant circuit through which the second coolant circulates is formed between the radiator 13 and each of the heater core 21A and the intercooler 21B.

Figure 8:
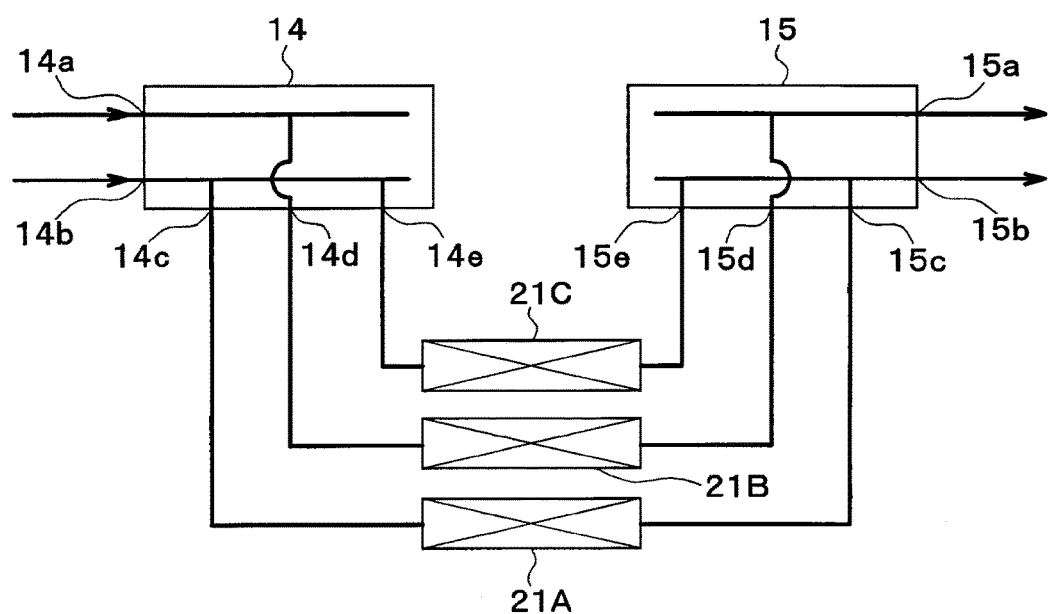
FIG. 8 is a schematic diagram of a third mode in the first embodiment.

In the third mode shown in FIG. 8, the first switching valve 14 allows the first inlet 14a to communicate with the outlet 14d, and also allows the second inlet 14b to communicate with the outlets 14c and 14e, whereas the second switching valve 15 allows the first outlet 15a to communicate with the inlet 15d, and also allows the second outlet 15b to communicate with the inlets 15c and 15e.

Thus, the first coolant flows through the intercooler 21B, and the second coolant flows through the heater core 21A and the turbocharger 21C in parallel.

Thus, the first coolant circuit through which the first coolant circulates is formed between the engine 20 and the intercooler 21B, and the second coolant circuit through which the second coolant circulates is formed between the radiator 13 and each of the heater core 21A and the turbocharger 21C.

Figure 9:
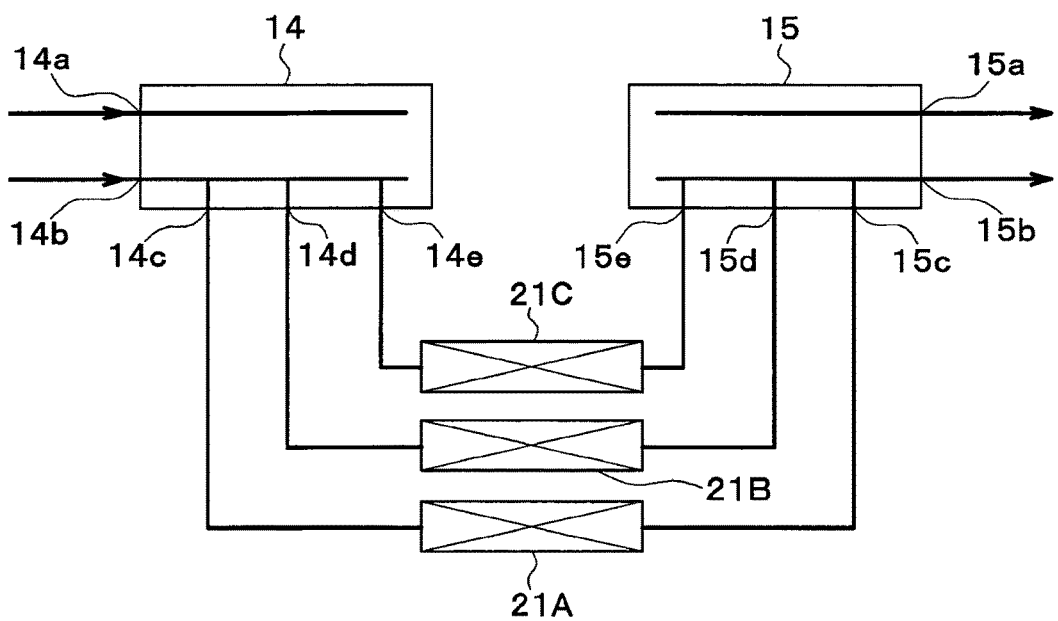
FIG. 9 is a schematic diagram of a fourth mode in the first embodiment.

In the fourth mode shown in FIG. 9, the first switching valve 14 allows the second inlet 14b to communicate with the outlets 14c, 14d, and 14e, whereas the second switching valve 15 allows the second outlet 15b to communicate with the inlets 15c, 15d, and 15e.

As a result, the second coolant flows through the heater core 21A, intercooler 21B, and turbocharger 21C in parallel.

Thus, the second coolant circuit through which the second coolant circulates is formed between the radiator 13 and each of the heater core 21A, intercooler 21B, and turbocharger 21C.

Figure 10:
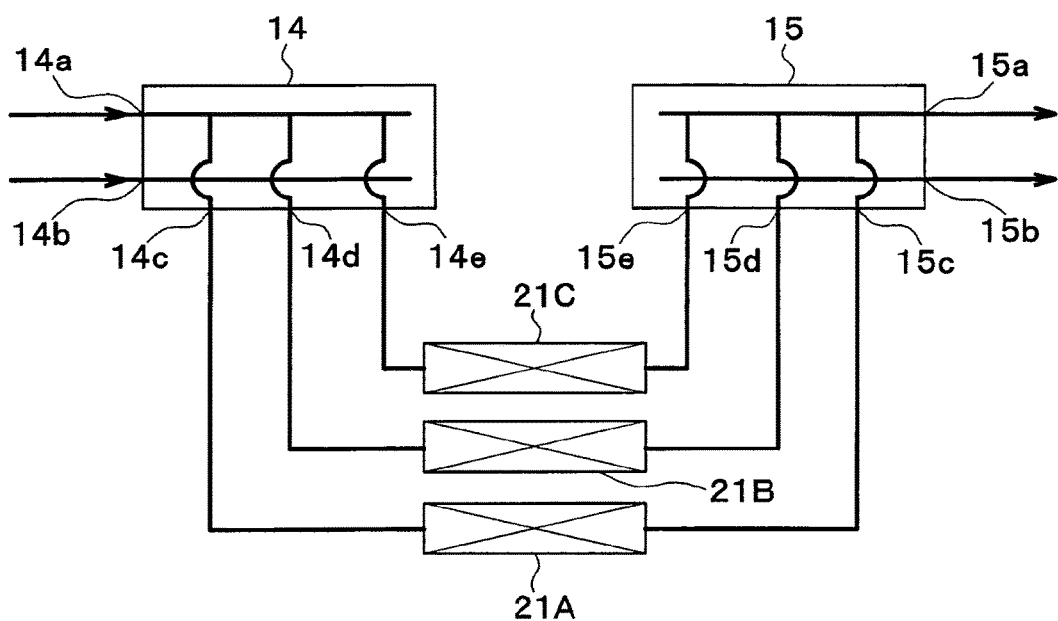
FIG. 10 is a schematic diagram of a fifth mode in the first embodiment.

In the fifth mode shown in FIG. 10, the first switching valve 14 allows the first inlet 14a to communicate with the outlets 14c, 14d, and 14e, whereas the second switching valve 15 allows the first outlet 15a to communicate with the inlets 15c, 15d, and 15e.

In this way, the first coolant flows through the heater core 21A, intercooler 21B, and turbocharger 21C in parallel.

Thus, the first coolant circuit through which the first coolant circulates is formed between the engine 20 and each of the heater core 21A, intercooler 21B, and turbocharger 21C.

Figure 11:
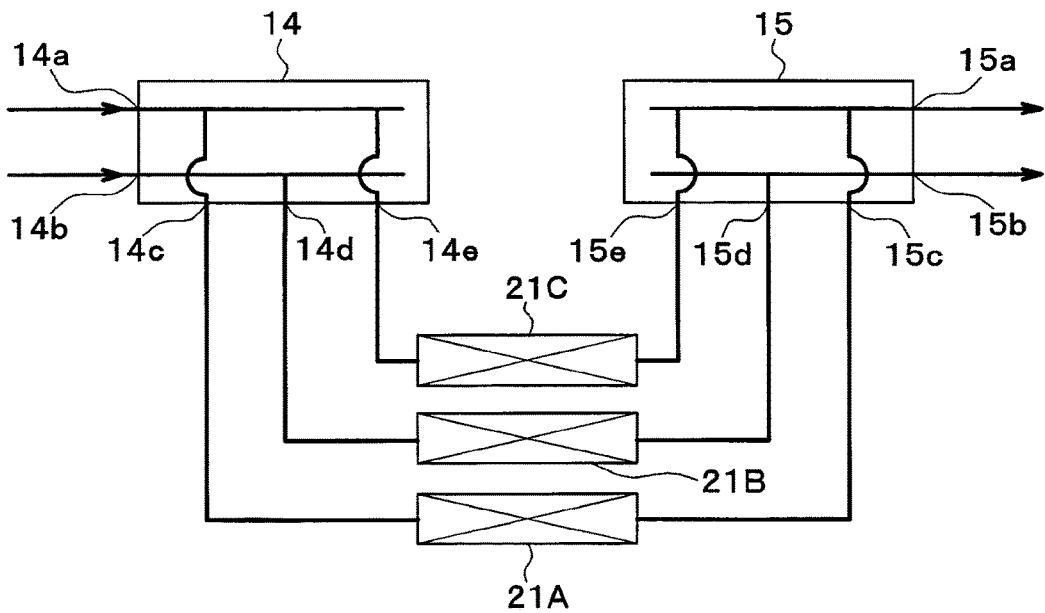
FIG. 11 is a schematic diagram of a sixth mode in the first embodiment.

In the sixth mode shown in FIG. 11, the first switching valve 14 allows the first inlet 14a to communicate with the outlets 14c and 14e, and also allows the second inlet 14b to communicate with the outlet 14d, whereas the second switching valve 15 allows the first outlet 15a to communicate with the inlets 15c and 15e, and also allows the second outlet 15b to communicate with the inlet 15d.

In this way, the first coolant flows through the heater core 21A and turbocharger 21C in parallel, and the second coolant flows through the intercooler 21B.

Thus, the first coolant circuit through which the first coolant circulates is formed between the engine 20 and each of the heater core 21A and the turbocharger 21C, and the second coolant circuit through which the second coolant circulates is formed between the radiator 13 and the intercooler 21B.

Figure 12:
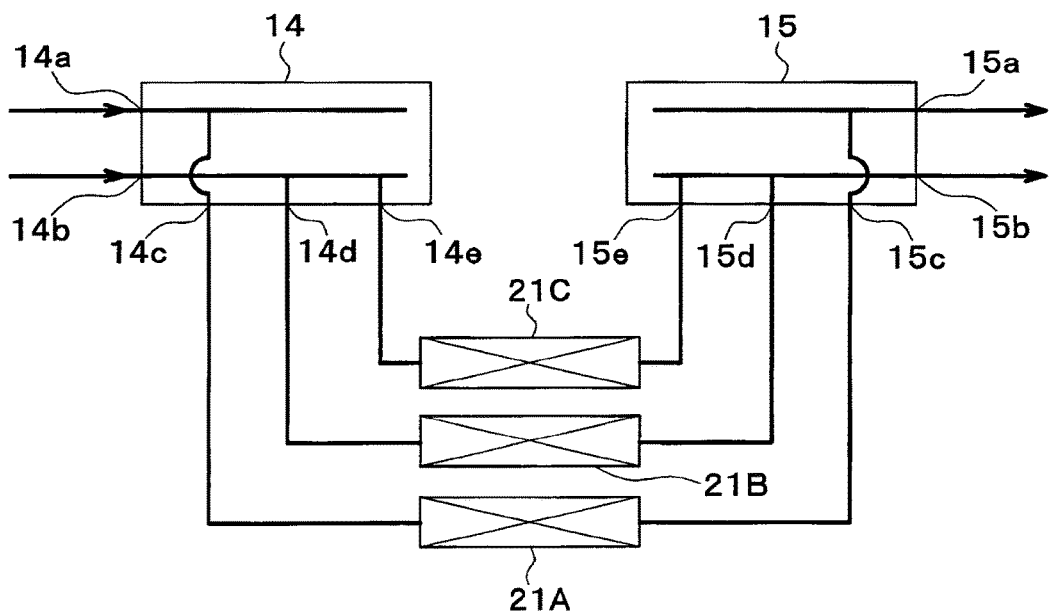
FIG. 12 is a schematic diagram of a seventh mode in the first embodiment.

In the seventh mode shown in FIG. 12, the first switching valve 14 allows the first inlet 14a to communicate with the outlet 14c, and also allows the second inlet 14b to communicate with the outlets 14d and 14e, whereas the second switching valve 15 allows the first outlet 15a to communicate with the inlet 15c, and allows the second outlet 15b to communicate with the inlets 15d and 15e.

In this way, the first coolant flows through the heater core 21A, and the second coolant flows through the intercooler 21B and the turbocharger 21C in parallel.

Thus, the first coolant circuit through which the first coolant circulates is formed between the engine 20 and the heater core 21A, and the second coolant circuit through which the second coolant circulates is formed between the radiator 13 and each of the intercooler 21B and the turbocharger 21C.

Figure 13:
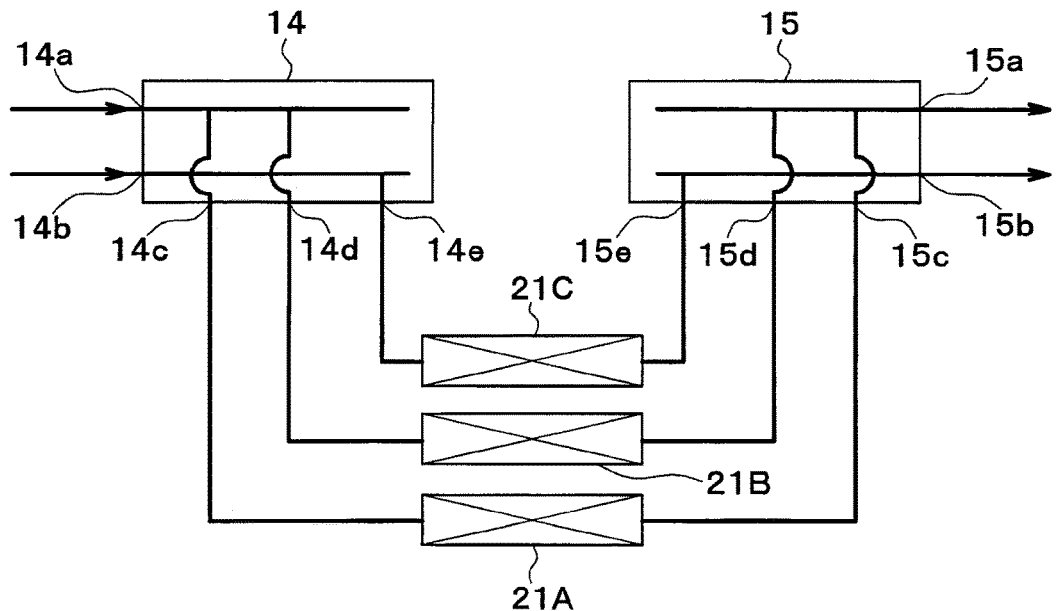
FIG. 13 is a schematic diagram of an eighth mode in the first embodiment.

In the eighth mode shown in FIG. 13, the first switching valve 14 allows the first inlet 14a to communicate with the outlets 14c and 14d, and also allows the second inlet 14b to communicate with the outlet 14e, whereas the second switching valve 15 allows the first outlet 15a to communicate with the inlets 15c and 15d, and also allows the second outlet 15b to communicate with the inlet 15e.

In this way, the first coolant flows through the heater core 21A and the intercooler 21B in parallel, and the second coolant flows through the turbocharger 21C.

Thus, the first coolant circuit through which the first coolant circulates is formed between the engine 20 and each of the heater core 21A and the intercooler 21B, and the second coolant circuit through which the second coolant circulates is formed between the radiator 13 and the turbocharger 21C.

The first to eighth modes shown in FIGS. 6 to 13 are switched from one to another based on switching conditions, including a combination of an air conditioner operating state, an engine operation range, and an engine state.

The air conditioner operating states includes the maximum cooling state shown in FIG. 2, the maximum heating state shown in FIG. 3, and the intermediate air conditioning state shown in FIG. 4. For example, based on the rotation position of the air mix door 38, it is determined to which the air conditioner operating state belongs, among the maximum cooling state, the maximum heating state, and the intermediate air conditioning state.

The engine operation range includes a MBT region and a TK region. It is determined which of the MBT region and the TK region the engine operation range belongs to, based on the number of revolutions of the engine and the engine torque.

Figure 14:
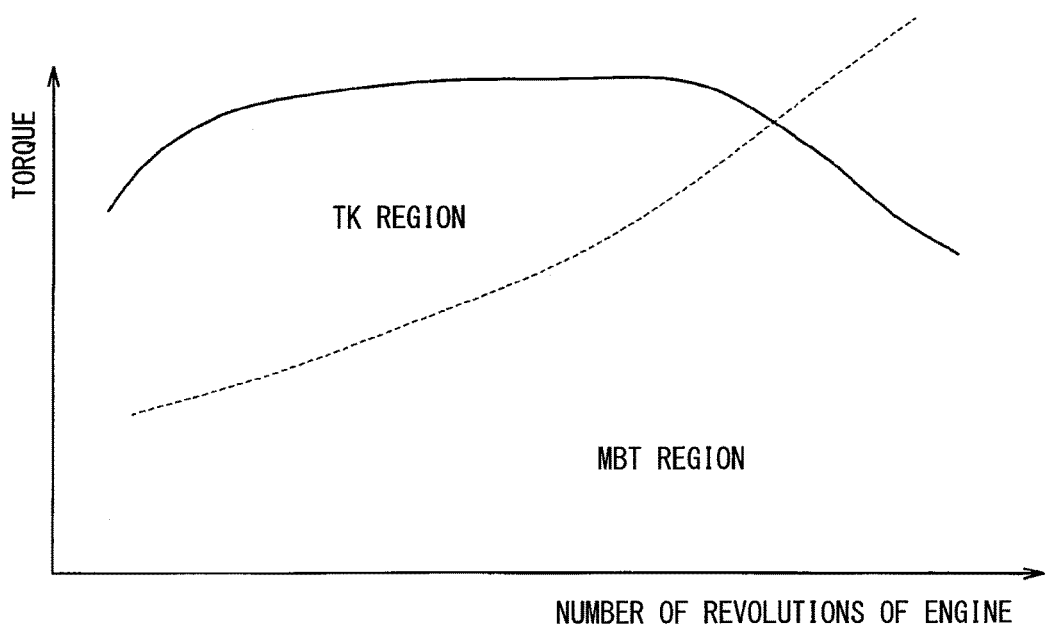
FIG. 14 is a diagram for explaining an engine operation range in the first embodiment.

The MBT region and the TK region will be described below with reference to FIG. 14. A period of time during which the engine generates the maximum torque is hereinafter referred to as the "MBT region". The operation in the MBT region is called a "MBT operation". When intended to prevent the occurrence of knocking under a high load rate of the engine 20, the engine cannot be actuated at the most effective ignition timing (MBT). Such a range is called the "TK region". The operation in the TK region is called a "trace knock (TK) operation".

In general, in the TK region, a thermal management system takes any one of measures, which include decreasing an intake air temperature, the temperature of mixed air, the temperature of engine coolant (especially, on an engine head side), and a flame propagation speed, and promoting combustion as a whole. Thus, such a normal thermal management system can suppress the knocking and advance the ignition so as to get the ignition timing closer to the MBT region as much as possible, thereby improving the engine efficiency. Specifically, the measures include knocking prevention by cooling of intake air, cooling of an engine head, or decreasing a combustion temperature by use of recirculation of exhaust gas (EGR), and promotion of combustion by control of a mixed air flow.

On the other hand, in the MBT region, the thermal management system takes measures, which include increasing an intake air temperature, the head cooling temperature, and combustion speed, and thus can reduce a loss in time, thereby improving the engine efficiency.

The engine states include a cold state, a warming-up completion state, an idle state, and an idle stop state. It is determined which of the cold state and the warming-up completion state the engine is in, for example, based on the temperature of coolant flowing from the engine 20. Whether the engine is in the idle stop state or not is determined, for example, based on the number of revolutions of the engine.

The term "cold state" as used herein means a state in which the engine 20 is cooled at the same temperature as the outside air temperature. The term "warming-up completion state" as used herein means a state in which warming-up of the engine 20 is completed. The term "idle state" as used herein means a state in which the engine 20 rotates at a low load rate at the time of stopping, for example, waiting for a traffic light. The term "idle stop state" as used herein means a state in which the engine 20 temporarily stops at the time of stopping, for example, waiting for a traffic light.

Figures 15, 16:
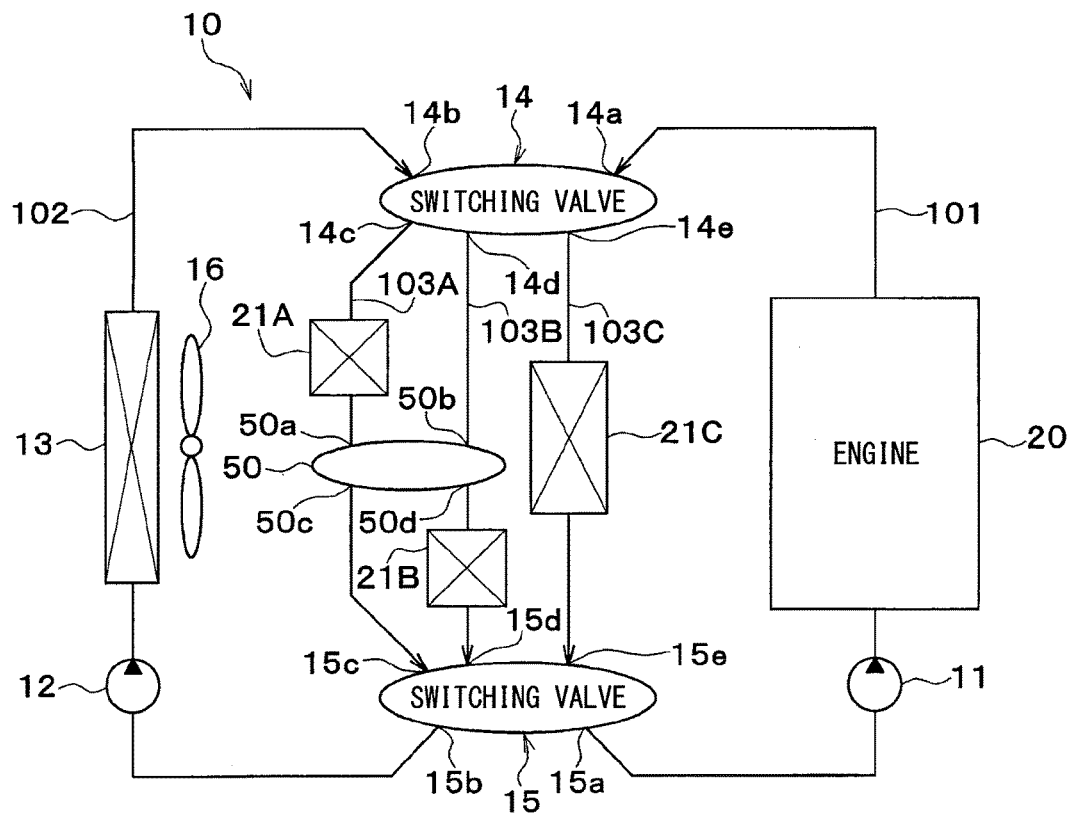
FIG. 15 is a table showing switching conditions for the first to eighth modes in the first embodiment.
FIG. 16 is an entire configuration diagram of a thermal management system for a vehicle according to a second embodiment of the invention.

FIG. 15 shows switching conditions (first to fourteenth switching conditions) including a combination of the air conditioner operating state, the engine operation range, and the engine state. Numeric characters 1 to 14 of FIG. 15 are numbers for the switching conditions.

On the first switching condition, that is, when the air conditioner operating state is the maximum cooling state, the engine operation range is in the MBT region, and the engine state is the cold state, switching is performed to the first mode shown in FIG. 6.

Thus, the second coolant circulates through between the radiator 13 and the heater core 21A, preventing the first coolant circulating through the engine 20 from flowing through the heater core 21A. As a result, the heat of the first coolant is not dissipated from the heater core 21A, which can promote warming-up of the engine 20 in the cold state.

Further, the first coolant circulates through between the engine 20 and the turbocharger 21C, which can use waste heat from the turbocharger 21C to promote the warming-up of the engine 20.

The first coolant circulating through the engine 20 flows through the intercooler 21B, which can heat the intake air with heat of the first coolant. As a result, the intake air temperature of the engine 20 in the MBT region can be increased to improve the engine efficiency.

On the second switching condition, that is, when the air conditioner operating state is the maximum cooling state, the engine operation range is the TK region, and the engine state is the cold state, switching is performed to the second mode shown in FIG. 7.

Like the first switching condition, the first coolant circulating through the engine 20 does not flow through the heater core 21A, which can promote the warming-up of the engine 20 in the cold state. Further, like the first switching condition, the first coolant circulates through between the engine 20 and the turbocharger 21C, which can use waste heat from the turbocharger 21C to promote the warming-up of the engine 20.

The second coolant circulates through between the radiator 13 and the intercooler 21B, so that the second coolant cooled by the radiator 13 flows through the intercooler 21B, thereby cooling the intake air. As a result, the intake air temperature of the engine 20 in the TK region can be decreased to improve the engine efficiency.

In the case of the third switching condition, that is, when the air conditioner operating state is the maximum cooling state, the engine operation range is in the MBT region, and the engine state is the warming-up completion state, switching is performed to the first mode shown in FIG. 6.

Like the first switching condition, the first coolant circulating through the engine 20 flows through the intercooler 21B, which can increase the intake air temperature of the engine 20 in the MBT region to thereby improve the engine efficiency.

The second coolant circulates through between the radiator 13 and the heater core 21A, preventing the first coolant circulating through the engine 20 from flowing through the heater core 21A. Thus, the heat of the first coolant is not dissipated from the heater core 21A, which can prevent the cooled air having passed through the evaporator 33 from being heated by the heater core 21A. As a result, the cooling efficiency in the maximum cooling state can be improved to reduce the power consumption of the compressor 35, thereby improving the fuel efficiency.

In the case of the fourth switching condition, that is, when the air conditioner operating state is the maximum cooling state, the engine operation range is in the TK region, and the engine state is the warming-up completion state, switching is performed to the second mode shown in FIG. 7.

Like the second switching condition, the second coolant circulates through between the radiator 13 and the intercooler 21B, which can decrease the intake air temperature of the engine 20 in the TK region to thereby improve the engine efficiency.

Like the third switching condition, the first coolant circulating through the engine 20 does not flow through the heater core 21A, which can prevent the cooled air having passed through the evaporator 33 from being heated by the heater core 21A, thereby improving the cooling efficiency in the maximum cooling state.

On the fifth switching condition, that is, when the air conditioner operating state is in the maximum cooling state, the engine operation range is in the MBT region, and the engine state is the idle state or idle stop state, switching is performed to the third mode shown in FIG. 8 or the fourth mode shown in FIG. 9.

In this way, the second coolant circulates through between the radiator 13 and the turbocharger 21C, so that the second coolant cooled by the radiator 13 flows through the turbocharger 21C. Thus, the flow rate of the coolant to the turbocharger 21C can be ensured even in the idle stop state to thereby cool the turbocharger 21C.

That is, the first pump 11 is an engine-driven pump. In the idle stop state, that is, when the engine 20 is stopped, the first pump 11 is also stopped not to allow the circulation of the first coolant. On the other hand, the second pump 12 is an electric pump. Even in the idle stop state, the second pump 12 does not stop, thereby enabling the circulation of the second coolant.

In the case of the idle stop state, the turbocharger 21C is connected to the second pump 12 side, which can ensure the flow rate of coolant to the turbocharger 21C to thereby cool the turbocharger 21C.

Like the third switching condition and the like, the first coolant circulating through the engine 20 does not flow through the heater core 21A, so that the cooled air having passed through the evaporator 33 is prevented from being heated by the heater core 21A, thereby improving the cooling efficiency in the maximum cooling state.

As shown in FIG. 8, switching is performed to the third mode, in which the first coolant (high-temperature coolant) circulating through the engine 20 flows through the intercooler 21B, so that the intercooler 21B can heat the intake air. As a result, in the idle state, that is, in the MBT region with a low load rate, the intake air temperature of the engine 20 can be increased to improve the engine efficiency.

When the third mode shown in FIG. 8 is switched to the fourth mode shown in FIG. 9 before the vehicle starts up, the second coolant cooled by the radiator 13 flows through the intercooler 21B, thereby cooling the intake air by the intercooler 21B. Thus, the temperature of the intake air can be reduced upon start-up of the vehicle, that is, when the engine operation range is changed from the MBT region to the TK region. As a result, the engine efficiency upon star-up can be improved to ensure an acceleration response.

On the sixth switching condition, that is, when the air conditioner operating state is the intermediate air conditioning state, the engine operation range is in the MBT region, and the engine state is the cold state, switching is performed to the first mode shown in FIG. 6 or the fifth mode shown in FIG. 10.

That is, when the amount of heat dissipation required for the heater core 21A to perform the air conditioning of the vehicle interior is small, switching is performed to the first mode shown in FIG. 6 to prevent the first coolant circulating through the engine 20 from flowing to the heater core 21A. Thus, the heat of the first coolant is not dissipated by the heater core 21A, which can promote warming-up of the engine 20 in the cold state.

On the other hand, when the amount of heat dissipation required for the heater core 21A to perform the air conditioning of the vehicle interior is large, switching is performed to the fifth mode shown in FIG. 10 to allow the first coolant circulating through the engine 20 to flow to the heater core 21A. Thus, the heat of the first coolant is dissipated by the heater core 21A, so that the air to be blown to the vehicle interior can be heated by the heater core 21A to ensure the necessary blown air temperature.

In the case where the warming-up of the engine 20 is given a higher priority than air conditioning of the vehicle interior, even when the amount of heat dissipation from the heater core 21A that is required for the air conditioning of the vehicle interior is large, switching is performed to the first mode shown in FIG. 6 and not to the fifth mode shown in FIG. 10.

Like the first switching condition, the first coolant circulates through between the engine 20 and the turbocharger 21C, which can use waste heat from the turbocharger 21C to promote the warming-up of the engine 20.

Further, like the first switching condition, the first coolant circulating through the engine 20 flows through the intercooler 21B, which can increase the intake air temperature of the engine 20 in the MBT region to thereby improve the engine efficiency.

On the seventh switching condition, that is, when the air conditioner operating state is the intermediate air conditioning state, the engine operation range is the TK region, and the engine state is the cold state, switching is performed to the second mode shown in FIG. 7 or the sixth mode shown in FIG. 11.

That is, when the amount of heat dissipation required for the heater core 21A to perform the air conditioning of the vehicle interior is small, switching is performed to the second mode shown in FIG. 7 to prevent the first coolant circulating through the engine 20 from flowing to the heater core 21A. Thus, the heat of the first coolant is not dissipated by the heater core 21A, which can promote warming-up of the engine 20 in the cold state.

On the other hand, when the amount of heat dissipation required for the heater core 21A to perform the air conditioning of the vehicle interior is large, switching is performed to the sixth mode shown in FIG. 11 to allow the first coolant circulating through the engine 20 to flow to the heater core 21A. Thus, the heat of the first coolant is dissipated in the heater core 21A, which can heat the air to be blown into the vehicle interior by the heater core 21A to ensure the necessary blown air temperature.

In the case where the warming-up of the engine 20 is given a higher priority than air conditioning of the vehicle interior, even when the amount of heat dissipation from the heater core 21A that is required for the air conditioning of the vehicle interior is large, switching is performed to the second mode shown in FIG. 7 and not to the sixth mode shown in FIG. 11.

Like the second switching condition, the first coolant circulates through between the engine 20 and the turbocharger 21C, which can use waste heat from the turbocharger 21C to promote the warming-up of the engine 20.

Further, like the second switching condition or the like, the second coolant circulates through between the radiator 13 and the intercooler 21B, so that the second coolant cooled by the radiator 13 flows through the intercooler 21B, thereby cooling the intake air. As a result, the intake air temperature of the engine 20 in the TK region can be decreased to improve the engine efficiency.

To promote cooling of intake air in the intercooler 21B, switching is preferably performed to the second mode shown in FIG. 7 rather than the sixth mode shown in FIG. 11, which can dissipate the heat of the intercooler 21B by the heater core 21A. In this case, an opening degree (rotation position) of the air mix door 38 is adjusted to thereby adjust the temperature of air to be blown into the vehicle interior.

On the eighth switching condition, that is, when the air conditioner operating state is the intermediate air conditioning state, the engine operation range is in the MBT region, and the engine state is the warming-up completion state, switching is performed to the first mode shown in FIG. 6 or the fifth mode shown in FIG. 10.

That is, like the sixth switching condition, switching is performed to the first mode shown in FIG. 6 or fifth mode shown in FIG. 10 according to the amount of heat dissipation from the heater core 21A required for the air conditioning of the vehicle interior.

Further, like the first switching condition or the like, the first coolant circulating through the engine 20 flows through the intercooler 21B, which can increase the intake air temperature of the engine 20 in the MBT region to thereby improve the engine efficiency.

When the engine operation range gets closer to the TK region, the first coolant circulating through the engine 20 and the second coolant cooled by the radiator 13 may be mixed together to flow into the intercooler 21B.

In order to be capable of surely cooling the intake air upon shifting of the engine operation range from the MBT region to the TK region, switching is preferably performed to the first mode shown in FIG. 6 rather than the fifth mode shown in FIG. 10, so that the second coolant cooled by the radiator 13 can be further cooled by the heater core 21A. Thus, when the engine operation range is shifted from the MBT region to the TK region, the second coolant sufficiently cooled can flow through the intercooler 21B to surely cool the intake air.

On the ninth switching condition, that is, when the air conditioner operating state is the intermediate air conditioning state, the engine operation range is the TK region, and the engine state is the warming-up completion state, switching is performed to the second mode shown in FIG. 7 or the sixth mode shown in FIG. 11.

That is, like the seventh switching condition, switching is performed to the second mode shown in FIG. 7 or sixth mode shown in FIG. 11 according to the amount of heat dissipation from the heater core 21A required for the air conditioning of the vehicle interior.

Further, like the second switching condition or the like, the second coolant circulates through between the radiator 13 and the intercooler 21B, so that the second coolant cooled by the radiator 13 flows through the intercooler 21B, thereby cooling the intake air. As a result, the intake air temperature of the engine 20 in the TK region can be decreased to improve the engine efficiency.

Like the seventh switching condition, to promote cooling of intake air in the intercooler 21B, switching is preferably performed to the second mode shown in FIG. 7 rather than the sixth mode shown in FIG. 11, which can dissipate the heat of the intercooler 21B by the heater core 21A. In this case, an opening degree (rotation position) of the air mix door 38 is adjusted or controlled to adjust the blown air temperature of air to be blown into the vehicle interior.

On the tenth switching condition, that is, when the air conditioner operating state is the intermediate air conditioning state, the engine operation range is in the MBT region, and the engine state is the idle state or idle stop state, switching is performed to the fourth mode shown in FIG. 9 or the seventh mode shown in FIG. 12.

In this way, like the fifth switching condition, the second coolant circulates through between the radiator 13 and the turbocharger 21C, so that the second coolant cooled by the radiator 13 flows through the turbocharger 21C. Thus, the flow rate of the coolant to the turbocharger 21C can be ensured even in the idle stop state to thereby cool the turbocharger 21C.

When the amount of dissipated heat required for the heater core 21A to perform the air conditioning of the vehicle interior is small, switching is performed to the fourth mode shown in FIG. 9 to allow the second coolant cooled by the radiator 13 to flow through the heater core 21A. Thus, the amount of heat dissipation into the second coolant at the heater core 21A can be set smaller than that of heat dissipation occurring when the first coolant circulating through the engine 20 flows through the heater core 21A.

On the other hand, when the amount of heat dissipation required for the heater core 21A to perform the air conditioning of the vehicle interior is large, switching is performed to the seventh mode shown in FIG. 12 to allow the first coolant circulating through the engine 20 to flow through the heater core 21A. Thus, the amount of heat dissipation into the first coolant at the heater core 21A can be set larger than that of heat dissipation occurring when the second coolant cooled by the radiator 13 flows through the heater core 21A.

In order to improve the acceleration response upon start-up, switching is preferably performed to the fourth mode shown in FIG. 9 rather than the seventh mode shown in FIG. 12, so that the second coolant cooled by the radiator 13 can be further cooled by the heater core 21A. Thus, upon start-up, that is, when the engine operation range is shifted from the MBT region to the TK region, the second coolant sufficiently cooled can flow through the intercooler 21B to surely cool the intake air.

On the tenth switching condition, switching may be performed to the third mode shown in FIG. 8 or the eighth mode shown in FIG. 13, instead of the fourth mode shown in FIG. 9 or the seventh mode shown in FIG. 12. That is, in the tenth switching condition, either the first coolant circulating through the engine 20 or the second coolant cooled by the radiator 13 may flow through the intercooler 21B.

On the eleventh switching condition, that is, when the air conditioner operating state is the maximum heating state, the engine operation range is in the MBT region, and the engine state is the cold state, switching is performed to the fifth mode shown in FIG. 10.

Thus, the first coolant circulating through the engine 20 flows through the heater core 21A, so that the heat of the first coolant is dissipated by the heater core 21A. As a result, the air to be blown into the vehicle interior is heated by the heater core 21A, so that warm air can be blown to the vehicle interior.

When the first coolant is at a very low temperature (for example, of 40° C. or less) immediately after the start-up of the engine 20, the blown air temperature is not raised sufficiently and thus a passenger cannot feel warm even though the air to be blown into the vehicle interior is heated by the heater core 21A. In this case, switching may be performed to the first mode shown in FIG. 6, in which the first coolant does not flow through the heater core 21A to promote the warming-up of the engine 20 in the cold state.

Further, like the first switching condition or the like, the first coolant circulating through the engine 20 flows through the intercooler 21B, which can increase the intake air temperature of the engine 20 in the MBT region to thereby improve the engine efficiency.

In order not to excessively deprive the heat from the first coolant in the intercooler 21B, the amount of heat exchange at the intercooler 21B is preferably adjusted, for example, by restricting the flow rate of the first coolant flowing through the intercooler 21B.

The first coolant circulates through between the turbocharger 21C and each of the engine 20, heater core 21A, and intercooler 21B, so that the waste heat of the turbocharger 21C can be used to warm-up the engine 20, heat the vehicle interior, and heat the intake air.

On the twelfth switching condition, that is, when the air conditioner operating state is the maximum heating state, the engine operation range is the TK region, and the engine state is the cold state, switching is performed to the sixth mode shown in FIG. 11.

Thus, like the eleventh switching condition, the first coolant circulating through the engine 20 can flow through the heater core 21A to heat the air to be blown into the vehicle interior by the heater core 21A, thereby blowing the warm air to the interior. For the same reason as the eleventh switching condition, when the first coolant is at a very low temperature (for example, of 40° C. or less) immediately after the start-up of the engine 20, switching may be performed to the second mode shown in FIG. 7, in which the first coolant does not flow through the heater core 21A to promote the warming-up of the engine 20 in the cold state.

Further, like the second switching condition or the like, the second coolant circulates through between the radiator 13 and the intercooler 21B, so that the second coolant cooled by the radiator 13 flows through the intercooler 21B, thereby cooling the intake air. As a result, the intake air temperature of the engine 20 in the TK region can be decreased to improve the engine efficiency.

When the intake air is excessively cooled by the intercooler 21B, the amount of heat exchanger at the intercooler 21B is preferably adjusted by restricting the flow rate of the second coolant flowing through the intercooler 21B or the like.

The first coolant circulates through between the turbocharger 21C and each of the engine 20 and the heater core 21A, so that the waste heat from the turbocharger 21C can be used to warm-up the engine 20 and heat the vehicle interior.

On the thirteenth switching condition, that is, when the air conditioner operating state is the maximum heating state, the engine operation range is in the MBT region, and the engine state is the warming-up completion state, switching is performed to the fifth mode shown in FIG. 10.

Thus, like the eleventh switching condition or the like, the first coolant (high-temperature coolant) circulating through the engine 20 can flow through the heater core 21A to heat the air to be blown into the vehicle interior by the heater core 21A, thereby blowing the warm air to the interior.

Further, like the first switching condition or the like, the first coolant circulating through the engine 20 flows through the intercooler 21B, which can increase the intake air temperature of the engine 20 in the MBT region to thereby improve the engine efficiency.

When the engine operation range gets close to the TK region, the amount of heat exchange at the intercooler 21B is preferably adjusted by restricting the flow rate of the second coolant flowing through the intercooler 21B or the like.

The first coolant circulates through between the turbocharger 21C and each of the heater core 21A and the intercooler 21B, so that the exhaust heat from the turbocharger 21C can be used to heat the vehicle interior and the intake air.

On the fourteenth switching condition, that is, when the air conditioner operating state is the maximum heating state, the engine operation range is the TK region, and the engine state is the warming-up completion state, switching is performed to the sixth mode shown in FIG. 11.

Thus, like the eleventh switching condition or the like, the first coolant circulating through the engine 20 can flow through the heater core 21A to heat the air to be blown into the vehicle interior by the heater core 21A, thereby blowing the warm air to the interior.

Further, like the second switching condition or the like, the second coolant circulates through between the radiator 13 and the intercooler 21B, so that the second coolant cooled by the radiator 13 flows through the intercooler 21B, thereby cooling the intake air. As a result, the intake air temperature of the engine 20 in the TK region can be decreased to improve the engine efficiency.

When the intake air is excessively cooled by the intercooler 21B, the amount of heat exchange at the intercooler 21B is preferably adjusted by restricting the flow rate of the second coolant flowing through the intercooler 21B or the like.

The first coolant circulates through between the turbocharger 21C and the heater core 21A, so that the waste heat from the turbocharger 21C can be used to heat the vehicle interior.

On the fifteenth switching condition, that is, when the air conditioner operating state is the maximum cooling state, the engine operation range is in the MBT region, and the engine state is the idle state or idle stop state, switching is performed to the eighth mode shown in FIG. 13.

Thus, like the eleventh switching condition or the like, the first coolant circulating through the engine 20 can flow through the heater core 21A to heat the air to be blown into the vehicle interior by the heater core 21A, thereby blowing the warm air to the interior.

Further, like the first switching condition or the like, the first coolant circulating through the engine 20 flows through the intercooler 21B, so that in the idle state, or at a low load rate of the engine 20, the intake air temperature of the engine 20 in the MBT region can be increased to improve the engine efficiency.

In order to improve the acceleration response upon start-up, switching is preferably performed to the seventh mode shown in FIG. 12 rather than the eighth mode shown in FIG. 13, so that the second coolant cooled by the radiator 13 flows through the intercooler 21B to cool the intake air. Thus, upon start-up, that is, when the engine operation range is shifted from the MBT region to the TK region, the intake air temperature can be reduced to improve the engine efficiency upon start-up, thereby ensuring the acceleration response.

Like the fifth switching condition or the like, the second coolant circulates through between the radiator 13 and the turbocharger 21C, so that the second coolant cooled by the radiator 13 flows through the turbocharger 21C. Thus, the flow rate of the coolant to the turbocharger 21C can be ensured even in the idle stop state to thereby cool the turbocharger 21C.

When the outside air temperature is low, for example, in winter or the like, the first coolant is less likely to boil with waste heat from the turbocharger 21C even though the turbocharger 21C is connected to the first pump 11 side. For this reason, switching may be performed to the fifth mode shown in FIG. 10, instead of the eighth mode shown in FIG. 13.

In this embodiment, the first switching valve 14 and the second switching valve 15 are cooperatively operated to form two coolant circuits (heat medium circuits). Specifically, the first coolant circuit through which the first coolant circulates is formed between the first pump 11 and a predetermined target device for heat exchange, and the second coolant circuit through which the second coolant circulates is formed between the second pump 12 and another predetermined target device for heat exchange.

Among the respective target devices for heat exchange included in the first target device group 21 for heat exchange, switching can be performed between the state of circulation of the first coolant with respect to the first pump 11, and the state of circulation of the second coolant with respect to the second pump 12. Such a simple structure can switch the coolant circulating through each of the target devices for heat exchange.

In this embodiment as described in the paragraphs regarding the fifth, tenth, and fifteenth switching conditions, when the engine is in the idle stop state, the turbocharger 21C is connected to the second coolant circuit on the second pump 12 side, so that the turbocharger 21C can be cooled even in the idle stop state. Thus, the engine 20 does not need to be operated so as to allow the circulation of the coolant through the turbocharger 21C, which can improve the fuel efficiency.

Further, the turbocharger 21C is connected to the second coolant circuit, and the intercooler 21B is connected to the first coolant circuit, whereby the coolant heated by the waste heat from the turbocharger 21C does not flow into the intercooler 21B. Thus, the turbocharger 21C, which becomes at a very high temperature upon receiving the exhaust gas from the engine 20, can avoid inhibition of cooling the intake air.

In this embodiment as described in the phrases regarding the first, second, sixth, seventh, eleventh, and twelfth switching conditions, when the engine is in the cold state, the first coolant circulating through the engine 20 does not flow through the heater core 21A, which can promote the warming-up of the engine 20 while avoiding the dissipation of the heat from the first coolant at the heater core 21A. Further, the first coolant circulates through the turbocharger 21C, which can use waste heat from the turbocharger 21C to promote the warming-up of the engine 20. The first coolant flows through the intercooler 21B, so that the intake air can be heated with the heat of the first coolant, thereby increasing the intake air temperature to promote the warming-up of the engine 20.

In this embodiment as described in the phrases regarding the first to fifth switching conditions, when the air conditioner operating state is the maximum cooling state, the first coolant circulating through the engine 20 does not flow through the heater core 21A, which can avoid the dissipation of the heat from the first coolant at the heater core 21A. Thus, the cold air having passed through the evaporator 33 can be suppressed from being heated by the heater core 21A, thereby improving the cooling efficiency in the maximum cooling state.

Second Embodiment

In the second embodiment, as shown in FIG. 16, a serial-parallel switching valve 50 (serial-parallel switching device) is additionally provided for switching between serial and parallel connections of the heater core 21A and intercooler 21B, as compared to the first embodiment.

The serial-parallel switching valve 50 includes two inlets 50a and 50b as an inlet for the coolant, and two outlets 50c and 50d as an outlet for the coolant. The inlet 50a of the serial-parallel switching valve 50 is connected to the coolant outlet side of the heater core 21A. The inlet 50b of the serial-parallel switching valve 50 is connected to the outlet 14c of the first switching valve 14.

The outlet 50c of the serial-parallel switching valve 50 is connected to the inlet 15c of the second switching valve 15. The outlet 50d of the serial-parallel switching valve 50 is connected to the coolant inlet side of the intercooler 21B.

Figure 17:
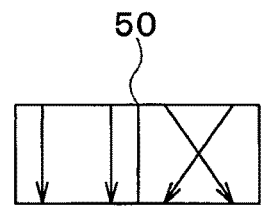
FIG. 17 is a schematic diagram of an example of a serial-parallel switching valve shown in FIG. 1.
Figure 18:
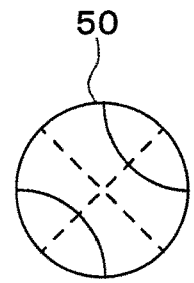
FIG. 18 is a schematic diagram of another example of a serial-parallel switching valve shown in FIG. 1.
Figure 19:
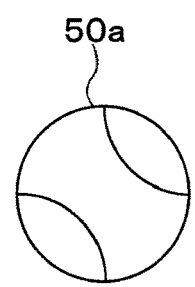
FIG. 19 is a schematic diagram of an upper stage of a serial-parallel switching valve shown in FIG. 19.
Figure 20:
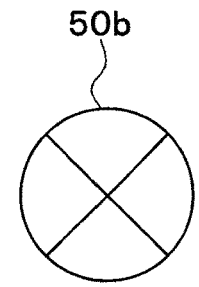
FIG. 20 is a schematic diagram of a lower stage of a serial-parallel switching valve shown in FIG. 19.

The serial-parallel switching valve 50 is constructed of a spool valve shown in FIG. 17 or a rotary four-way valve shown in FIG. 18. The serial-parallel switching valve 50, for example, constructed of the rotary four-way valve has a laminated structure having an upper stage 50a shown in FIG. 19 and a lower stage 50b shown in FIG. 20. The switching valve 50 can switch the flow path by being rotated by 45°.

Now, a description will be given of switching modes for a coolant flow with respect to the heater core 21A and the intercooler 21B.

Figure 21:
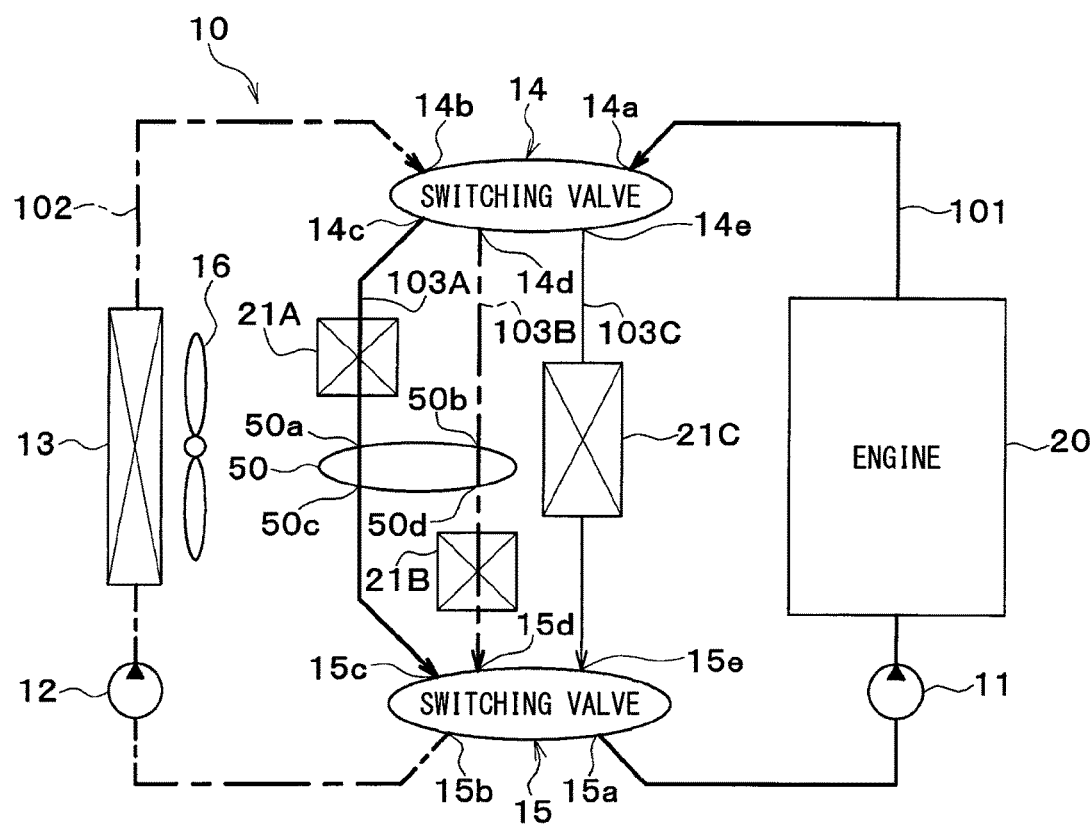
FIG. 21 is a schematic diagram of a first parallel flow mode in a second embodiment of the invention.

Among the above-mentioned first to fourteenth switching conditions, on the twelfth and fourteenth switching conditions, the first switching valve 14, second switching valve 15, and serial-parallel switching valve 50 are switched to achieve a first parallel flow mode shown in FIG. 21.

Thus, as indicated by a thick solid line of FIG. 21, the first coolant circulating through the engine 20 flows through the heater core 21A. As indicated by a thick alternate long and short dash line of FIG. 21, the second coolant cooled by the radiator 13 flows through the intercooler 21B.

Figure 22:
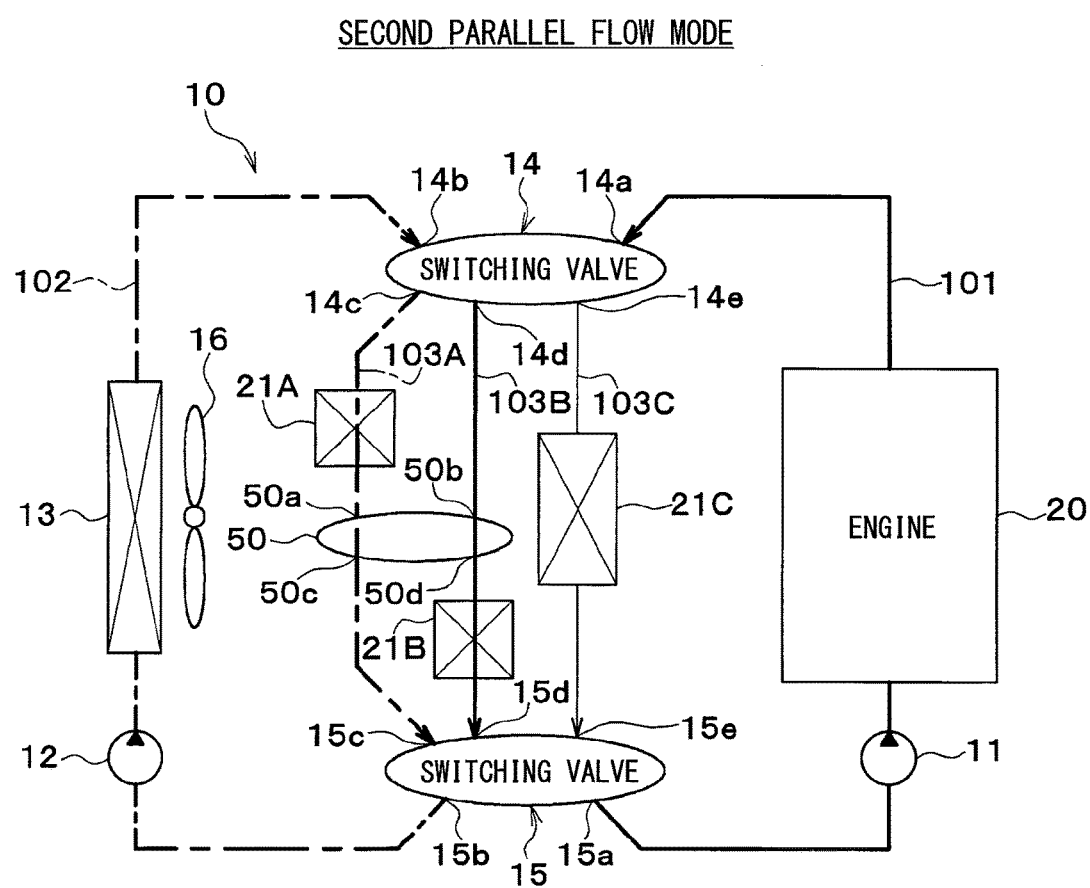
FIG. 22 is a schematic diagram of a second parallel flow mode in the second embodiment.

On the first, third, fifth, sixth, eighth, and eleventh switching conditions, the first switching valve 14, second switching valve 15, and serial-parallel switching valve 50 are switched to achieve a second parallel flow mode shown in FIG. 22.

Thus, as indicated by the thick solid line of FIG. 21, the first coolant circulating through the engine 20 flows through the intercooler 21B. As indicated by the thick alternate long and short dash line of FIG. 21, the second coolant cooled by the radiator 13 flows through the heater core 21A.

Figure 23:
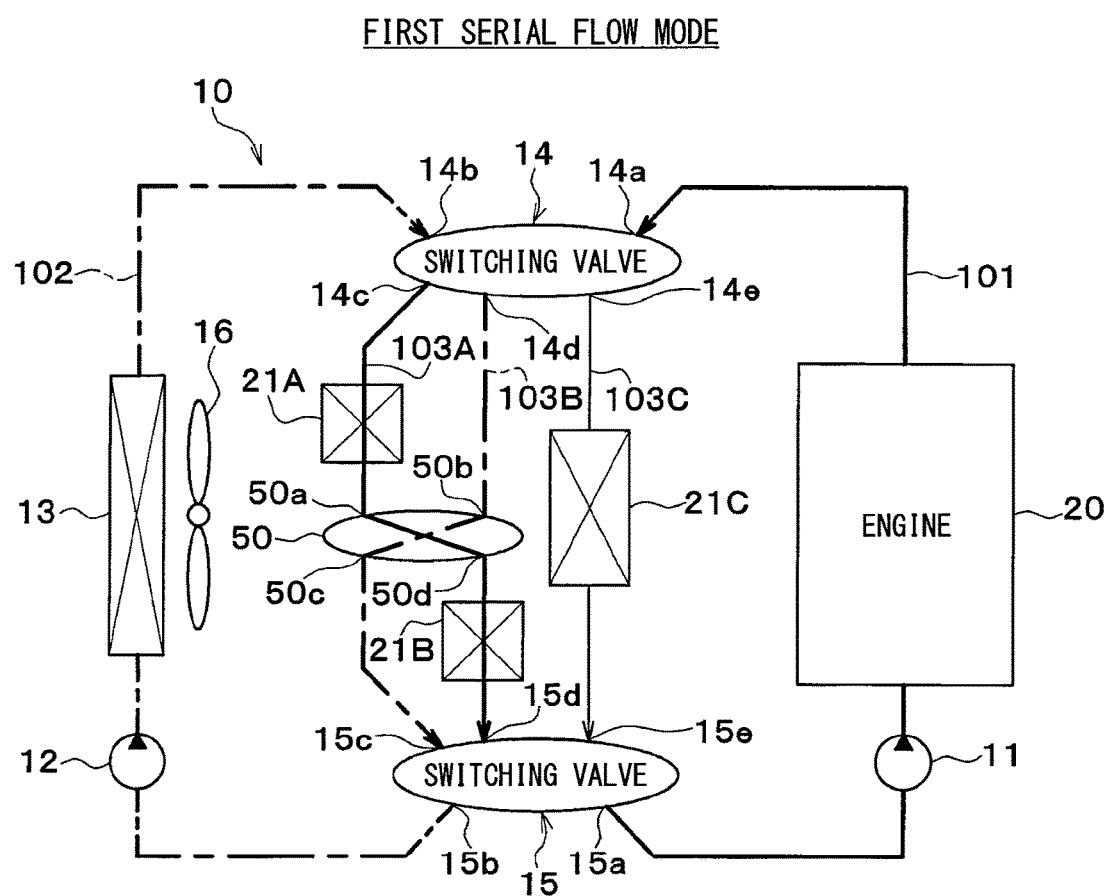
FIG. 23 is a schematic diagram of a first serial flow mode in the second embodiment.

On the eleventh, thirteenth, and fifteenth switching conditions, the first switching valve 14, second switching valve 15, and serial-parallel switching valve 50 are switched to achieve a first serial flow mode shown in FIG. 23.

Thus, as indicated by the thick solid line of FIG. 23, the first coolant circulating through the engine 20 flows through the heater core 21A and the intercooler 21B in series. As indicated by a thick alternate long and short dash line of FIG. 23, the second coolant cooled by the radiator 13 does not flow through the heater core 21A and the intercooler 21B.

Figure 24:
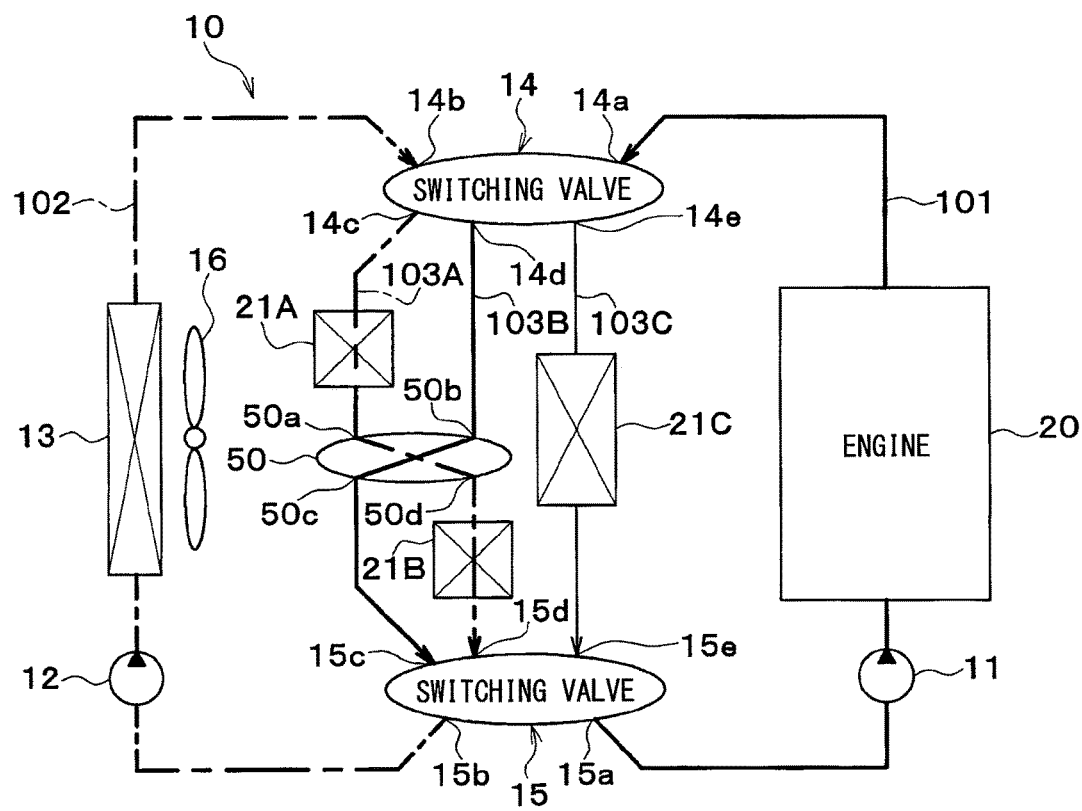
FIG. 24 is a schematic diagram of a second serial flow mode in the second embodiment.

On the second, fourth, seventh, ninth, tenth, thirteenth, and fifteenth switching conditions, the first switching valve 14, second switching valve 15, and serial-parallel switching valve 50 are switched to achieve a second serial-flow mode shown in FIG. 24.

Thus, as indicated by the thick solid line of FIG. 24, the first coolant circulating through the engine 20 does not flow through the heater core 21A and the intercooler 21B. As indicated by the thick alternate long and short dash line of FIG. 24, the second coolant cooled by the radiator 13 flows through the heater core 21A and the intercooler 21B in series.

Although not shown, on the fifth, tenth, and fifteenth switching conditions, the second coolant cooled by the radiator 13 flows through the turbocharger 21C.

In this embodiment, when then the air conditioner operating state is the intermediate air conditioning state, the coolant cooled by the heater core 21A can flow directly into the intercooler 21B, so that the temperature of the coolant flowing into the intercooler 21B can be decreased to improve the intake air cooling performance, as compared to the case where the coolant flows in parallel to the heater core 21A and intercooler 21B.

Third Embodiment

Figure 25:
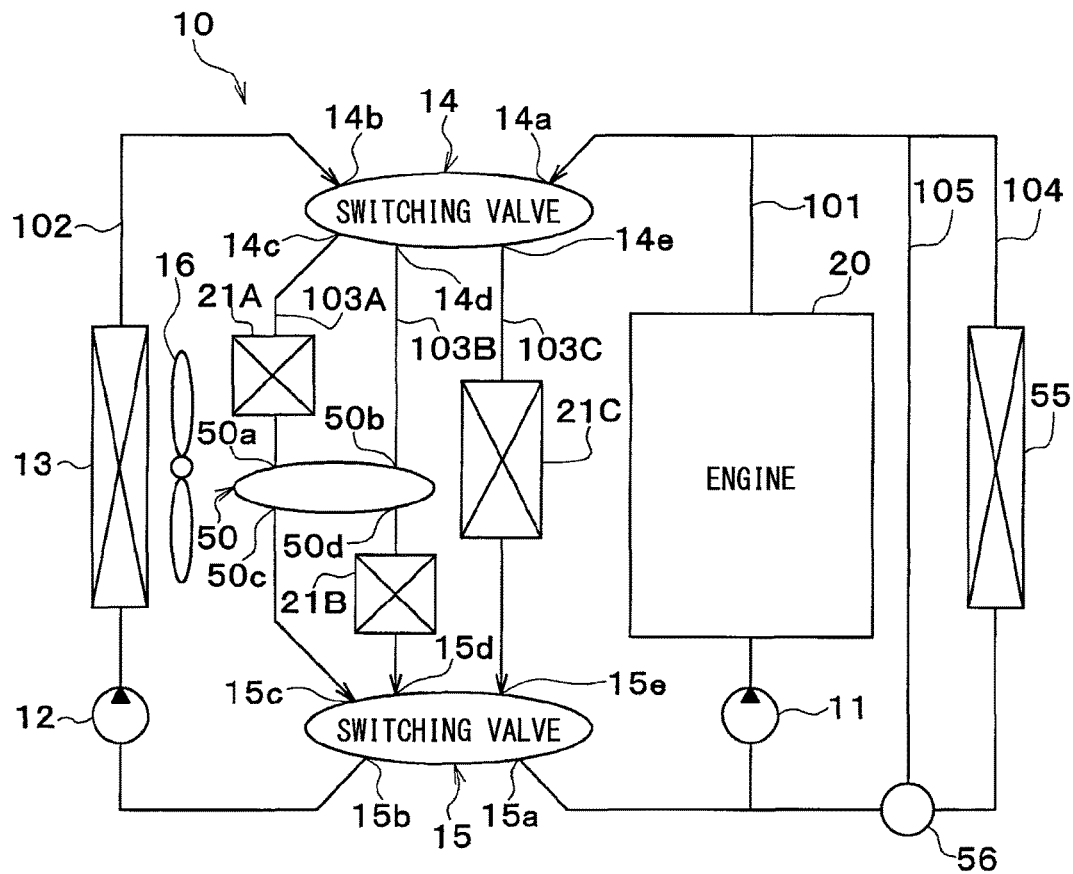
FIG. 25 is an entire configuration diagram of a thermal management system for a vehicle according to a third embodiment of the invention.

In a third embodiment, as shown in FIG. 25, a first engine bypass flow path 104 and a second engine bypass flow path 105 are added with respect to the structure of the second embodiment. The first engine bypass path 104 and the second engine bypass flow path 105 are flow paths through which the coolant flows bypassing the engine 20.

The first engine bypass flow path 104 is provided with a radiator 55 for the engine. The radiator 55 for the engine is a heat exchanger for the engine (or a heat exchanger for an internal combustion engine) that exchanges heat between the outside air and the coolant circulating through the engine 20 (hereinafter referred to as an engine coolant) to thereby cool the engine coolant.

The flows of the coolant through the first engine bypass flow path 104 and through the second engine bypass flow path 105 are discontinuously switched by a three-way valve 56. That is, the three-way valve 56 is a flow path switch (first flow path switch) for selectively switching between the flow of the engine coolant through the first engine bypass flow path 104 and the flow of the engine coolant through the second engine bypass flow path 105.

Figure 26:
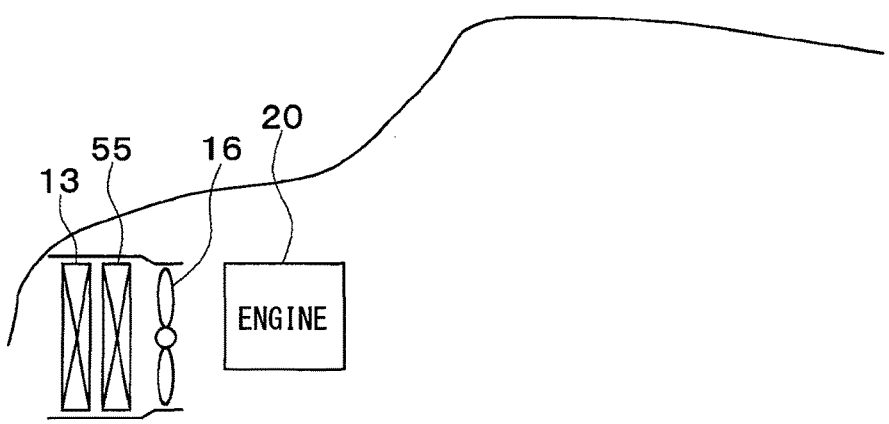
FIG. 26 is an exemplary diagram for explaining the state of mounting a radiator for an engine shown in FIG. 25 on a vehicle.

As shown in FIG. 26, the radiator 55 for the engine is disposed at the forefront part of the vehicle, and behind the radiator 13 (on the downstream side of the outside air flow).

When the engine coolant flows through the first engine bypass flow path 104, the engine coolant dissipates heat into the outside air via the radiator 55 for the engine to be cooled. When the engine coolant flows through the second engine bypass flow path 105, the engine coolant does not dissipate heat into the outside air by the radiator 55 for the engine not to be cooled.

In this way, this embodiment can adjust a heat dissipation capacity (cooling capacity) with respect to the engine coolant. For example, when the temperature of the engine coolant is higher than a predetermined temperature, this embodiment has a large heat dissipation capacity for the engine coolant by allowing the engine coolant to flow through the first engine bypass flow path 104. When the temperature of the engine coolant is lower than a predetermined temperature, this embodiment has a low heat dissipation capacity for the engine coolant by allowing the engine coolant to flow through the second engine bypass flow path 105.

Fourth Embodiment

In a fourth embodiment, as shown in FIG. 27, the serial-parallel switching valve 50 is integrated with the first switching valve 14 and the second switching valve 15, as compared to the second embodiment.

The first switching valve 14 is provided with a first inlet flow path 141 in communication with the first inlet 14a, and a second inlet flow path 142 in communication with the second inlet 14b. The second switching valve 15 is provided with a first outlet flow path 151 in communication with the first outlet 15a, and a second outlet flow path 152 in communication with the second outlet 15b.

The serial-parallel switching valve 50 includes a first communication flow path 501, a second communication flow path 502, a first valve body 503, and a second valve body 504.

The first communication flow path 501 is a flow path for bringing the outlet 14d of the first switching valve 14 into communication with the first outlet flow path 151 of the second switching valve 15. The second communication flow path 502 is a flow path for bringing the outlet 14d of the first switching valve 14 into communication with the second outlet flow path 152 of the second switching valve 15. The first valve body 503 is a valve for opening/closing the first communication flow path 501. The second valve body 504 is a valve for opening/closing the second communication flow path 502.

Among the above-mentioned first to fourteenth switching conditions, on the twelfth and fourteenth switching conditions, the first switching valve 14, second switching valve 15, and serial-parallel switching valve 50 are switched to achieve a first parallel flow mode shown in FIG. 28. Thus, the first coolant circulating through the engine 20 flows through the heater core 21A, and the second coolant cooled by the radiator 13 flows through the intercooler 21B.

Figure 29:
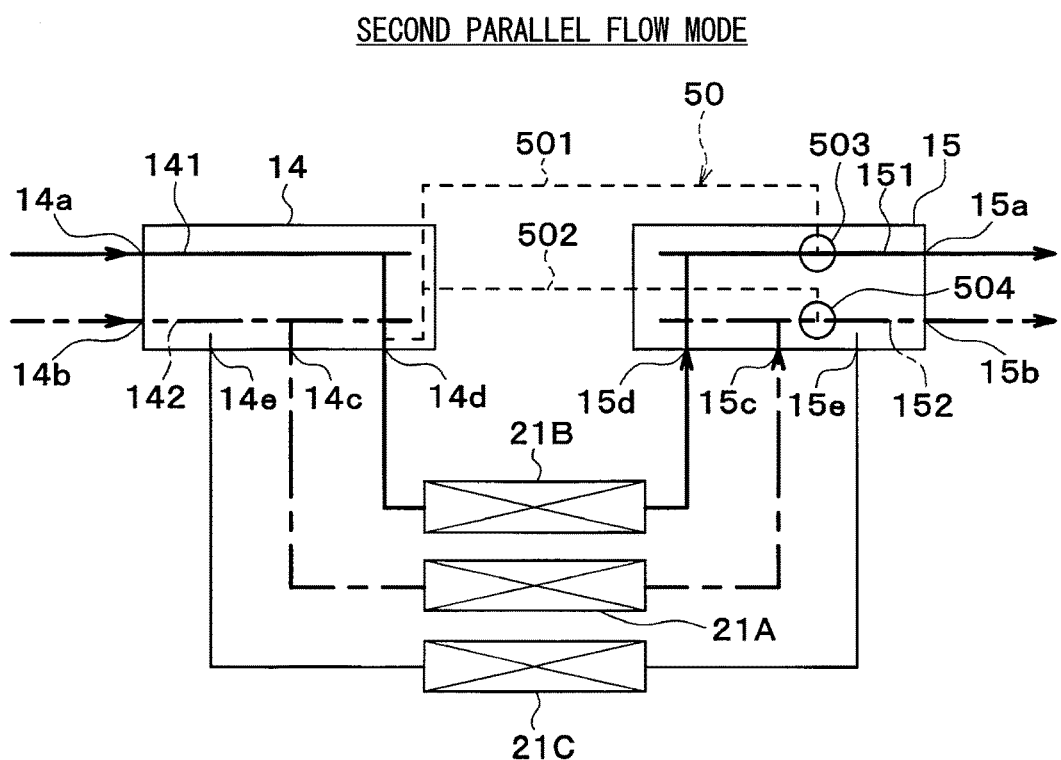
FIG. 29 is a schematic diagram of a second parallel flow mode in the fourth embodiment of the invention.

On the first, third, fifth, sixth, eighth, and eleventh switching conditions, the first switching valve 14, second switching valve 15, and serial-parallel switching valve 50 are switched to achieve a second parallel flow mode shown in FIG. 29. Thus, the first coolant circulating through the engine 20 flows through the intercooler 21B, and the second coolant cooled by the radiator 13 flows through the heater core 21A.

Figure 30:
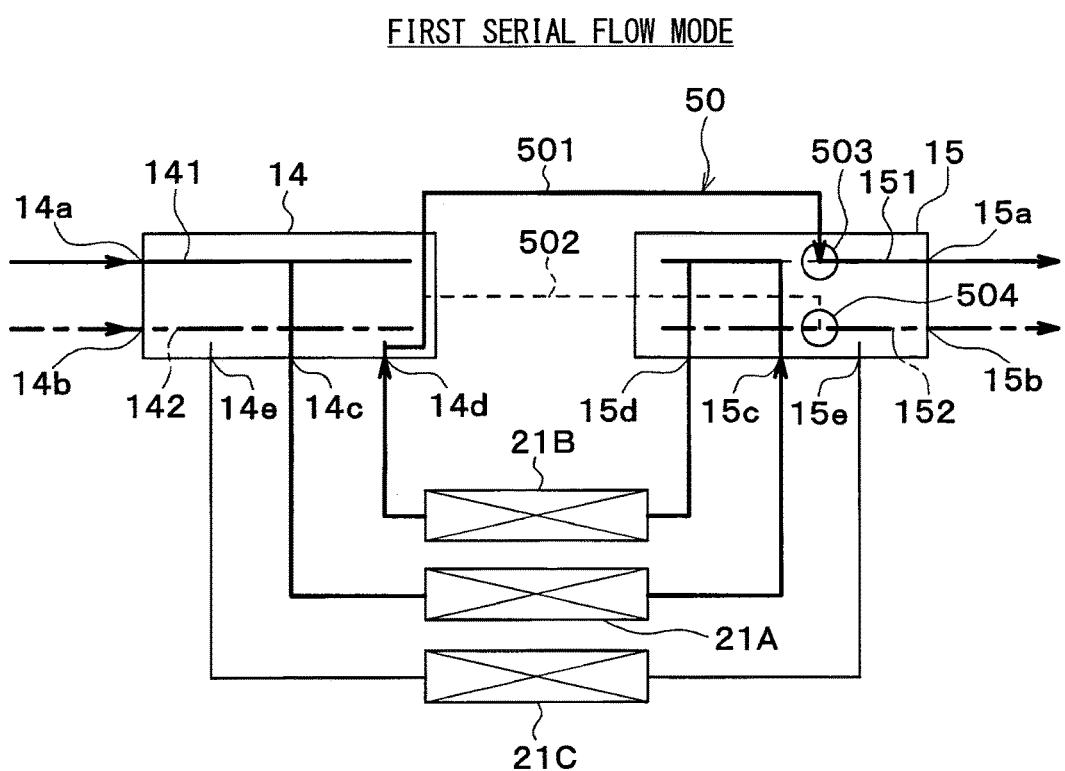
FIG. 30 is a schematic diagram of a first serial flow mode in the fourth embodiment.

On the eleventh, thirteenth, and fifteenth switching conditions, the first switching valve 14, second switching valve 15, and serial-parallel switching valve 50 are switched to achieve a first serial flow mode shown in FIG. 30. Thus, the first coolant circulating through the engine 20 flows through the heater core 21A and the intercooler 21B in series, and the second coolant cooled by the radiator 13 does not flow through the heater core 21A and the intercooler 21B.

Figure 31:
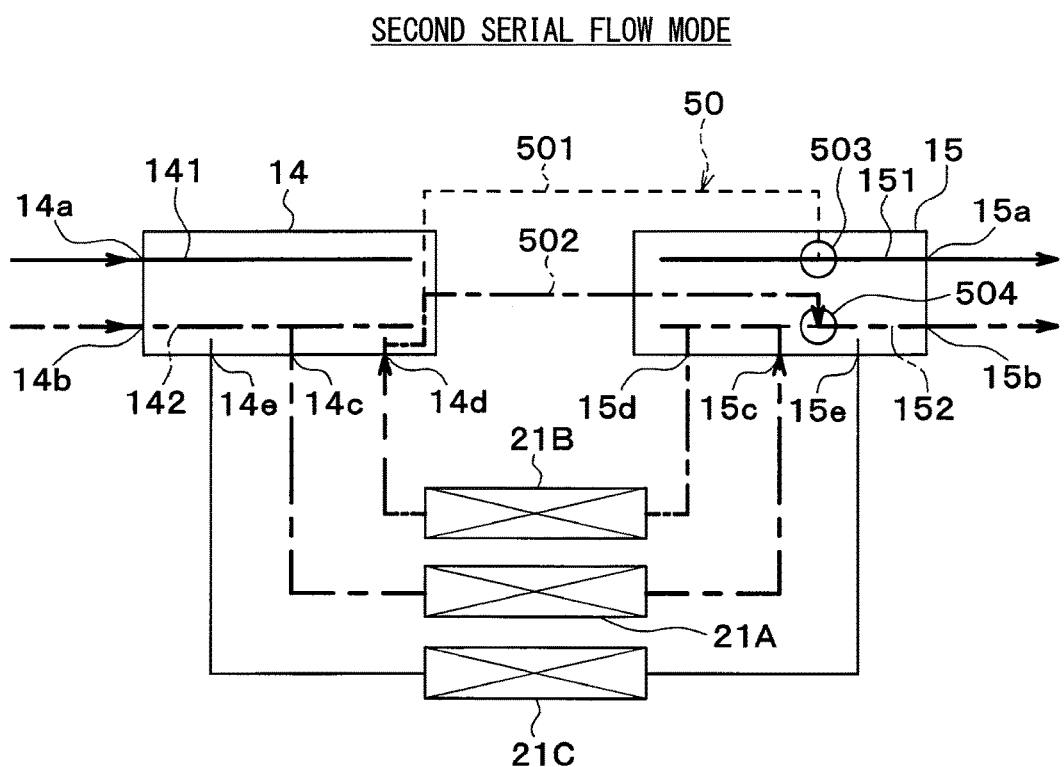
FIG. 31 is a schematic diagram of a second serial flow mode in the fourth embodiment.

On the second, fourth, seventh, ninth, tenth, thirteenth, and fifteenth switching conditions, the first switching valve 14, second switching valve 15, and serial-parallel switching valve 50 are switched so as to achieve a second serial-flow mode shown in FIG. 31. Thus, the first coolant circulating through the engine 20 does not flow through the heater core 21A and the intercooler 21B, and the second coolant cooled by the radiator 13 flows through the heater core 21A and the intercooler 21B in series.

When the engine is in the idle stop state, the second coolant cooled by the radiator 13 flows through the turbocharger 21C. On the other hand, when the engine is not in the idle stop state (when the engine 20 is operating), the first coolant circulating through the engine 20 flows to the turbocharger 21C.

According to this embodiment, the serial-parallel switching valve 50 is integrated with the first switching valve 14 and the second switching valve 15, which can reduce the body size of the vehicle thermal management system 10, thereby improving the mountability of the system on the vehicle.

In this embodiment, as can be seen from the comparison between FIGS. 28 and 29, and FIGS. 30 and 31, the flow of the coolant flowing through the intercooler 21B in the serial connection of the heater core 21A and intercooler 21B is reversed to that of the coolant flowing through the intercooler 21B in the parallel connection thereof.

Fifth Embodiment

Figure 32:
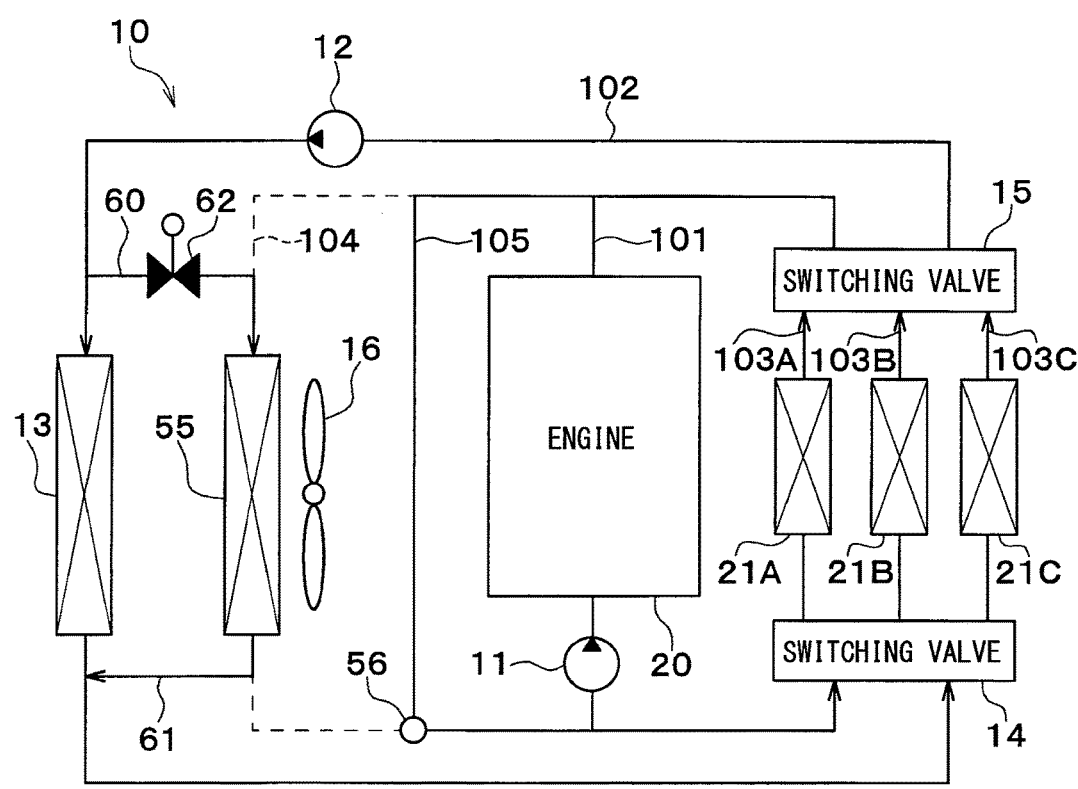
FIG. 32 is an entire configuration diagram of a vehicle thermal management system according to a fifth embodiment of the invention.

Although in the third embodiment, the radiator 55 for the engine is constantly connected to a high-temperature coolant circuit on the first pump 11 side, as shown in FIG. 32, in a fifth embodiment, the radiator 55 for the engine is switchable between the high-temperature coolant circuit on the first pump 11 side and the intermediate-temperature coolant circuit on the second pump 12 side.

For example, a first communication flow path 60, a second communication flow path 61, and an opening/closing valve 62 are added to the structure of the fourth embodiment.

The first communication flow path 60 is a flow path for connecting an upstream side of the coolant flow of the radiator 13 in a radiator side flow path 102 to an upstream side of the coolant flow of the radiator 55 for the engine in the first engine bypass flow path 104.

The second communication flow path 61 is a flow path for connecting a downstream side of the coolant flow of the radiator 13 in the radiator side flow path 102 to a downstream side of the coolant flow of the radiator 55 for the engine in the first engine bypass flow path 104.

The opening/closing valve 62 is an opening/closing device for opening/closing the first communication flow path 60. When the opening/closing valve 62 opens the first communication flow path 60, the coolant discharged from the second pump 12 flows through the radiator 55 for the engine. When the opening/closing valve 62 closes the first communication flow path 60, the coolant discharged from the second pump 12 does not flow through the radiator 55 for the engine. Thus, the opening/closing valve 62 serves as a flow path switch (second flow path switch) for switching between a state in which a coolant discharged from the second pump 11 flows through the radiator 55 for the engine and another state in which the coolant does not flow through the radiator 55.

The opening/closing valve 62 opens the first communication flow path 60, and the three-way valve 56 closes the first engine bypass flow path 104 side, so that the coolant discharged from the second pump 12 flows through the radiator 13 and the radiator 55 for the engine in parallel.

As a result, the temperature of the coolant circulating through the coolant circuit on the second pump 12 side can be decreased, which can decrease the temperature of the coolant flowing into the intercooler 21B to thereby improve the intake air cooling performance.

That is, in this embodiment, the flow rate of the coolant flowing through the radiator 13 is set equal to or more than the flow rate of the coolant flowing through the radiator 55 for the engine, which improves the heat dissipation efficiency.

In order to prevent the temperature of the coolant circulating through the engine 20 from being excessively increased, when the temperature of the coolant circulating through the engine 20 is lower than a predetermined temperature, the coolant discharged from the second pump 11 flows through the radiator 55 for the engine. On the other hand, when the temperature of the coolant circulating through the engine 20 is higher than the predetermined temperature, the coolant circulating through the engine 20 may preferably flow through the radiator 55 for the engine.

Sixth Embodiment

Figure 33:
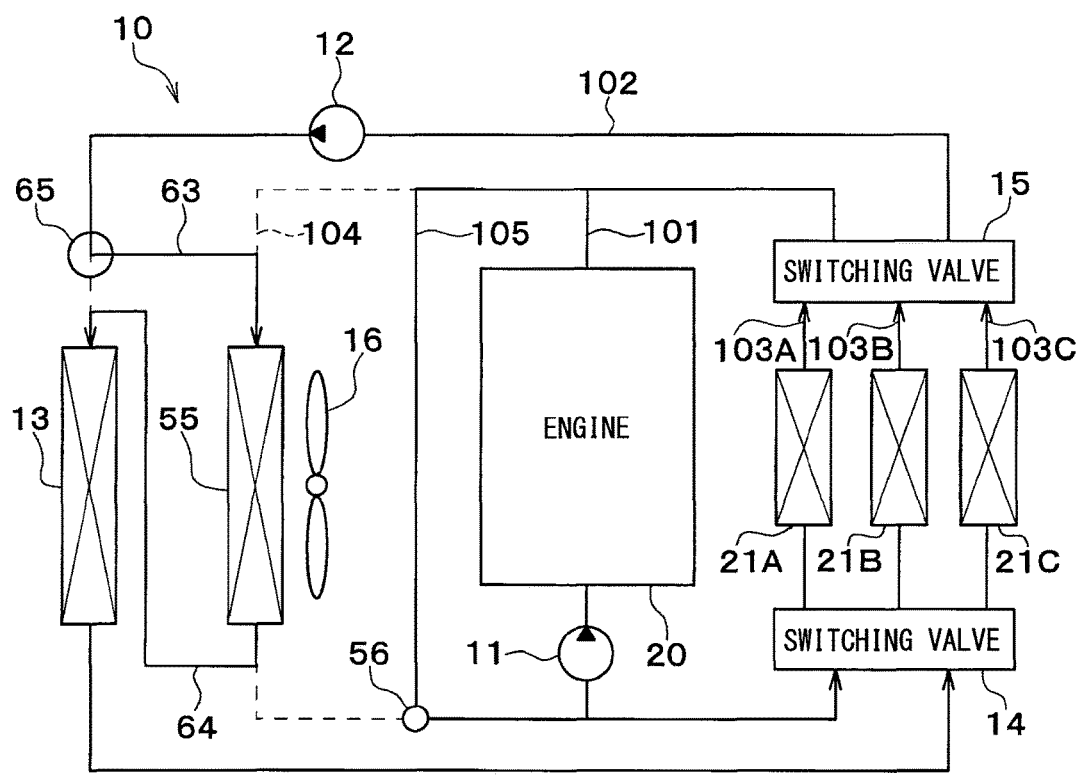
FIG. 33 is an entire configuration diagram of a vehicle thermal management system according to a sixth embodiment of the invention.

In the above fifth embodiment, the coolant discharged from the second pump 12 can flow through the radiator 13 and the radiator 55 for the engine in parallel. On the other hand, as shown in FIG. 33, in a sixth embodiment, the coolant discharged from the second pump 12 can flow through the radiator 13 and the radiator 55 for the engine in series.

Specifically, a first communication flow path 63, a second communication flow path 64, and a three-way valve 65 are added to the structure of the fourth embodiment.

The first communication flow path 63 is a flow path for connecting an upstream side of the coolant flow of the radiator 13 in the radiator side flow path 102 to an upstream side of the coolant flow of the radiator 55 for the engine in the first engine bypass flow path 104.

The second communication flow path 64 is a flow path for allowing a connection portion between the radiator 13 and the first communication flow path 63 in the radiator side flow path 102 to communicate with the downstream side of the coolant flow of the radiator 55 for the engine in the first engine bypass flow path 104.

The three-way valve 65 is disposed in the connection portion between the radiator 13 and the first communication flow path 63 in the radiator side flow path 102. The three-way valve 65 switches between the state of the coolant flowing through the radiator side flow path 102 and the state of the coolant flowing through the first communication flow path 63 side.

That is, the three-way valve 65 serves as a flow path switch for switching between a state in which a coolant discharged from the second pump 11 flows through the radiator 55 for the engine and another state in which the coolant does not flow through the radiator 55.

The three-way valve 65 switches the flow of coolant to the first communication flow path 63 side, and the three-way valve 56 closes the first engine bypass flow path 104 side, so that the coolant discharged from the second pump 12 flows through the radiator 55 for the engine and the radiator 13 in series in that order.

As a result, the temperature of the coolant circulating through the coolant circuit on the second pump 12 side can be decreased, which can decrease the temperature of the coolant flowing into the intercooler 21B to thereby improve the intake air cooling performance.

Seventh Embodiment

In a seventh embodiment, the evaporator 33 has a cold storage function. When the engine is in the idle stop state, the cold heat stored by the evaporator 33 is used to cool the intake air.

When the compressor 35 is an engine-driven compressor that is rotatably driven by the engine, the compressor 35 cannot be driven in the idle stop state, in which the refrigeration cycle 34 does not work. As a result, the coolant flowing into the intercooler 21B cannot be cooled by the refrigeration cycle 34.

During the idle stop state, this embodiment causes the coolant to circulate through between the heater core 21A and the intercooler 21B, while bringing the air conditioner operating state into the intermediate air conditioning state or maximum heating state.

Thus, the air blown from the blower 32 is cooled by cold heat stored by the evaporator 33, and the cooled air cooled by the evaporator 33 can pass through the heater core 21A to thereby cool the coolant flowing through the heater core 21A. Then, the coolant cooled by the heater core 21A circulates through the intercooler 21B, which can cool the intake air by the intercooler 21B. As a result, the engine response upon start-up of the vehicle can be improved.

Figure 34:
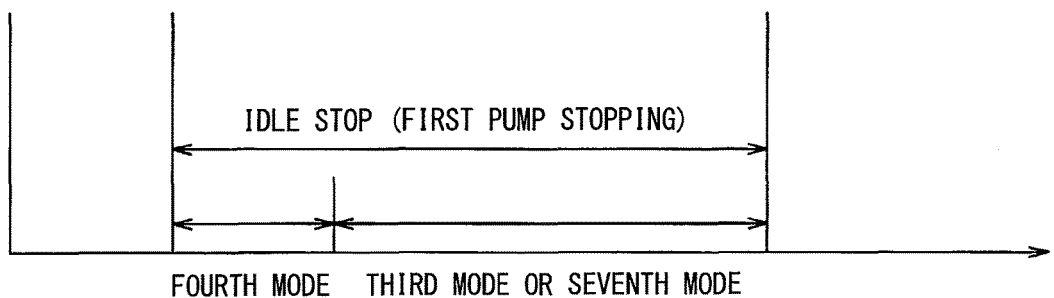
FIG. 34 is a time chart showing the operation of a thermal management system in a seventh embodiment of the invention.

Further, in this embodiment, as shown in FIG. 34, in a predetermined time (for example, in about 5 to 6 seconds) directly after the idle stop state, switching is performed to the fourth mode shown in FIG. 9, in which the heater core 21A and the intercooler 21B are connected to the coolant circuit on the second pump 12 side. Thus, the coolant cooled by the heater core 21A flows through the intercooler 21B.

Then, switching is performed to the third mode shown in FIG. 8 or the seventh mode shown in FIG. 12, in which the intercooler 21B is connected to the coolant circuit on the first pump 11 side, and the turbocharger 21C is connected to the coolant circuit on the second pump 12 side. Since at this time the engine is in the idle stop state, the first pump 11 as the engine-driven pump is stopped.

Thus, the coolant cooled by the heater core 21A remains in the intercooler 21B as well as coolant pipes located prior to and after the intercooler 21B, which can avoid heat of the turbocharger 21C from flowing into the intercooler 21B, thereby storing the cold heat in the intercooler 21B. The intermediate-temperature coolant on the second pump 12 side can cool the turbocharger 21C.

After the end of the idle stop state, the intake air can be cooled by cold heat stored in the intercooler 21B to thereby improve the engine response (acceleration response) upon the start-up of the vehicle.

In this example, in the predetermined time (for example, in about 5 to 6 seconds) directly after the idle stop state, switching is performed to the fourth mode. Alternatively, during deceleration of the vehicle before the idle stop state, switching may be performed to the fourth mode.

Eighth Embodiment

Figure 35:
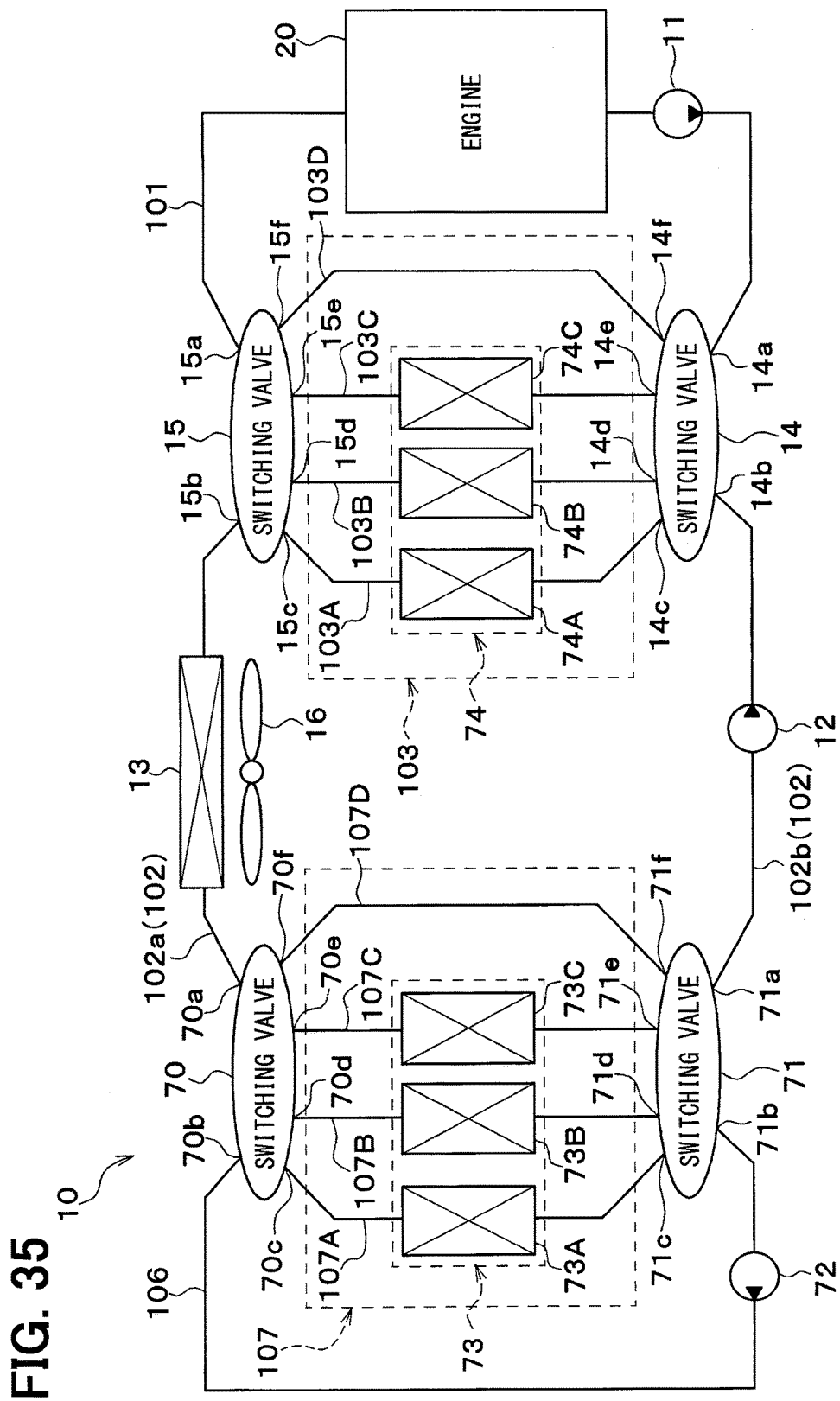
FIG. 35 is an entire configuration diagram of a vehicle thermal management system in an eighth embodiment of the invention.

Although in the first to seventh embodiments, two coolant circuits (heat medium circuits) are formed, in an eighth embodiment of the invention, three coolant circuits are formed. Specifically, in the first to seventh embodiments, there are provided the first coolant circuit (high-temperature coolant circuit) for circulation of the first coolant with respect to the engine 20 and the second coolant circuit for circulation of the second coolant with respect to the radiator 13. On the other hand, in the eighth embodiment of the invention, as shown in FIG. 35, there is a third coolant circuit (low-temperature coolant circuit).

The structure of this embodiment will be specifically explained below. The radiator side flow path 102 is divided into an upstream side radiator flow path 102a and a downstream side radiator flow path 102b. The radiator 13 is disposed in the upstream side radiator flow path 102a. The second pump 12 is disposed in the downstream side radiator flow path 102b.

The outlet side of the upstream side radiator flow path 102a is connected to a first inlet 70a of a third switching valve 70. In other words, the first inlet 70a of the third switching valve 70 is connected to the outlet side for the coolant of the radiator 13.

The inlet side of the downstream side radiator flow path 102b is connected to a first outlet 71a of a fourth switching valve 71. In other words, the first outlet 71a of the fourth switching valve 71 is connected to the suction side for the coolant of the second pump 12.

Each of third and fourth switching valves 70 and 71 is a flow switching device that switches the flow of coolant. The third and fourth switching valves 70 and 71 have the same basic structure. However, the third switching valve 70 differs from the fourth switching valve 71 in that inlet and outlet for the coolant are reversed to each other.

The third switching valve 70 includes the first inlet 70a and the second inlet 70b as an inlet for the coolant, and a plurality of (four, in an example shown in FIG. 35) outlets 70c, 70d, 70e, and 70f as an outlet for the coolant. The fourth switching valve 71 includes a first outlet 71a and a second outlet 71b as an outlet for the coolant, and a plurality of (in an example shown in FIG. 35, four) inlets 71c, 71d, 71e, and 71f as an inlet for the coolant.

The second inlet 70b of the third switching valve 70 is connected to the outlet side for the coolant of the flow path 106. The second outlet 71b of the fourth switching valve 70 is connected to the inlet side for the coolant of the flow path 106. The flow path 106 is provided with a third pump 72.

The third pump 72 is a coolant pump (heat medium pump) for drawing and discharging the coolant (heat medium). The third pump 72 is an electric pump that is driven by an electric power supplied from a battery.

The coolant discharge side of the third pump 72 is connected to the second inlet 70b of the third switching valve 70. The coolant suction side of the third pump 72 is connected to the second outlet 71b of the fourth switching valve 71.

A second flow path group 107 is disposed in between the outlet side of the third switching valve 70, and the inlet side of the fourth switching valve 71. In the example shown in FIG. 35, a flow path 107A of the second flow path group 107 is connected to between the outlet 70c of the third switching valve 70 and the inlet 71c of the fourth switching valve 71. A flow path 107B of the second flow path group 107 is connected to between the outlet 70d of the third switching valve 70 and the inlet 71d of the fourth switching valve 71. A flow path 107C of the second flow path group 107 is connected to between the outlet 70e of the third switching valve 70 and the inlet 71e of the fourth switching valve 71. A flow path 107D of the second flow path group 107 is connected to between the outlet 70f of the third switching valve 70 and the inlet 71f of the fourth switching valve 71.

Thus, the flow paths 107A, 107B, 107C, and 107D of the second flow path group 107 are arranged in parallel between the outlet side of the third switching valve 70 and the inlet side of the fourth switching valve 71.

In the flow paths 107A, 107B, 107C, and 107D, the second target device group for heat exchange 73 is disposed. The second target device group for heat exchange 73 includes a chiller 73A, a cooler core 73B, and an electric device 73C. In the example shown in FIG. 35, the chiller 73A is disposed in the flow path 107A, the cooler core 73B is disposed in the flow path 107B, and the electric device 73C is disposed in the flow path 107C. No target device for heat exchange is disposed in the flow path 107D.

Thus, the flow path 107D forms a bypass flow path for allowing the coolant to bypass the chiller 73A, the cooler core 73B, and the electric device 73C.

The second target device group for heat exchange 73 includes, for example, a chiller, a cooler core, a cold storage device, an electric device, and the like. The chiller is a heat exchanger (heat medium cooler) for coolant cooling that cools the coolant by exchanging heat between the coolant and a low-pressure refrigerant in the refrigeration cycle. The cooler core is a heat exchanger for air cooling that cools the air to be blown into the vehicle interior by exchanging heat between the coolant and the air. The cold storage device is a cold storage apparatus that stores cold heat held by the coolant. The electric device is a target cooling device that is to be cooled by dissipating heat generated by the electric device itself, into the coolant.

The first switching valve 14 includes a plurality of outlets 14c, 14d, 14e, and 14f (four in the example of FIG. 35). The second switching valve 15 includes a plurality of inlets 15c, 15d, 15e, and 15f (four in the example of FIG. 35).

The first flow path group 103 is connected to between the outlets 14c, 14d, 14e, and 14f of the first switching valve 14 and the inlets 15c, 15d, 15e, and 15f of the second switching valve 15. The first target device group for heat exchange 74 is disposed in the first flow path group 103.

The first target device group for heat exchange 74 includes, for example, a heater core, a turbocharger, an intercooler, a heat accumulator, a water-cooled condenser, an ATF cooler-warmer, an oil cooler-warmer, an EGR cooler, and the like.

Figure 36:
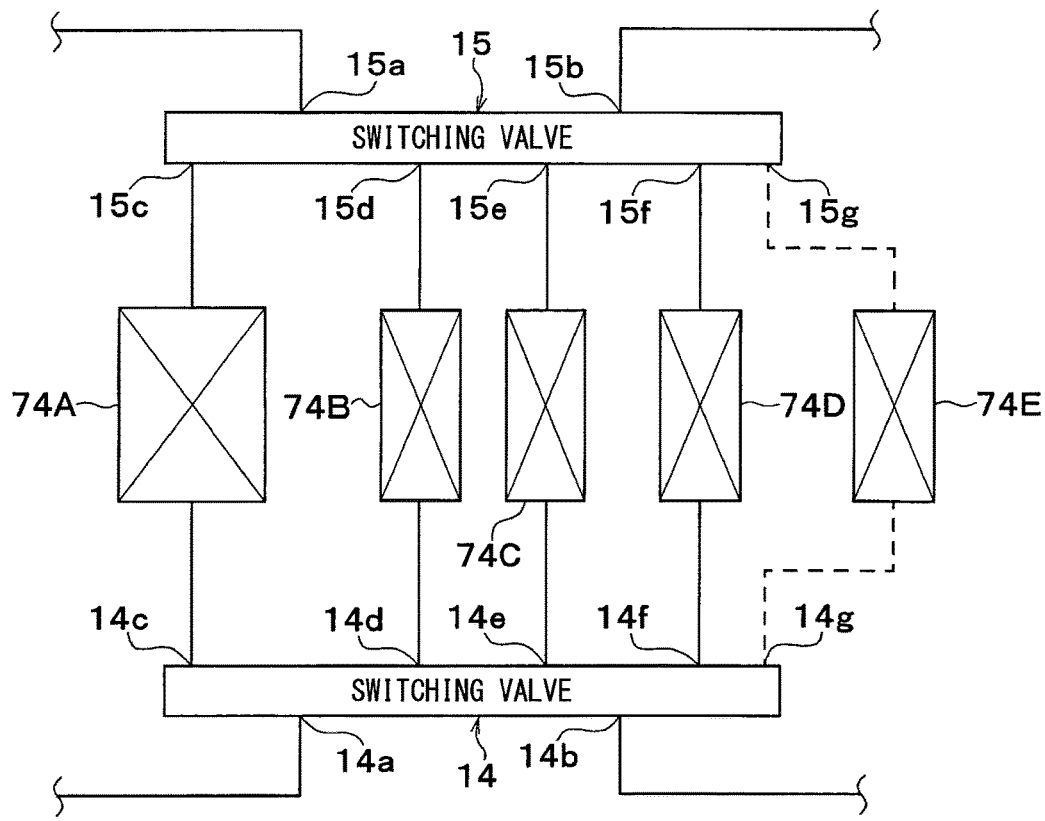
FIG. 36 is a configuration diagram of a main part of the vehicle thermal management system in the eighth embodiment.

As shown in FIG. 36, in this embodiment, the first target device group for heat exchange 74 includes a heat accumulator 74A, an intercooler 74B, a heater core 74C, a turbocharger 74D, and an EGR cooler 74E.

In the example shown in FIG. 35, the heat accumulator 74A is disposed in the flow path 103A, the intercooler 74B is disposed in the flow path 103B, and the heater core 74C is disposed in the flow path 103C. No target device for heat exchange is disposed in the flow path 103D. Thus, the flow path 103D forms a bypass flow path for allowing the coolant to bypass the heat accumulator 74A, the intercooler 74B, and the heater core 74C.

The heater core is a heat exchanger for heating that exchanges heat between air to be blown into the vehicle interior and the coolant, thereby heating the air. The turbocharger is a supercharger that supercharges the intake air of the engine 20 by rotating a turbine (not shown) using a residual energy of exhaust gas from the engine 20. The intercooler is a suction cooler that exchanges heat between the coolant and supercharged intake air at high temperature compressed by the turbocharger to thereby cool the supercharged intake air.

The heat accumulator is a heat storage device that stores hot heat held in the coolant. The water-cooled condenser is a heat exchanger for coolant heating that heats the coolant by exchanging heat between the coolant and a high-pressure refrigerant in the refrigeration cycle.

The ATF cooler warmer is a heat exchanger for automatic transmission fluid (ATF) (heat exchanger for automatic transmission fluid) that exchanges heat between the ATF and the coolant to cool or heat the automatic transmission fluid. The oil cooler-warmer is a heat exchanger for engine oil (heat exchanger for lubricant oil) that exchanges heat between the coolant and the engine oil (lubricant oil used in the engine 20) to cool or heat the engine oil. The EGR cooler is a heat exchanger for exhaust-gas cooling (exhaust gas cooler) that exchanges heat between exhaust gas returned to the suction side of the engine 20 and the coolant to cool the exhaust gas.

Now, the operation of this embodiment will be described. The heat accumulator 74A is connected to the first coolant circuit on the first pump 11 side, thereby allowing the coolant to circulate through between the engine 20 and the heat accumulator 74A, so that the waste heat of the engine 20 can be stored in the heat accumulator 74A.

Then, the coolant circulates through between the heat accumulator 74A and a high-temperature side target device for heat exchange other than the heat accumulator 74A (the intercooler 74B, the heater core 74C, or the turbocharger 74D), so that the heat stored in the heat accumulator 74A can be supplied to the high-temperature side target device for heat exchange other than the heat accumulator 74A if necessary.

When the temperature of the heat accumulator 74A is low like the outside air temperature, the heat accumulator 74A and each high-temperature side target device for heat exchange other than the heat accumulator 74A are connected to the second coolant circuit on the second pump 12 side. In this way, the coolant is allowed to circulate through between the heat accumulator 74A and each high-temperature side target device for heat exchange other than the heat accumulator 74A, which can cool the intake air, turbocharger 74D, and exhaust gas, while storing the heat in the heat accumulator 74A.

In winter or the like, when the temperature of the heat accumulator 74A is higher than the outside air temperature and lower than the water temperature of the intercooler 74B (that is, intercooler water temperature>temperature of heat accumulator>outside air temperature), once the engine is in the idle stop state, the cold water in the heat accumulator 74A is supplied to the intercooler 74B. Thus, the cold heat can be stored in the intercooler 74B, while preparing for the next acceleration for start-up in the idle stop state.

Thus, the cold heat can be stored in the intercooler 74B without being dissipated by the radiator 13. Even in the idle stop mode where the traveling air cannot be applied to the radiator 13, the blower 16 does not need to be operated, which can prevent an operator from feeling uncomfortable due to noise generated by the operation of the blower 16 during the stop of the engine, while suppressing the power consumption of the blower 16.

Figure 37:
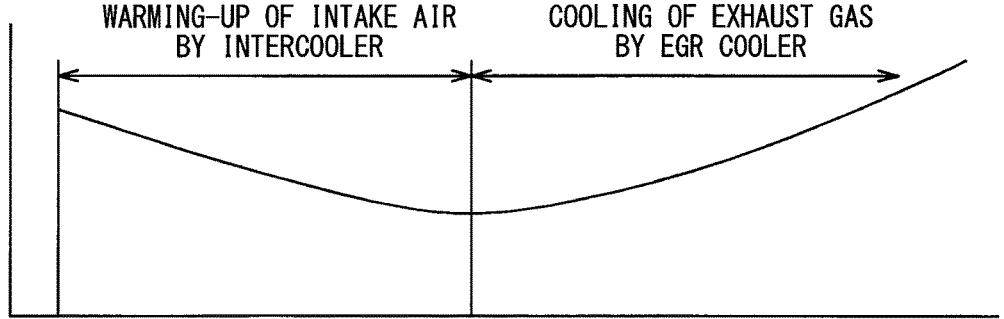
FIG. 37 is a time chart showing the operation of the thermal management system in the eighth embodiment.

As shown in the time chart of FIG. 37, hot heat is stored in the heat accumulator 74A in the previous traveling. When the temperature of the heat accumulator 74A directly after the start-up of the engine (heat storage temperature) is higher than a predetermined temperature, the cold water stored in the heat accumulator 74A is supplied to the intercooler 74B to thereby warm the intake air (which is warming-up of the intake air). Thus, the hot heat stored in the heat accumulator 74A is reduced to decrease the temperature of the heat accumulator 74A.

Once the temperature of the heat accumulator 74A is decreased to the predetermined temperature or less, the cold water stored in the heat accumulator 74A is supplied to the EGR cooler 74E to thereby cool the exhaust gas (which is exhaust gas cooling).

Thus, the hot heat stored in the heat accumulator 74A in the previous traveling can not only warm-up the engine 20, but also heat the intake air by the intercooler 74B. As a result, the stored heat can be effectively used to promote the warming-up of the engine to improve the fuel efficiency, while warming the intake air during warming-up of the engine to reduce toxic substances contained in the exhaust gas.

When the hot heat remains in the heat accumulator 74A after heating the intake air, the exhaust gas can also be cooled to an appropriate temperature by the EGR cooler 74E with the hot heat remaining in the heat accumulator 74A. That is, under a low load on the engine, the excessive cooling of the exhaust gas by the EGR cooler 74E leads to a large amount of exhaust gas returned to the suction side of the engine 20, which might cause an accidental fire. Further, condensed water is disadvantageously generated in the EGR cooler 74E to enter a combustion chamber of the engine 20. When the temperature of the exhaust gas cooled by the EGR cooler 74E is too low, the exhaust gas cannot be returned to the suction side of the engine 20.

On the other hand, in this embodiment, even when the engine coolant temperature is low due to the cooled state of the engine 20, the hot heat remaining in the heat accumulator 74A increases the temperature of the engine coolant, which can prevent the exhaust gas from being excessively cooled by the EGR cooler 74E, thereby returning the exhaust gas to the suction side of the engine 20 at an early stage to improve the fuel efficiency.

Ninth Embodiment

Figure 38:
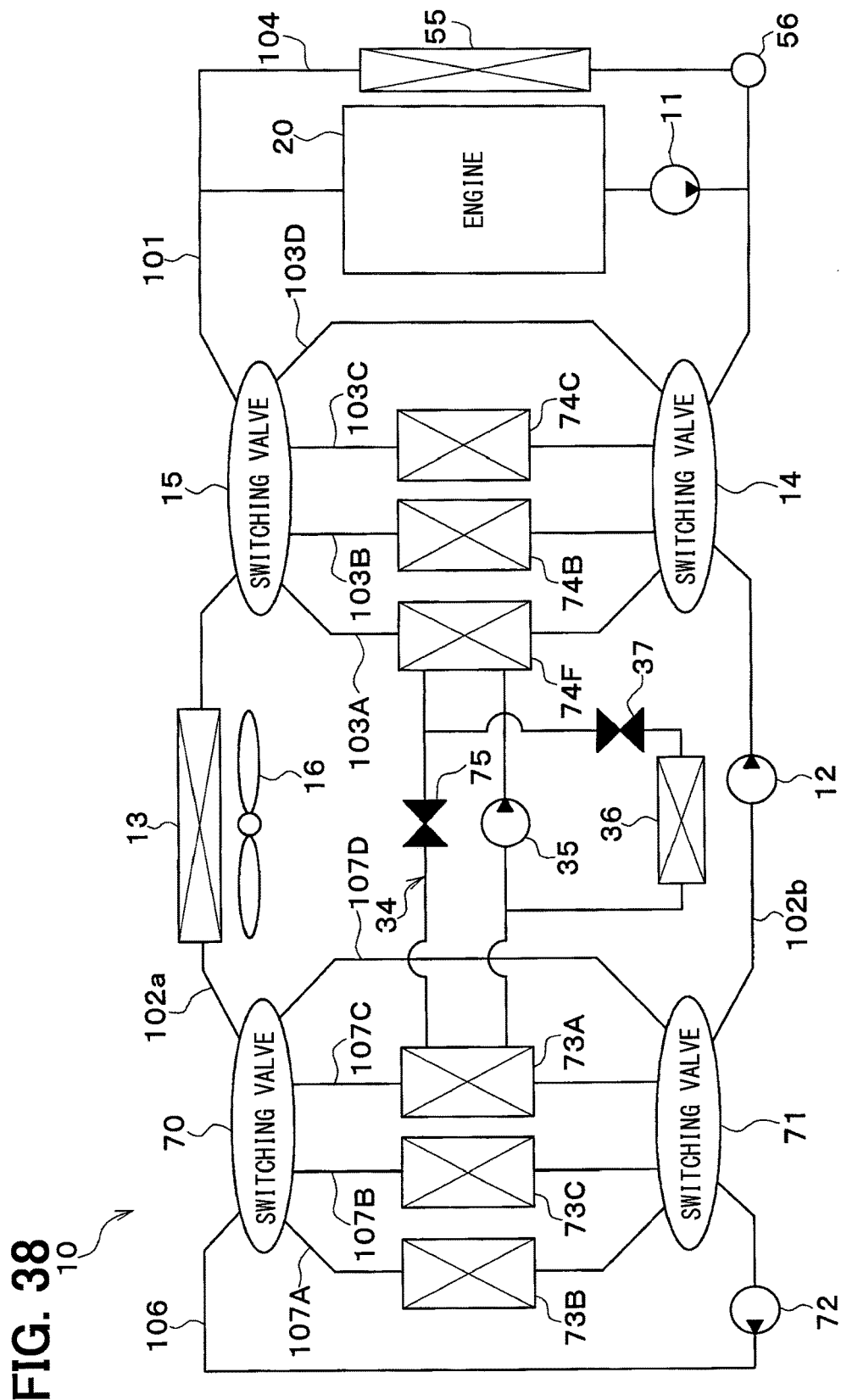
FIG. 38 is an entire configuration diagram of a vehicle thermal management system according to a ninth embodiment of the invention.

As shown in FIG. 38, in a ninth embodiment, the first target device group for heat exchange 74 includes the water-cooled condenser 74F, and the second target device group for heat exchange 73 includes the chiller 73A.

The water-cooled condenser 74F is a high-pressure side heat exchanger in the refrigeration cycle 34. The water-cooled condenser 74F serves as a heat exchanger for coolant heating (heat exchanger for heat medium heating) that heats the coolant by exchanging the heat between the high-pressure refrigerant of the refrigeration cycle 34 and the coolant.

The chiller 73A is a low-pressure side heat exchanger in the refrigeration cycle 34. The chiller 73A serves as a heat exchanger for coolant cooling (heat exchanger for heat medium cooling) that cools the coolant by exchanging the heat between the low-pressure refrigerant of the refrigeration cycle 34 and the coolant.

An expansion valve 75 for decompressing and expanding a high-pressure refrigerant having flowed from the water-cooled condenser 74F is disposed on the upstream side of the refrigerant flow of the chiller 73A. The refrigerant flowing from the water-cooled condenser 74F flows through the expansion valve 75 and chiller 73A, and the expansion valve 37 and condenser 36, in parallel.

Figure 39:
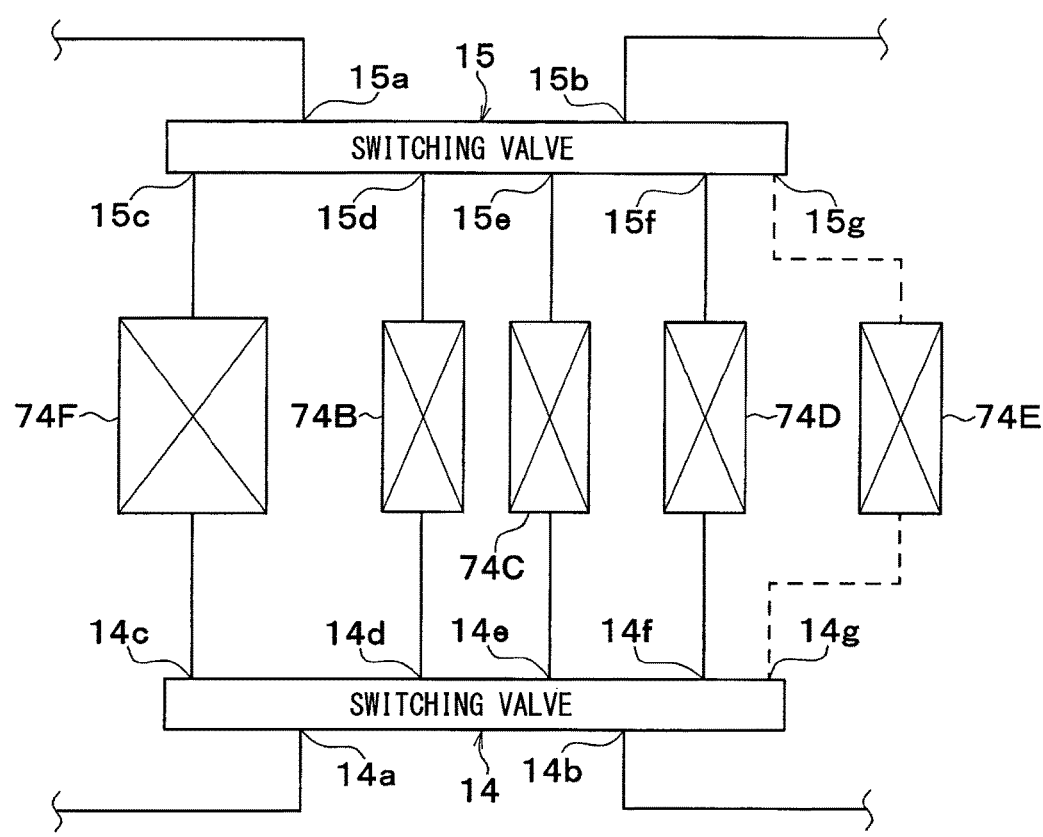
FIG. 39 is a configuration diagram of a main part of the vehicle thermal management system in the ninth embodiment.

In an example shown in FIG. 39, the first target device group for heat exchange 74 also includes the intercooler 74B, the heater core 74C, the turbocharger 74D, and the EGR cooler 74E, in addition to the water-cooled condenser 74F.

Now, the operation of the thermal management system in the example shown in FIG. 39 will be described. When the coolant temperature of the first coolant circuit on the engine 20 side is low because of the engine in the cold state, the water-cooled condenser 74F, intercooler 74B, heater core 74C, turbocharger 74D, and EGR cooler 74E are connected to the first coolant circuit on the engine 20 side.

Thus, the coolant heated by the water-cooled condenser 74F can be supplied to the intercooler 74B to heat the intake air to promote the warming-up of the engine 20.

The coolant heated by the water-cooled condenser 74F is supplied to the EGR cooler 74E, which can prevent the exhaust gas from being excessively cooled by the EGR cooler 74E, thus returning the exhaust gas to the suction side of the engine 20 at an early stage to improve the fuel efficiency.

The coolant heated by the water-cooled condenser 74F is supplied to the heater core 74C to heat the air to be blown into the vehicle interior by the heater core 74C to heat the vehicle interior.

Tenth Embodiment

Figure 40:
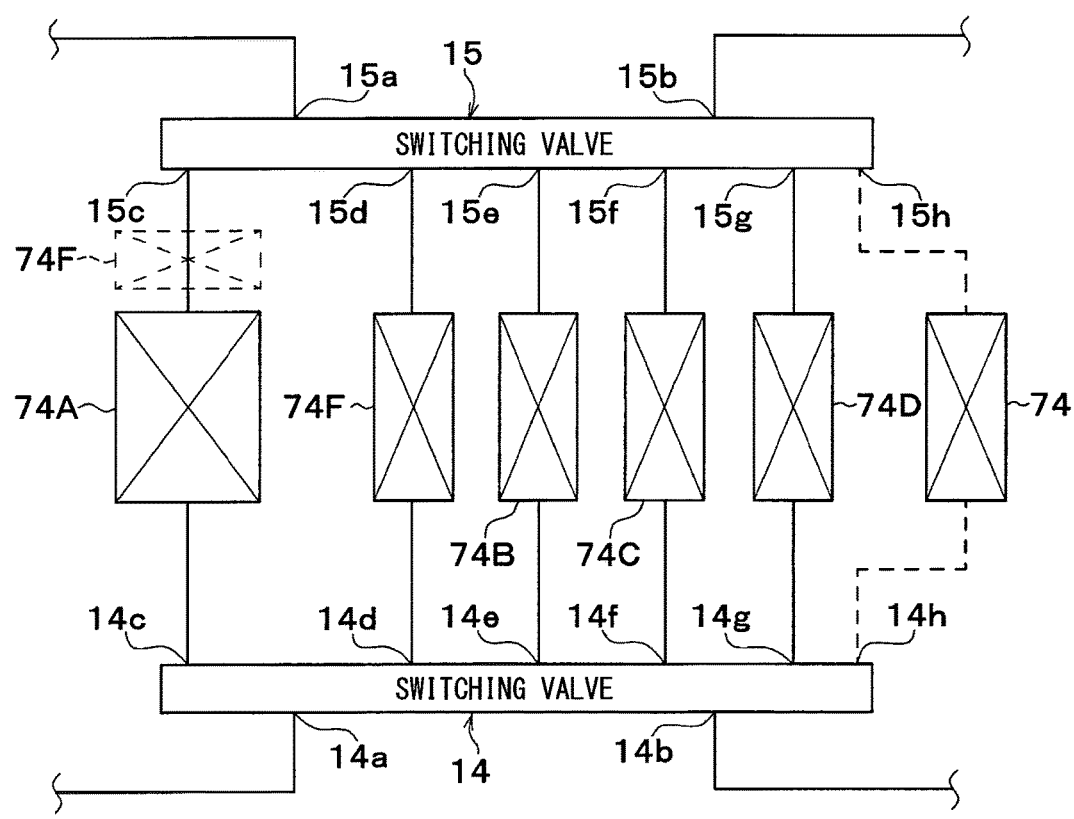
FIG. 40 is a configuration diagram of a main part of a vehicle thermal management system in a tenth embodiment of the invention.

In a tenth embodiment shown in FIG. 40, the first target device group for heat exchange 74 includes the heat accumulator 74A, water-cooled condenser 74F, intercooler 74B, heater core 74C, turbocharger 74D, and EGR cooler 74E.

Now, the operation of the vehicle thermal management system in this embodiment will be described. When the hot heat is stored in the heat accumulator 74A, the heat accumulator 74A, intercooler 74B, and EGR cooler 74E are connected to the first coolant circuit to allow the coolant to circulate through between the heat accumulator 74A, intercooler 74B, and EGR cooler 74E. Thus, this embodiment can prevent the exhaust gas from being excessively cooled, while heating the intake air.

Thereafter, in the case where the temperature of the heat accumulator 74A is decreased, when the heat needs to be dissipated from the water-cooled condenser 74F, the water-cooled condenser 74F and the heat accumulator 74A are connected to the second coolant circuit, whereby the heat dissipated from the water-cooled condenser 74F is stored in the heat accumulator 74A.

Thus, the coolant having a lower temperature than an outside air temperature can be temporarily supplied to the water-cooled condenser 74F, thereby reducing the power consumption of the compressor 35 of the refrigeration cycle 34. The heat stored in the heat accumulator 74A can be stored at an early stage, and thus can serve as a heat source when the hot water is requested by the intercooler 74B and EGR cooler 74E.

As indicated by a broken line of FIG. 40, the water-cooled condenser 74F may be disposed such that the coolant can flow through the heat accumulator 74A and the water-cooled condenser 74F in series.

In this embodiment, when the water-cooled condenser 74F needs to dissipate heat therefrom, the thermal management system can operate so as to allow the coolant to flow through between the water-cooled condenser 74F and one of the heat accumulator 74A, radiator 13, and radiator 55 for an engine whose temperature is the lowest.

Eleventh Embodiment

Figure 41:
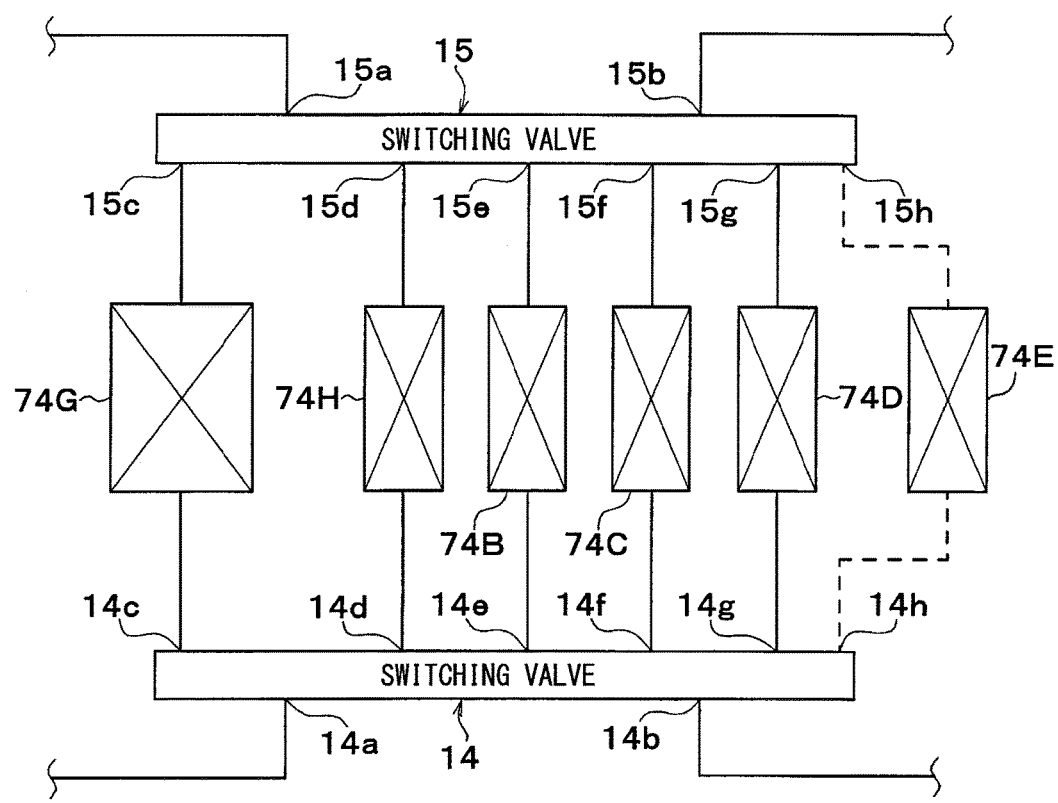
FIG. 41 is a configuration diagram of a main part of a vehicle thermal management system in an eleventh embodiment of the invention.

In an eleventh embodiment of the invention, as shown in FIG. 41, the first target device group for heat exchange 74 includes an oil cooler-warmer 74G and an ATF cooler-warmer 74H.

In this embodiment of the invention, a connection object of the oil cooler 74G and the ATF cooler 74H can be switched between the first coolant circuit and the second coolant circuit. When the temperature of coolant in the first coolant circuit is so high that the ATF or oil can be degraded (for example, at 110° C. or higher), the oil cooler 74G and ATF cooler 74H are connected to the second coolant circuit, which can thereby cool the ATF or oil with the coolant in the second coolant circuit. As a result, this embodiment can suppress the degradation of the ATF or oil to prolong the life of the ATF or oil.

Twelfth Embodiment

Figure 42:
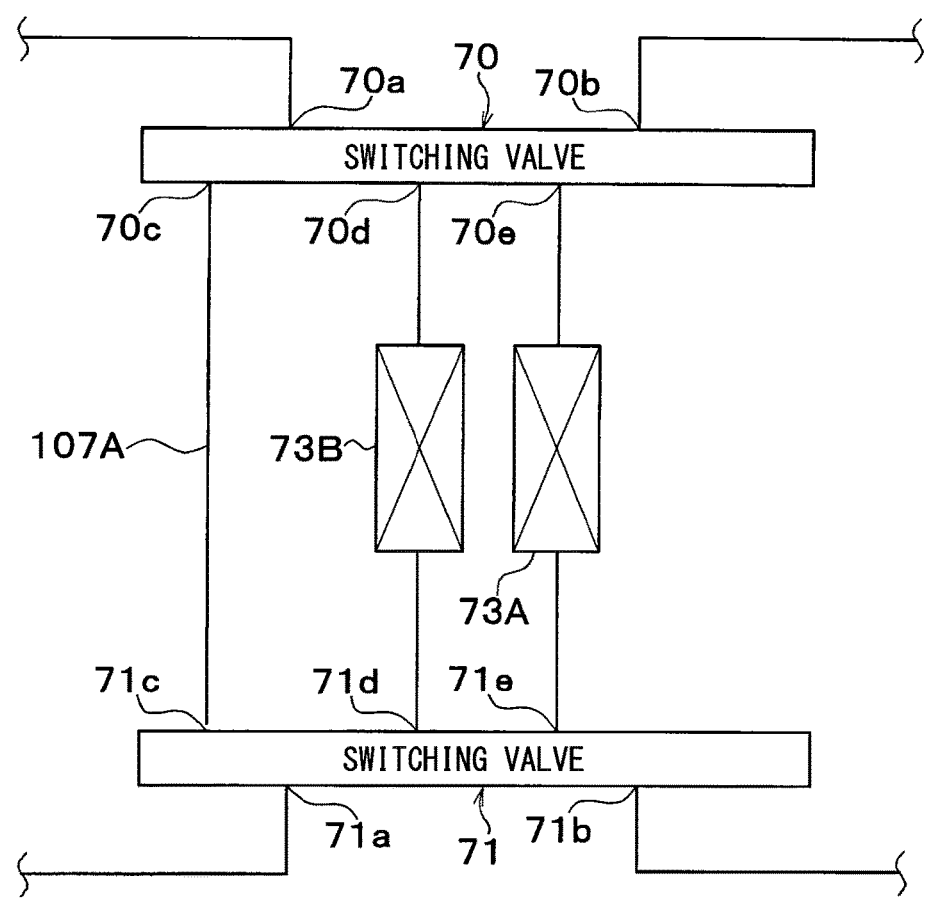
FIG. 42 is a configuration diagram of a main part of a vehicle thermal management system in a twelfth embodiment of the invention.

In a twelfth embodiment, as shown in FIG. 42, the second target device group for heat exchange 73 includes the chiller 73A and the cooler core 73B.

In an example shown in FIG. 42, no target device for heat exchange is formed in the flow path 107A connected to between the outlet 70a of the third switching valve 70 and the inlet 71a of the fourth switching valve 71. Thus, the flow path 107A forms a bypass flow path for allowing the coolant to bypass the chiller 73A and the cooler core 73B.

In this embodiment, the chiller 73A and cooler core 73B are connected to a third coolant circuit, so that the coolant in the third coolant circuit can circulate through between the chiller 73A and the cooler core 73B.

Thus, the low-temperature coolant cooled by the chiller 73A can be supplied to the cooler core 73B to cool the air to be blown into the vehicle interior by the cooler core 73B.

In this embodiment, the chiller 73A, and the intercooler 74B and EGR cooler 74E of the first target device group for heat exchange 74 are connected to the second coolant circuit, so that the coolant in the second coolant circuit can circulate through between the chiller 73A and the intercooler 74B and EGR cooler 74E.

In this way, the low-temperature coolant cooled by the chiller 73A is supplied to the intercooler 74B and the EGR cooler 74E, whereby the intake air and exhaust gas can be cooled by the intercooler 74B and the EGR cooler 74E.

Thirteenth Embodiment

Figure 43:
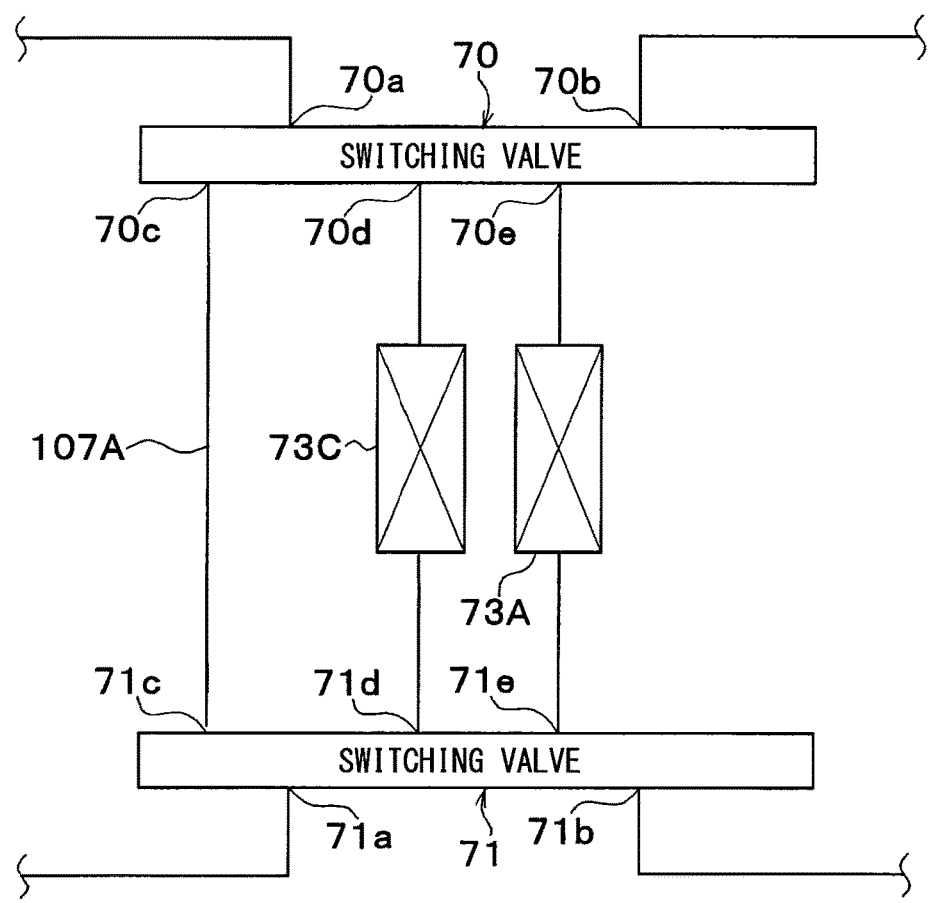
FIG. 43 is a configuration diagram of a main part of a vehicle thermal management system in a thirteenth embodiment of the invention.

In a thirteenth embodiment of the invention, as shown in FIG. 43, the second target device group for heat exchange 73 includes the chiller 73A and the electric device 73C.

The electric device 73C is, for example, an alternator, an integrated starter generator (ISG), or the like. The ISG is a start-up charging apparatus that integrates a starting device (starter) and a charging device (alternator) together.

In an example shown in FIG. 43, no target device for heat exchange is formed in the flow path 107A connected to between the outlet 70a of the third switching valve 70 and the inlet 71a of the fourth switching valve 71. Thus, the flow path 107A forms a bypass flow path for allowing the coolant to bypass the chiller 73A and the electric device 73C.

In this embodiment, the chiller 73A and the electric device 73C can be connected to the third coolant circuit, allowing the coolant in the third coolant circuit to circulate through between the chiller 73A and the electric device 73C. Thus, the low-temperature coolant cooled by the chiller 73A can be supplied to the electric device 73C to cool the electric device 73C.

Fourteenth Embodiment

Figure 44:
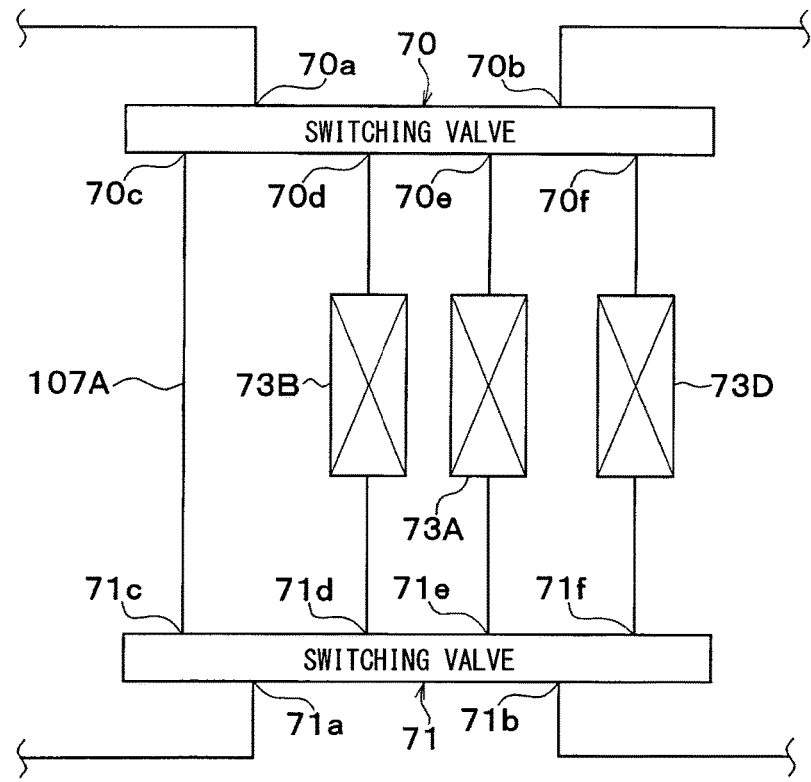
FIG. 44 is a configuration diagram of a main part of a vehicle thermal management system in a fourteenth embodiment of the invention.

In a fourteenth embodiment of the invention, as shown in FIG. 44, the second target device group for heat exchange 73 includes the chiller 73A, the cooler core 73B, and a cold storage device 73D.

In an example shown in FIG. 44, no target device for heat exchange of the second target device group for heat exchange 73 is disposed in the flow path 107A connected to between the outlet 70a of the third switching valve 70 and the inlet 71a of the fourth switching valve 71. Thus, the flow path 107A forms a bypass flow path for allowing the coolant to bypass the target devices for heat exchange 73A, 73B, and 73D of the second target device group for heat exchange 73.

In this embodiment, the chiller 73A, cooler core 73B, and cold storage device 73D are connected to the third coolant circuit, so that the coolant in the third coolant circuit can circulate through among the chiller 73A, the cooler core 73B, and the cold storage device 73D.

Figure 45:
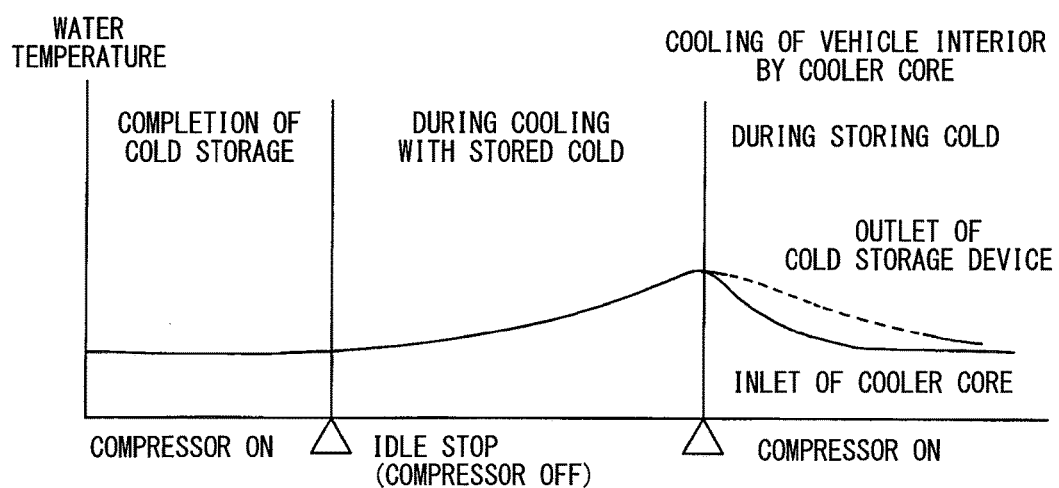
FIG. 45 is a time chart showing the operation of the thermal management system in the fourteenth embodiment.

Thus, as shown in the time chart of FIG. 45, during traveling of the vehicle (in operation of the compressor 35), the low-temperature coolant cooled by the chiller 73A is supplied to the cooler core 73B and cold storage device 73D, which can store the cold heat in the cold storage device 73D, while cooling the vehicle interior. Upon the idle stop (upon stopping the compressor 35), the low-temperature coolant cooled with the cold heat stored in the cold storage device 73D can be supplied to the cooler core 73B, thereby cooling the vehicle interior. That is, the air to be blown into the vehicle interior is cooled using the cold heat stored in the cold storage device 73D.

If necessary, the cold storage device 73D may be connected to the second coolant circuit to supply the low-temperature coolant cooled by the cold heat stored in the cold storage device 73D to the intercooler 74B and the EGR cooler 74E, thereby cooling the intake air and the exhaust gas.

Fifteenth Embodiment

Figure 46:
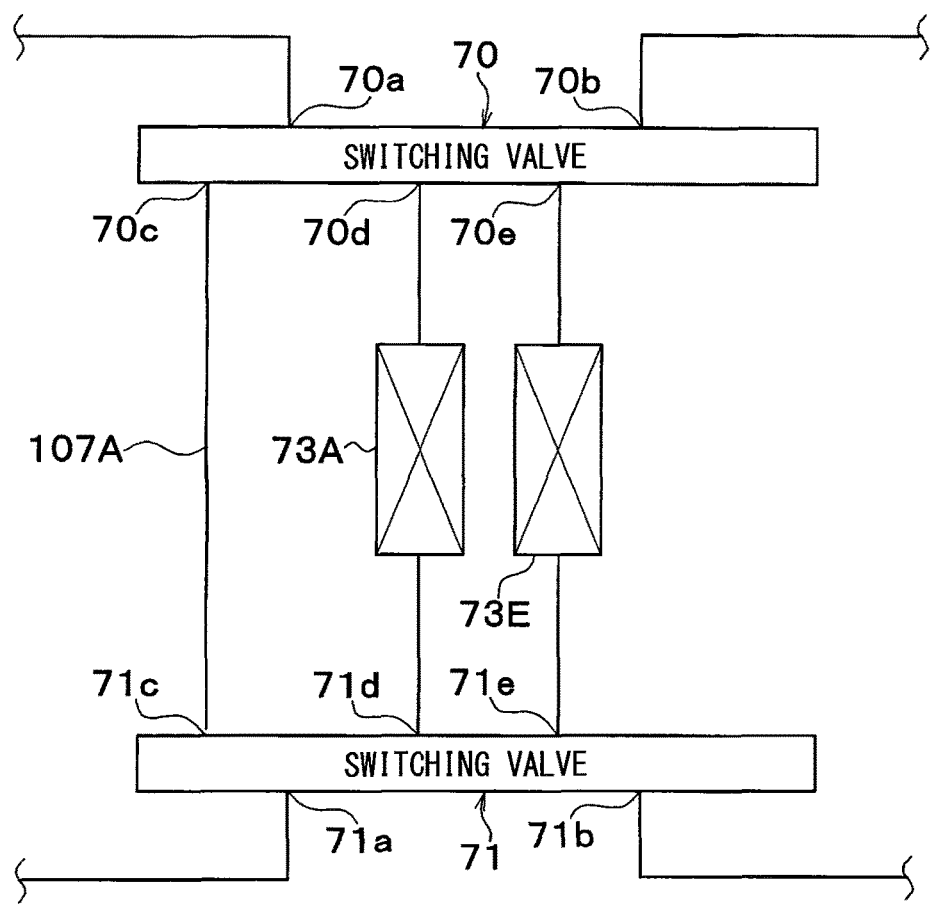
FIG. 46 is a configuration diagram of a main part of a vehicle thermal management system in a fifteenth embodiment of the invention.

In a fifteenth embodiment of the invention, as shown in FIG. 46, the second target device group for heat exchange 73 includes the chiller 73A and the intercooler 73E.

In an example shown in FIG. 46, no target device for heat exchange is disposed in the flow path 107A connected to between the outlet 70a of the third switching valve 70 and the inlet 71a of the fourth switching valve 71. Thus, the flow path 107A forms a bypass flow path for allowing the coolant to bypass the chiller 73A and the intercooler 73E.

Now, the operation of this embodiment will be described. Under a high load on the engine, the intercooler 73E is connected to the second coolant circuit, allowing the coolant to circulate through between the intercooler 73E and the radiator 13.

Thus, the intake air is cooled by the intercooler 73E with the coolant cooled by the radiator 13. This embodiment can improve the engine output and the fuel efficiency, and also can obtain the effect of reducing the amounts of toxic substances in the exhaust gas.

Upon the idle stop, the intercooler 73E is connected to the third coolant circuit, thus allowing the coolant to circulate through between the intercooler 73E and the chiller 73A. Since the coolant cooled by the chiller 73A flows through the intercooler 73E directly before the idle stop, the intake air can be cooled by the intercooler 73E directly after the idle stop (that is, upon start-up of the engine), thereby improving the engine response (acceleration response) upon the start-up of the vehicle.

After the predetermined time (for example, about 5 to 6 seconds) as soon as the engine is in the idle stop state, the third pump 72 in the third coolant circuit may be stopped. In this case, the coolant cooled by the chiller 73A directly before the idle stop remains in the intercooler 73E and the coolant pipes located prior to and after the intercooler 73E, so that the cold heat can be retained in the intercooler 73E. Directly after the end of the idle stop state, the intake air can be cooled by cold heat stored in the intercooler 73E to thereby improve the engine response upon the start-up of the vehicle.

When the engine is in the cold state, the intercooler 73E is connected to the second coolant circuit, allowing the coolant to circulate through between the intercooler 73E and the water-cooled condenser 74F. Thus, the intake air can be heated by the intercooler 73E with the coolant heated by the water-cooled condenser 74F. This embodiment can promote the warming-up of the engine 20, improve the fuel efficiency, and also obtain the effect of reducing the amounts of toxic substances of the exhaust gas.

Under a low load on the engine, the intercooler 73E is connected to the second coolant circuit, or the flow of the coolant to the intercooler 73E is stopped. Thus, the combustion properties can be improved within the MBT region to thereby improve the fuel efficiency.

Sixteenth Embodiment

Figure 47:
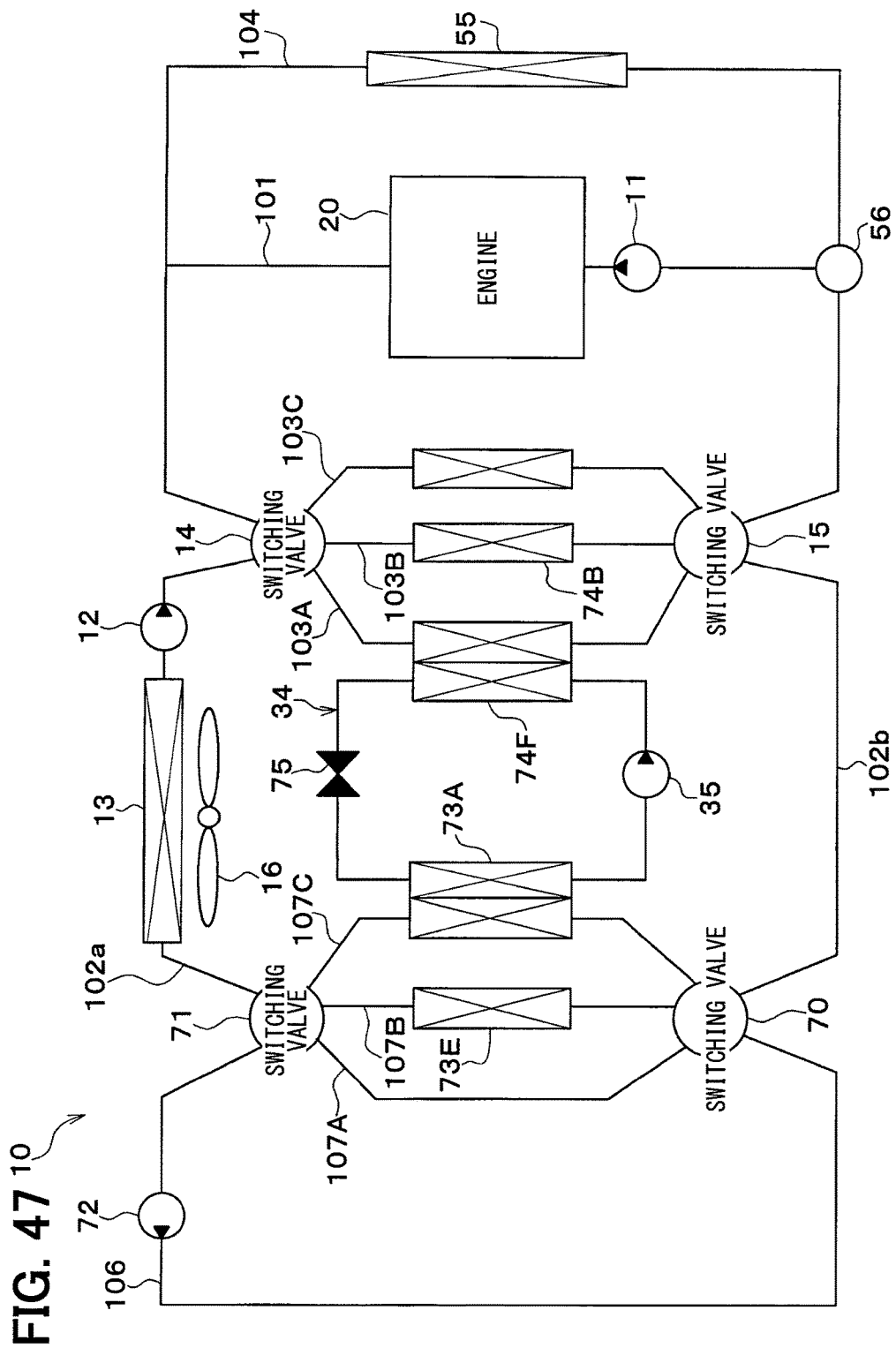
FIG. 47 is a configuration diagram of a main part of a vehicle thermal management system in a sixteenth embodiment of the invention.

As shown in FIG. 47, in a sixteenth embodiment of the invention, the first target device group for heat exchange 74 includes the first intercooler 74B, and the second target device group for heat exchange 73 includes the second intercooler 73E and the chiller 73A.

Figure 48:
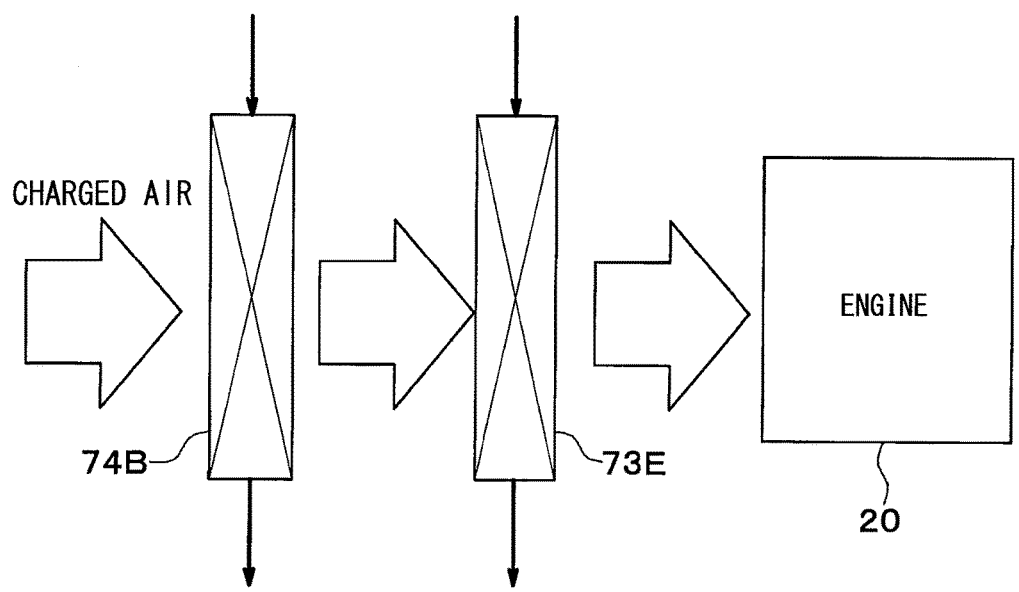
FIG. 48 is an exemplary diagram for explaining the state of mounting an intercooler shown in FIG. 47 on a vehicle.

As shown in FIG. 48, the second intercooler 73E of the second target device group for heat exchange 73 is disposed on the downstream side of the intake air flow with respect to the first intercooler 74B of the first target device group for heat exchange 74.

Now, the operation of this embodiment will be described. Under a high load on the engine, the first intercooler 74B and the intercooler 73E are connected to the second coolant circuit, thereby allowing the second coolant to circulate through between the first intercooler 74B and the radiator 13, and also the second intercooler 73E is connected to the third coolant circuit, thereby allowing the low-temperature third coolant to circulate through between the intercooler 73E and the chiller 73A.

Thus, first, the intake air is cooled in the first intercooler 74B with the second coolant cooled by the radiator 13, and then cooled in the second intercooler 73E with the third coolant cooled by the chiller 73A. This arrangement can cool the intake air by a higher cooling capability than that in the fifteenth embodiment.

Upon the idle stop, the second intercooler 73E is connected to the third coolant circuit, thus allowing the coolant to circulate through between the second intercooler 73E and the chiller 73A. Since the coolant cooled by the chiller 73A flows through the second intercooler 73E directly before the idle stop, the intake air can be cooled by the second intercooler 73E directly after the idle stop, thereby improving the engine response (acceleration response) upon the start-up of the vehicle.

After the predetermined time (for example, about 5 to 6 seconds) as soon as the engine is in the idle stop state, the third pump 72 in the third coolant circuit may be stopped. In this case, the coolant cooled by the chiller 73A directly before the idle stop remains in the second intercooler 73E and the coolant pipes located prior to and after the second intercooler 73E, so that the cold heat can be retained in the second intercooler 73E. Directly after the end of the idle stop state, the intake air can be cooled by cold heat stored in the low-temperature side intercooler 21B to thereby improve the engine response upon the start-up of the vehicle.

When the engine is in the cold state, the first intercooler 74B is connected to one of the first and second coolant circuits having a higher coolant temperature, and the second intercooler 73E is connected to the second coolant circuit.

That is, the second coolant circuit heats the coolant with the water-cooled condenser 74F, whereby the temperature of the coolant in the second coolant circuit can be set higher than that in the first coolant circuit. When the temperature of the coolant in the second coolant circuit is higher than that in the first coolant circuit, the first intercooler 74B is connected to the second coolant circuit. When the temperature of the coolant in the second coolant circuit is lower than that in the first coolant circuit, the first intercooler 74B is connected to the first coolant circuit.

In this way, the intake air can be heated by the first intercooler 74B and the second intercooler 73E, which can promote the warming-up of the engine 20, improve the fuel efficiency, and also obtain the effect of reducing the amounts of toxic substances of the exhaust gas.

Under a low load on the engine, the first intercooler 74B is connected to the first coolant circuit, and the second intercooler 73E is connected to the second coolant circuit; or the flow of the coolant to the intercooler 73E is stopped. Thus, the combustion properties can be improved within the MBT region to thereby improve the fuel efficiency.

Seventeenth Embodiment

Figure 49:
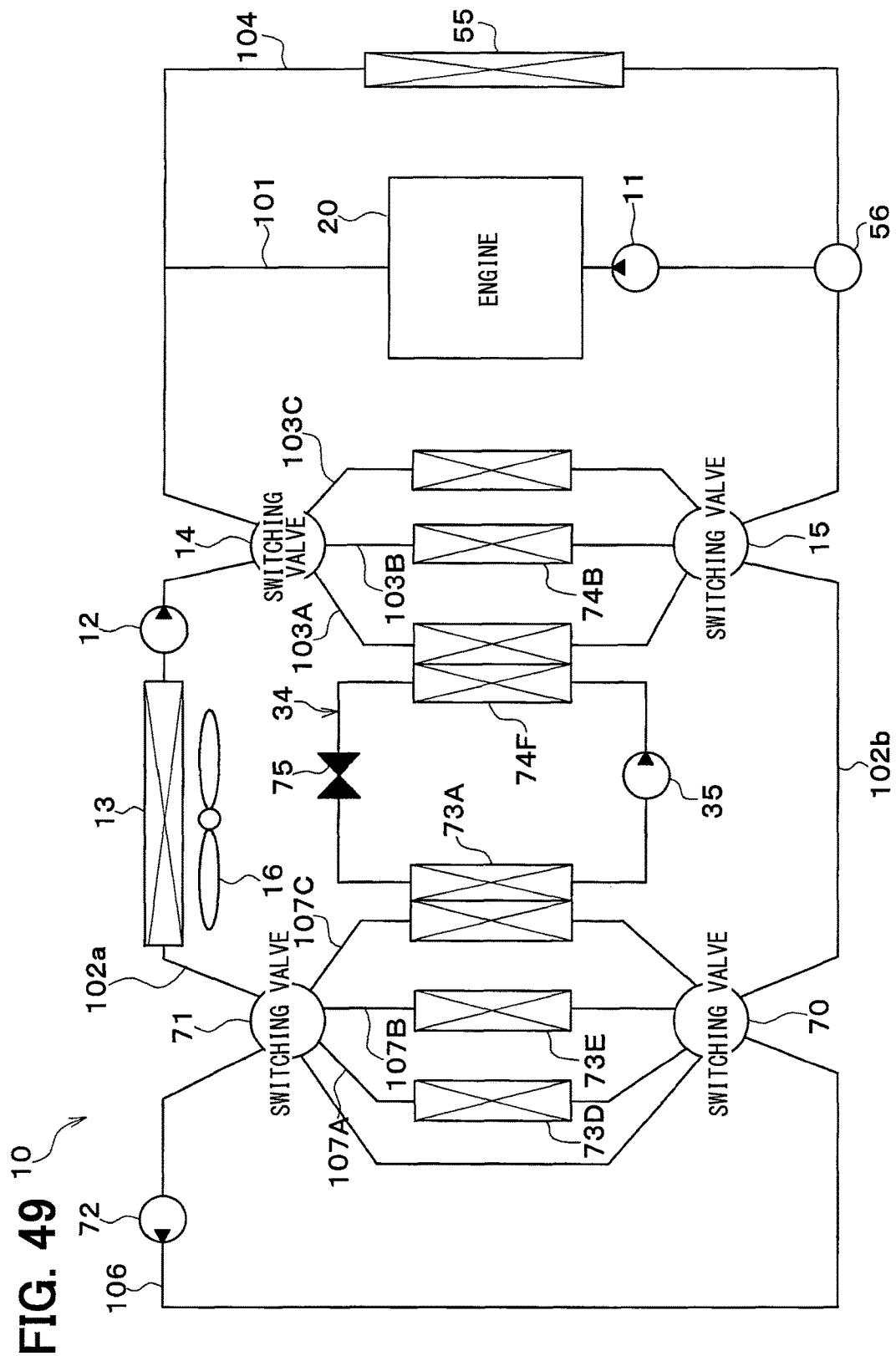
FIG. 49 is a configuration diagram of a main part of a vehicle thermal management system in a seventeenth embodiment of the invention.

In a seventeenth embodiment of the invention, as shown in FIG. 49, a cold storage device 73D is added to the second target device group for heat exchange 73 with respect to the structure of the above sixteenth embodiment.

In this embodiment, the second intercooler 73E, chiller 73A, and cold storage device 73D are connected to the third coolant circuit, so that the coolant in the third coolant circuit can circulate through among the chiller 73A, cooler core 73B, and cold storage device 73D.

During traveling of the vehicle (in operation of the compressor 35), the low-temperature coolant cooled by the chiller 73A is supplied to the second intercooler 73E and the cold storage device 73D to cool the intake air while storing the cold heat in the cold storage device 73D. In the idle stop (during stopping of the compressor 35), the low-temperature coolant cooled by the cold heat stored in the cold storage device 73D can be supplied to the first intercooler 74B to cool the intake air.

In this embodiment, the water-cooled condenser 74F and the cold storage device 73D are connected to the second coolant circuit, so that the coolant in the second coolant circuit can circulate through between the water-cooled condenser 74F and the cold storage device 73D. Thus, the low-temperature coolant cooled by the cold heat stored in the cold storage device 73D can be supplied to the water-cooled condenser 74F to cool the high-pressure refrigerant of the refrigeration cycle 34. That is, the high-pressure refrigerant of the refrigeration cycle 34 can be cooled by using the cold heat stored in the cold storage device 73D.

Other Embodiments

The present disclosure is not limited to the above-mentioned embodiments, and various modifications and changes can be made to the disclosed embodiments as follows.

Various devices can be used as the target device for heat exchange. For example, the target device for heat exchange may be a heat exchanger incorporated in a seat where a passenger sits and which is adapted to cool and heat the seat by coolant. The number of target devices for heat exchange may be any number as long as the number is a plural number (two or more).

In the embodiments described above, the coolant cooler 14 for cooling the coolant by the low-pressure refrigerant of the refrigeration cycle 34 is used as the cooler for cooling the coolant down to a lower temperature than the outside air temperature. However, a Peltier element may be used to cool the coolant.

In each of the above-mentioned embodiments, the coolant is used as the heat medium for exchanging heat of the target device for heat exchange. Alternatively, various kinds of media, such as oil, may be used as the heat medium.

Nanofluid may be used as the coolant (heat medium). The nanofluid is a fluid into which nanoparticles with a particle diameter of the order of nanometer are mixed. A mixture of the nanoparticles into the coolant can have the following effects, in addition to the effect of decreasing a freezing point, like the case of using a coolant using ethylene glycol (so-called antifreeze solution).

That is, the above-mentioned effects can include improving a thermal conductivity in a specific temperature range, increasing a heat capacity of the coolant, preventing corrosion of a metal pipe or degradation of a rubber pipe, and enhancing fluidity of the coolant at an ultralow temperature.

Such effects vary depending on the composition, shape, and compounding ratio of a nanoparticle, an additive, and the like.

This arrangement can improve the thermal conductivity, and thus can obtain the same cooling efficiency, even though the above solution containing the nanoparticles is used in a small amount, as compared to the ethylene glycol coolant.

A thermal capacity of the coolant can be enhanced to increase the amount of the cold heat stored in the coolant itself (cold heat stored due to sensible heat).

In order to obtain the sufficient thermal conductivity, an aspect ratio of the nanoparticle is preferably 50 or more. The term "aspect ratio" as used herein means a shape index indicative of a ratio between the longitudinal and lateral dimensions of the nanoparticle.

Nanoparticles for use can include any one of Au, Ag, Cu, and C. Specifically, as atoms of the nanoparticles, an Au nanoparticle, an Ag nanowire, a carbon nanotube, a graphene, a graphite core shell type nanoparticle (grain body having a structure surrounding the above-mentioned atom, such as a carbon nanotube), and an Au nanoparticle-containing carbon nanotube, can be used.

The refrigeration cycle 34 of each of the above embodiments uses a fluorocarbon refrigerant as the refrigerant. However, the kind of the refrigerant is not limited thereto. For example, natural refrigerant, such as carbon dioxide, or hydrocarbon-based refrigerant may be used.

The refrigeration cycle 34 of each of the above embodiments forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

In the respective embodiments described above, the compressor 35 is an engine-driven compressor that is rotatably driven by an engine via a pulley, a belt, or the like. The compressor 35 may be an electric compressor that is driven by electric power supplied from a battery.

In the respective above-mentioned embodiments, the vehicle thermal management system of the present disclosure is applied to a turbocharger mounted vehicle by way of example. Alternatively, the vehicle thermal management system of the present disclosure may be applied to a hybrid vehicle or the like which can obtain a driving force for traveling of the vehicle from an engine (internal combustion engine) as well as an electric motor for traveling.

What is claimed is:

1. A thermal management system for a vehicle, comprising:
a first pump that is connected to an internal combustion engine by a flow path, the first pump drawing and discharging a heat medium adapted to cool the internal combustion engine;
a second pump drawing and discharging the heat medium;
a heat exchanger exchanging heat between outside air and the heat medium discharged from the second pump;
a first target device group for heat exchange including a plurality of first target devices for heat exchange that exchange heat with the heat medium;
a first switching valve connected to a heat medium discharge side of the first pump and a heat medium discharge side of the second pump in parallel, and connected to respective heat medium inlet sides of the target devices for heat exchange included in the first target device group for heat exchange in parallel, the first switching valve switching between (i) a state in which the heat medium, after passing through the first pump and the internal combustion engine, flows into the first target devices for heat exchange included in the first target device group for heat exchange, and (ii) a state in which the heat medium discharged from the second pump flows into the first target devices for heat exchange included in the first target device group for heat exchange;
a second switching valve connected to a heat medium suction side of the first pump and a heat medium suction side of the second pump in parallel, and connected to respective heat medium outlet sides of the first target devices for heat exchange included in the first target device group for heat exchange in parallel, the second switching valve switching between (i) a state in which the heat medium from the first target devices for heat exchange included in the first target device group for heat exchange flows into the first pump, and (ii) a state in which the heat medium from the first target devices for heat exchange included in the first target device group for heat exchange flows into to the second pump;
a third pump drawing and discharging the heat medium;
a second target device group for heat exchange including a plurality of second target devices for heat exchange that exchange heat with the heat medium;
a third switching valve connected to a heat medium discharge side of the second pump and a heat medium discharge side of the third pump in parallel, and connected to respective heat medium inlet sides of the second target devices for heat exchange included in the second target device group for heat exchange in parallel, the third switching valve switching between (i) a state in which the heat medium discharged from the second pump flows into the second target devices for heat exchange included in the second target device group for heat exchange, and (ii) a state in which the heat medium discharged from the third pump flows into the second target devices for heat exchange included in the second target device group for heat exchange, and a fourth switching valve connected to a heat medium suction side of the second pump and a heat medium suction side of the third pump in parallel, and connected to respective heat medium outlet sides of the second target devices for heat exchange included in the second target device group for heat exchange in parallel, the fourth switching valve switching between (i) a state in which the thermal medium from the second target devices for heat exchange included in the second target device group for heat exchange flows to the second pump, and (ii) a state in which the thermal medium from the second target devices for heat exchange included in the second target device group for heat exchange flows to the third pump, wherein the first switching valve and the second switching valve are cooperatively operated to switch between (i) a state in which the heat medium circulates between the first pump and the first target devices for heat exchange included in the first target device group for heat exchange, and (ii) a state in which the heat medium circulates between the second pump and the first target devices for heat exchange included in the first target device group for heat exchange, and the third switching valve and the fourth switching valve are cooperatively operated to switch between (i) a state in which the heat medium circulates between the second pump and the second target devices for heat exchange included in the second target device group for heat exchange, and (ii) a state in which the heat medium circulates between the third pump and the second target devices for heat exchange included in the second target device group for heat exchange.

2. The thermal management system for a vehicle, according to claim 1, further comprising:

a first flow path group including a plurality of flow paths connected to between the heat medium outlet side of the first switching valve and the heat medium inlet side of the second switching valve, wherein the first target devices for heat exchange included in the first target device group for heat exchange are disposed in the flow path included in the first flow path group, and the first switching valve and the second switching valve are cooperatively operated to form a heat medium circuit that allows the heat medium to circulate through among the second pump, the heat exchanger, and at least one of the flow paths included in the first flow path group.

3. The thermal management system for a vehicle, according to claim 1, wherein the first target device group for heat exchange includes at least two of the first target devices for heat exchange including a heater core that heats air to be blown into a vehicle interior by exchanging heat between the heat medium and the air, an intake air cooler that cools an intake air of the internal combustion engine by exchanging heat between the heat medium and the intake air, and a supercharger that supercharges the intake air by using exhaust air from the internal combustion engine.

4. The thermal management system for a vehicle, according to claim 1, further comprising:

a second flow path group including a plurality of flow paths connected to between the heat medium outlet side of the third switching valve and the heat medium inlet side of the fourth switching valve, wherein the second target devices for heat exchange included in the second target device group for heat exchange are disposed in the flow path included in the second flow path group, and the first switching valve, the second switching valve, the third switching valve, and the fourth switching valve are cooperatively operated to form a heat medium circuit that allows the heat medium to circulate through between the second pump, the heat exchanger, at least one of the flow paths included in the first flow path group, and at least one of the flow paths included in the second flow path group.

5. The thermal management system for a vehicle, according to claim 1, wherein the third switching valve and the fourth switching valve are cooperatively operated to form a heat medium circuit that allows the heat medium to circulate through between the third pump, and at least one of the flow paths included in the second flow path group.

6. The thermal management system for a vehicle, according to claim 1, wherein the first target device group for heat exchange includes at least two of the first target devices for heat exchange which includes a heater core that heats air to be blown into a vehicle interior by exchanging heat between the heat medium and the air, an intake air cooler that cools an intake air by exchanging heat between the heat medium and the intake air of the internal combustion engine, a supercharger that supercharges the intake air by using exhaust air from the internal combustion engine, and a heat accumulator that stores hot heat held in the heat medium.

7. The thermal management system for a vehicle, according to claim 1, wherein the first target device group for heat exchange includes an exhaust gas cooler that cools exhaust gas of the internal combustion engine by exchanging heat between the heat medium and the exhaust gas.

8. The thermal management system for a vehicle, according to claim 3, wherein the at least two of the first target devices for heat exchange are arranged such that the heat medium flows in parallel or in series between the first switching valve and the second switching valve.

9. The thermal management system for a vehicle, according to claim 8, further comprising a serial-parallel switching device that switches the at least two of the first target devices for heat exchange between a state of the heat medium flowing in parallel and a state of the heat medium flowing in series.

10. The thermal management system for a vehicle, according to claim 9, wherein the at least two of the first target devices for heat exchange are the heater core and the intake air cooler.

11. The thermal management system for a vehicle, according to claim 10, wherein the heat medium having flowed from the heater core flows into the intake air cooler, when the serial-parallel switching device is operated to allow the heat medium to flow in series through the heater core and the intake air cooler.

12. The thermal management system for a vehicle, according to claim 11, further comprising
a heat exchanger for the internal combustion engine, that exchanges heat between outside air and the heat medium circulating through the internal combustion engine, wherein
the heat exchanger for the internal combustion engine is connected to the first target devices for heat exchange included in the first target device group for heat exchange in parallel, with respect to a flow of the heat medium.

13. The thermal management system for a vehicle, according to claim 3, further comprising:
a cooling heat exchanger that cools the air by exchanging heat between a low-pressure refrigerant of a refrigeration cycle and the air flowing into the heater core; and
a temperature adjustment device disposed on a downstream side of an air flow with respect to the cooling heat exchanger and on an upstream side of the air flow with respect to the heater core, the temperature adjustment device being adapted to adjust a temperature of the air by changing a ratio of a volume of the air flowing into the heater core to a volume of the air bypassing the heater core.

14. The thermal management system for a vehicle, according to claim 13, wherein
the refrigeration cycle has a function of cooling the air by the cooling heat exchanger even when the compressor is stopped.

15. The thermal management system for a vehicle, according to claim 14, wherein
the cooling heat exchanger is configured to store cold heat therein.

16. The thermal management system for a vehicle, according to claim 1, further comprising:
a heat exchanger for the internal combustion engine, that exchanges heat between outside air and the heat medium circulating through the internal combustion engine;
a bypass flow path that allows the heat medium circulating through the internal combustion engine to flow while bypassing the heat exchanger for the internal combustion engine; and
a first flow path switching device switching a state of allowing the heat medium circulating through the internal combustion engine to flow through the heat exchanger for the internal combustion engine, and another state of allowing the heat medium to flow through the bypass flow path.

17. The thermal management system for a vehicle, according to claim 16, further comprising:
a second flow path switching device switching between a state of allowing the heat medium discharged from the second pump to flow through the heat exchanger for the internal combustion engine, and another state of allowing the heat medium not to flow through the heat exchanger for the internal combustion engine, wherein
when a temperature of the heat medium circulating through the internal combustion engine, detected by a temperature sensor, is lower than a predetermined temperature, the first flow path switching device is operated such that the heat medium circulating through the internal combustion engine flows through the bypass flow path, and the second flow path switching device is operated such that the heat medium discharged from the second pump flows through the heat exchanger for the internal combustion engine.

18. The thermal management system for a vehicle, according to claim 17, wherein
the heat exchanger for the internal combustion engine is disposed on a downstream side of outside air flow with respect to the heat exchanger, and
when the heat medium discharged from the second pump flows through the heat exchanger for the internal combustion engine, the heat medium having flowed from the heat exchanger for the internal combustion engine flows into the heat exchanger.

19. The thermal management system for a vehicle, according to claim 17, wherein
the second flow switching device is operated to allow the heat medium discharged from the second pump to flow to the heat exchanger for the internal combustion engine when the temperature of the heat medium circulating through the internal combustion engine is lower than the predetermined temperature, and to allow the heat medium circulating through the internal combustion engine to flow to the heat exchanger for the internal combustion engine when the temperature of the heat medium circulating through the internal combustion engine is higher than the predetermined temperature.

20. The thermal management system for a vehicle, according to claim 1, wherein
the first target device group for heat exchange includes a heat exchanger for heat medium heating that heats the heat medium by exchanging heat between the heat medium and the high-pressure refrigerant of the refrigeration cycle.

21. The thermal management system for a vehicle, according to claim 1, wherein
the first target device group for heat exchange includes a heat accumulator storing hot heat held in the heat medium, and a heat exchanger for heat medium heating that heats the heat medium by exchanging heat between the heat medium and the high-pressure refrigerant of the refrigeration cycle to heat the heat medium, and
the heat accumulator and the heat exchanger for heat medium heating are arranged such that the heat medium flows in series between the first switching valve and the second switching valve.

22. The thermal management system for a vehicle, according to claim 1, further comprising
a heat exchanger for the internal combustion engine that exchanges heat between outside air and the heat medium circulating through the internal combustion engine, wherein
the first target device group for heat exchange includes a heat accumulator storing hot heat held in the heat medium, and a heat exchanger for heat medium heating that heats the heat medium by exchanging heat between the heat medium and the high-pressure refrigerant of the refrigeration cycle, and
when the heat exchanger for heat medium heating needs to dissipate heat, the first switching valve and the second switching valve are cooperatively operated such that the heat medium circulates between the heat exchanger for heat medium heating, and one of the heat accumulator, the heat exchanger, and the heat exchanger for the internal combustion engine, which has the lowest temperature.

23. The thermal management system for a vehicle, according to claim 1, wherein the first target device group for heat exchange includes a lubricant oil heat exchanger that exchanges heat between the heat medium and the lubricant oil used in the internal combustion engine, and an automatic-transmission-oil heat exchanger that exchanges heat between the heat medium and automatic transmission oil used in an automatic transmission.

24. The thermal management system for a vehicle, according to claim 1, wherein
the second target device group for heat exchange includes at least one of the second target devices for heat exchange including a heat medium cooler cooling the heat medium, an electric device dissipating heat generated by the electric device itself into a coolant, and a cold storage device storing cold heat held in the heat medium.

25. The thermal management system for a vehicle, according to claim 24, wherein
the second target device group for heat exchange includes an intake air cooler cooling the intake air by exchanging heat between the heat medium and the intake air of the internal combustion engine.

26. The thermal management system for a vehicle, according to claim 24, wherein
the second target device group for heat exchange includes a heat exchanger for air cooling that cools the air to be blown into the vehicle interior by exchanging heat between the heat medium and the air.

27. The thermal management system for a vehicle, according to claim 24, wherein
the heat medium cooler is a heat exchanger for heat medium cooling that cools the heat medium by exchanging heat between the heat medium and a low-pressure refrigerant of a refrigeration cycle.

28. The thermal management system for a vehicle according to claim 1, further comprising
a heat exchanger for the internal combustion engine, that exchanges heat between outside air and the heat medium circulating through the internal combustion engine, wherein
the first target device group for heat exchange includes a heat accumulator for storing hot heat held in the heat medium, and a heat exchanger for heat medium heating that heats the heat medium by exchanging heat between the heat medium and the high-pressure refrigerant of the refrigeration cycle, and
when the heat exchanger for heat medium heating needs to dissipate heat, the first switching valve, the second switching valve, the third switching valve, and the fourth switching valve are cooperatively operated such that the heat medium circulates between the heat exchanger for the heat medium and one of the heat accumulator, the heat exchanger, and the heat exchanger for the internal combustion engine which has the lowest temperature.

29. The thermal management system for a vehicle, according to claim 24, wherein
the second target device group for heat exchange includes the heat medium cooler and the cold storage device, and
the cold heat of the heat medium is stored in the cold storage device by cooperatively operating the third switching valve and the fourth switching valve so as to allow the heat medium to circulate through between the heat medium cooler and the cold storage device.

30. The thermal management system for a vehicle, according to claim 29, wherein
the first target device group for heat exchange includes a heat exchanger for heat medium heating that heats the heat medium by exchanging heat between the heat medium and the high-pressure refrigerant of the refrigeration cycle, and
the high-pressure refrigerant is cooled using cold heat stored in the cold storage device by cooperatively operating the first switching valve, the second switching valve, the third switching valve, and the fourth switching valve so as to allow the heat medium to circulate through between the heat exchanger for heat medium heating and the cold storage device.

31. The thermal management system for a vehicle, according to claim 29, wherein
the second target device group for heat exchange includes a heat exchanger for air cooling that exchanges heat between the heat medium and air to be blown into the vehicle interior to thereby cool the air, and
the air is cooled using cold heat stored in the cold storage device by cooperatively operating the third switching valve and the fourth switching valve so as to allow the heat medium to circulate through between the heat exchanger for air cooling and the cold storage device.

32. The thermal management system for a vehicle, according to claim 29, wherein
the second target device group for heat exchange includes an intake air cooler that cools intake air of the internal combustion engine by exchanging heat between the heat medium and the intake air, and
the intake air is cooled using cold heat stored in the cold storage device by cooperatively operating the third switching valve and the fourth switching valve so as to allow the heat medium to circulate through between the intake air cooler and the cold storage device.

33. The thermal management system for a vehicle, according to claim 4, wherein
the second flow path group includes a flow path without any second target devices for heat exchange included in the second target device group for heat exchange.

* * * * *